US007188358B1

(12) United States Patent
Hisada et al.

(10) Patent No.: US 7,188,358 B1
(45) Date of Patent: Mar. 6, 2007

(54) EMAIL ACCESS CONTROL SCHEME FOR COMMUNICATION NETWORK USING IDENTIFICATION CONCEALMENT MECHANISM

(75) Inventors: Yusuke Hisada, Tokyo (JP); Satoshi Ono, Tokyo (JP); Haruhisa Ichikawa, Tokyo (JP)

(73) Assignee: Nippon Telegraph and Telephone Corporation (JP)

( * ) Notice: Subject to any disclaimer, the term of this patent is extended or adjusted under 35 U.S.C. 154(b) by 0 days.

(21) Appl. No.: 09/277,417

(22) Filed: Mar. 26, 1999

(30) Foreign Application Priority Data

| Mar. 26, 1998 | (JP) | ................................. P10-079837 |
| Jun. 18, 1998 | (JP) | ................................. P10-171930 |
| Aug. 7, 1998 | (JP) | ................................. P10-224861 |
| Nov. 5, 1998 | (JP) | ................................. P10-315172 |

(51) Int. Cl.
  *G06F 7/04*   (2006.01)
  *H04L 9/00*   (2006.01)
  *G06F 15/16*  (2006.01)
  *G06F 15/173* (2006.01)

(52) U.S. Cl. .................. 726/2; 726/3; 726/4; 726/5; 726/6; 726/10; 726/18; 726/19; 726/21; 709/223; 709/224; 709/225; 709/226; 709/229; 713/155; 713/156; 713/158; 713/180

(58) Field of Classification Search ........ 713/200–202, 713/166, 154–156, 180, 159, 158; 709/223–229
See application file for complete search history.

(56) References Cited

U.S. PATENT DOCUMENTS 5,548,646 A * 8/1996 Aziz et al. .................. 713/153

5,553,145 A * 9/1996 Micali ............................ 380/30
5,812,670 A * 9/1998 Micali ............................ 705/74

(Continued)

FOREIGN PATENT DOCUMENTS

JP    8-293883    11/1996

(Continued)

OTHER PUBLICATIONS

Tygar, Atomicity in Electronic Commerce, 1996, p. 8-21.*

(Continued)

*Primary Examiner*—Ayaz Sheikh
*Assistant Examiner*—Jenise E. Jackson
(74) *Attorney, Agent, or Firm*—Kilpatrick Stockton LLP

(57) ABSTRACT

An email access control scheme capable of resolving problems of the real email address and enabling a unique identification of the identity of the user while concealing the user identification is disclosed. A personalized access ticket containing a sender's identification and a recipient's identification in correspondence is to be presented by a sender who wishes to send an email to a recipient so as to specify the recipient as an intended destination of the email. Then, accesses between the sender and the recipient by verifying an access right of the sender with respect to the recipient according to the personalized access ticket at a secure communication service. Also, an official identification of each user by which each user is uniquely identifiable by a certification authority, and an anonymous identification of each user containing at least one fragment of the official identification are defined, and each user is identified by the anonymous identification of each user in communications for emails on a communication network.

85 Claims, 45 Drawing Sheets

U.S. PATENT DOCUMENTS

| | | | |
|---|---|---|---|
| 5,884,270 A * | 3/1999 | Walker et al. | 705/1 |
| 5,884,272 A * | 3/1999 | Walker et al. | 705/1 |
| 5,982,893 A * | 11/1999 | Hughes | 705/75 |
| 6,014,646 A * | 1/2000 | Vallee et al. | 705/39 |
| 6,023,510 A * | 2/2000 | Epstein | 705/74 |
| 6,061,789 A * | 5/2000 | Hauser et al. | 713/168 |
| 6,064,878 A * | 5/2000 | Denker et al. | 455/415 |
| 6,108,644 A * | 8/2000 | Goldschlag et al. | 705/69 |
| 6,122,372 A * | 9/2000 | Hughes | 380/2 |
| 6,128,740 A * | 10/2000 | Curry et al. | 713/158 |
| 6,233,341 B1 * | 5/2001 | Riggins | 380/277 |

FOREIGN PATENT DOCUMENTS

| | | |
|---|---|---|
| JP | 9-046371 | 2/1997 |
| JP | 09-128308 | 5/1997 |

OTHER PUBLICATIONS

Schneier, Applied Cryptography, 1996, p. 566-571.*

Chaum, Untraceable Electronic Mail Return Address and Digital Pseudonyms, 1981.*

Menezes, 1997, CRC Press, p. 500-502.*

*Mismaster & Remailer Attacks*, "Cypherpunk remailers.", http://www.obsurea.com.

*The Design, Implementation and Operation of an Email Pseudonym Server*, David Mazieres and M. Frans Kaashoek; MIT Laboratory for Computer Science.

*German Digital Signature Law (SigG)*; Gleiss Lutz Hootz Hirsch, Frankfurt, Germany.

*How to Avoid Unwanted Email*, Robert J. Hall; *Communications of the ACN*; Mar. 1998, vol. 41, No. 3.

* cited by examiner

FIG.2
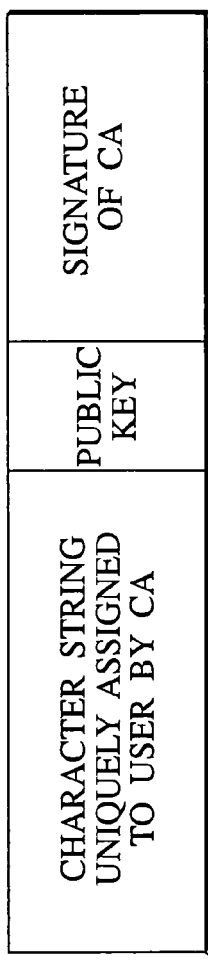
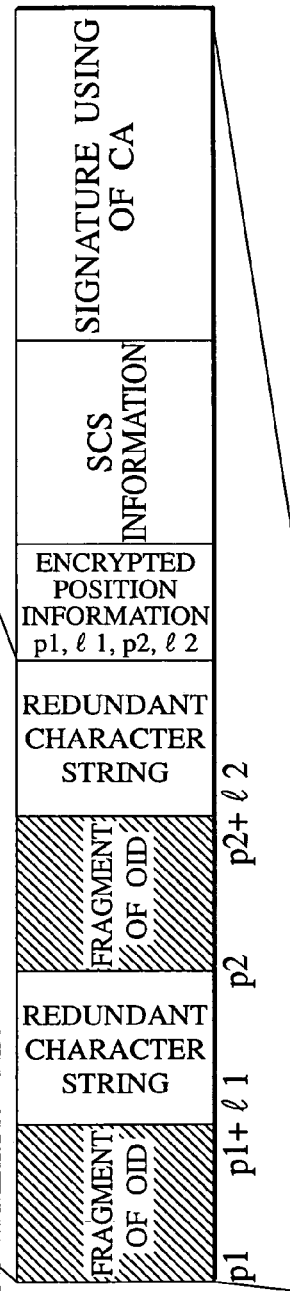
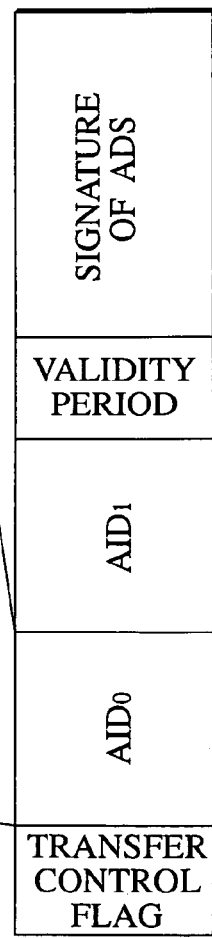
(a) Official Identification:OID
(b) Anonymous Identification:AID
(c) 1-To-1 Personalized Access Ticket:PAT

FIG.8

(a) Official Identification:OID

| CHARACTER STRING UNIQUELY ASSIGNED TO USER BY CA | PUBLIC KEY | SIGNATURE OF CA |
|---|---|---|

(b) Anonymous Identification:AID

| REDUNDANT CHARACTER STRING | FRAGMENT OF OID | REDUNDANT CHARACTER STRING | FRAGMENT OF OID | $p_1, \ell_1$ ... $p_n, \ell_n$ | SCS INFORMATION | SIGNATURE OF CA |
|---|---|---|---|---|---|---| positions: $p_1$ | $p_1+\ell_1$ | $p_n$ | $p_n+\ell_n$

(c) 1-To-N Personalized Access Ticket:PAT

| PAT PROCESSING DEVICE IDENTIFIER | HOLDER INDEX | TRANSFER CONTROL FLAG | HOLDER AID | MEMBER AID$_1$ | MEMBER AID$_2$ | ... | MEMBER AID$_n$ | VALIDITY PERIOD | SIGNATURE OF PAT PROCESSING DEVICE |
|---|---|---|---|---|---|---|---|---|---|

FIG.25

DATA STRUCTURE OF Null-AID

| CHARACTER STRING UNIQUELY INDICATING THAT IT IS Null-AID | SIGNATURE OF CA |
|---|---|

FIG.26

DATA STRUCTURE OF Enabler of Null-AID

| CHARACTER STRING UNIQUELY INDICATING THAT IT IS Enabler | Null-AID ITSELF | SIGNATURE OF CA |
|---|---|---|

DATA STRUCTURE OF God-AID

FIG.40

(a) Official Identification:OID

| CHARACTER STRING UNIQUELY ASSIGNED TO USER BY CA | PUBLIC KEY | SIGNATURE OF CA |
|---|---|---|

(b) LINK INFORMATION ATTACHED Anonymous Identification:AID

| FRAGMENT OF OID | REDUNDANT CHARACTER STRING | FRAGMENT OF OID | REDUNDANT CHARACTER STRING | $p_1, \ell_1$ ... $p_n, \ell_n$ | SCS INFORMATION | LINK INFORMATION | SIGNATURE OF CA |
|---|---|---|---|---|---|---|---|

$p_1 \quad p_1+\ell_1 \quad p_n \quad p_n+\ell_n$ (c) LINK SPECIFYING 1-To-N Personalized Access Ticket:PAT

| PAT PROCESSING DEVICE IDENTIFIER | HOLDER INDEX | TRANSFER CONTROL FLAG | LINK INFORMATION OF $AID_0$ | LINK INFORMATION OF $AID_1$ | LINK INFORMATION OF $AID_2$ | ... | LINK INFORMATION OF $AID_n$ | VALIDITY PERIOD | SIGNATURE OF PAT PROCESSING DEVICE |
|---|---|---|---|---|---|---|---|---|---|

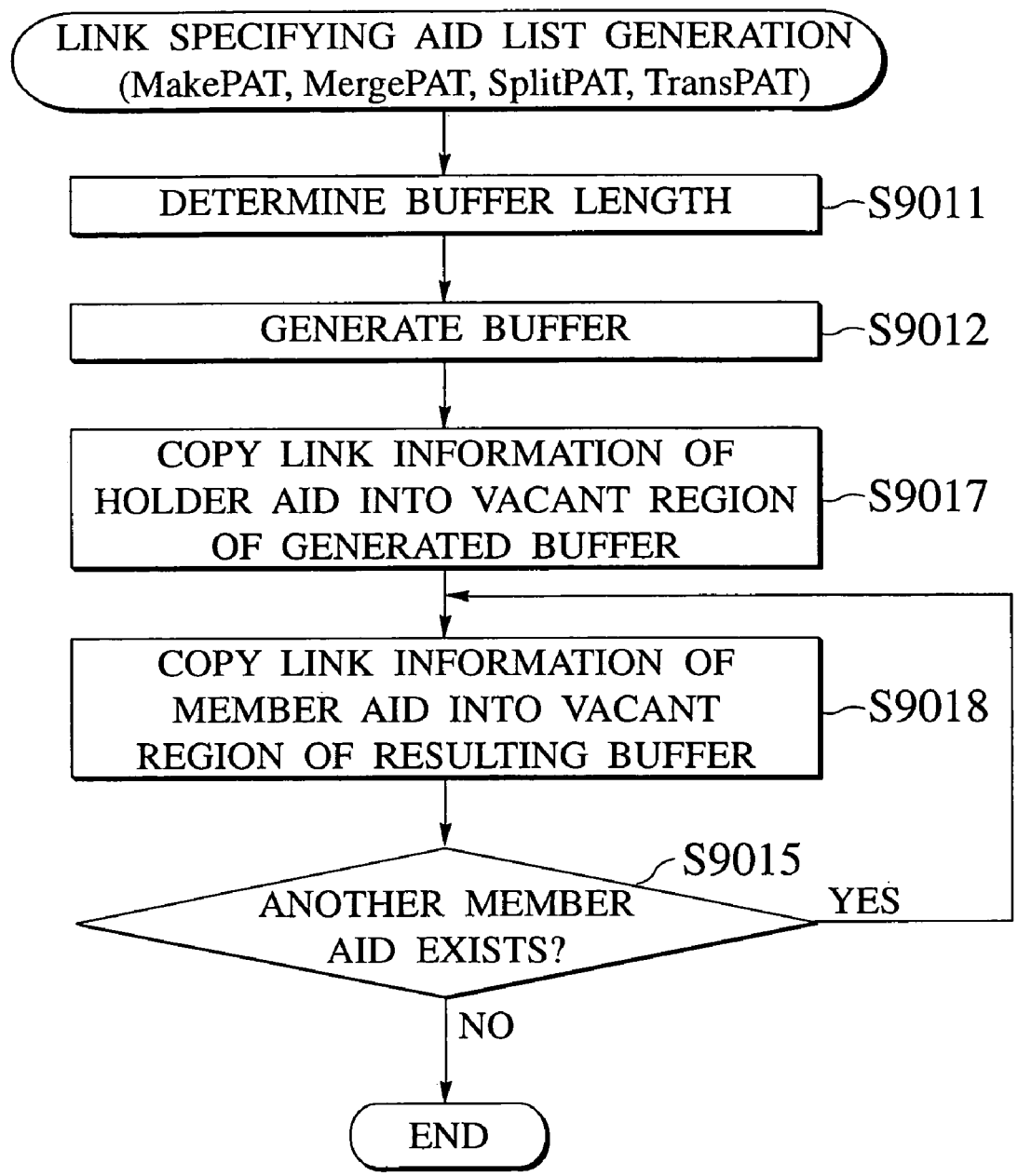

EMAIL ACCESS CONTROL SCHEME FOR COMMUNICATION NETWORK USING IDENTIFICATION CONCEALMENT MECHANISM

BACKGROUND OF THE INVENTION

1. Field of the Invention

The present invention relates to an email access control scheme for controlling transmission and reception of emails by controlling accesses for communications from other users whose identifications on the communication network are concealed while concealing an identification of a recipient on the communication network.

2. Description of the Background Art

In conjunction with the spread of the Internet, the SPAM and the harassment using emails are drastically increasing. The SPAM is a generic name for emails or news that are unilaterally sent without any consideration to the recipient's time consumption, economical and mental burdens. The SPAM using emails are also known as UBE (Unsolicited Bulk Emails) or UCE (Unsolicited Commercial Emails).

The SPAM is sent indiscriminately regardless of the recipient's age, sex, interests, etc., so that the SPAM often contains an uninteresting or unpleasant content for the recipient. Moreover, the time consumption load and the economical load required for receiving the SPAM is not so small. For the business user, the SPAM can cause the lowering of the working efficiency as it becomes hard to find important mails that are buried among the SPAM. Also, as the SPAM is sent to a huge number of users, the SPAM wastes the network resources and in the worst case the SPAM can cause the overloading. As a result, there case be cases where mails that are important for the user may be lost. Also, the SPAM is sent either anonymously or by pretending someone else so that there is a need to provide some human resources to handle complaints.

On the other hand, the harassment is an act for keep sending mails with unpleasant contents for the user continually on the purpose of causing mental agony or exerting economical and time consumption burdens to the specific user. Similarly as the SPAM, the harassment mails are sent by pretending an actual or virtual third person, so that the identification of the sender is quite difficult. Also, there are cases where a large capacity mail is sent or a large amount of mails are sent in short period of time so that there is a danger of causing the system breakdown.

In order to deal with the SPAM and the harassment, the mail system is required to satisfy the following requirements.

Security

It is necessary to detect the pretending by the sender and refuse the delivery from the pretending sender.

Strength

It is necessary to limit the mail capacity in order to circumvent the system breakdown due to the large capacity mail. It is also necessary to limit the number of transmissions in order to circumvent the system breakdown due to the large amount transmission.

Compatibility

It is necessary not to require a considerable change to the implementation of the existing mail system.

Handling

It is necessary not to require a considerable change to the handling of the existing mail system.

The MTA (message Transfer Agent) such as sendmail and qmail detects the forgery of the envelope information and the header information and refuses the delivery. The MTA also refuses mail receiving from a mail server which is a source of the SPAM by referring to the so called black list such as MAPS RBL. The MTA also detects the transmission using someone else's real email address and refuses the delivery by carrying out the signature verification using PGP, S/MIME, TLS, etc. The MTA also limits the message length by partial deletion of the message text.

One of the causes of the SPAM and the harassment is the real email address, and the real email address is associated with the following problems.

User's Identity can be Guessed from Real Email Address:

The real email address contains an information useful in guessing the identity so that it can be used in selecting the harassment target. For example, the place of employment can be identified from the real domain. Also, the name and the sex can be guessed from the user name.

Real Email Address can be Guessed from User's Identity:

The real email address has a universal format of [user name]@[domain name] so that the real email address can be guessed if the user's identity is known, without an explicit knowledge of the real email address itself. For example, if the user's real name is known, the candidates for the user name can be enumerated. Also, if the user's affiliation is known, the candidates for the domain name can be enumerated. Even in the case where the user name is given by a character string which is totally unrelated to the real name, if the naming rule for the user name is known, the user name can be guessed by trial and error transmissions.

Real Email Address is Transferrable:

The real email address can be transferred from one person to another, so that mails can be transmitted even if the real email address is not taught by the holder himself. The transfer of real email address through mails includes the following cases. By specifying the other's real email address in the cc: line of the mail, that real email address can be transferred to all the recipients specified in the To: line of the mail. Also, by forwarding the mail that contains the real email address of the recipient specified in the To: line in the message text to a third person, that real email address can be transferred to the third person.

Real Email Address is Hard to Cancel:

It is difficult to cancel the real email address because if the real email address is cancelled it becomes impossible to read not only the SPAM and the harassment mails but also the important mails as well.

Cypherpunk remailers and Mixmaster remailers which are collectively known as Anonymous remailers use a scheme for delivering mails after encrypting the real email address and the real domain of the sender. This scheme is called the reply block. The encryption and decryption of the reply block uses a public key and a secret key of the Anonymous remailer so that it is difficult to identify the real email address and the real domain of the sender for any users other than the sender.

The Anonymous remailers also make it difficult to transfer the real email address because it is difficult to identify the real email address. However, the reply block is transferrable, so that reply mails can be returned to the sender from users other than the recipient.

AS-Node and nym.alias.net which are collectively known as Pseudonymous servers use mail transmission and reception using a pseudonym account uniquely corresponding to the real email address of the user. The pseudonym account can be arbitrarily created at the user side so that the user can have a pseudonym account from which the real email address is hard to guess. In addition, by the use of the reply block, it is also possible to conceal the real email address and the real domain of the user to the Pseudonymous server. By combining these means, it can be made difficult to identify the real email address and the real domain of the sender for any users other than the sender. Also, the pseudonym account is cancellable so that there is no need to cancel the real email address.

The Pseudonymous servers also make it difficult to transfer the real email address because it is difficult to identify the real email address. However, the pseudonym account is transferrable so that reply mails can be returned to the sender from users other than the recipient.

In addition, in order to protect a recipient from the SPAM and the harrassment, it is also necessary to reject a connection request from a sender who are exercising such action. For this reason, it is necessary for the communication system to be capable of uniquely identifying the identity of the sender.

In view of these factors, the communication system is required to be capable of uniquely identifying the identity of the user while concealing the real email address of the user (that is while guaranteeing the anonymity of the user), but in the conventional communication system, it has been difficult to meet both of these requirements simultaneously.

In order to identify the identity of the user in the mail system, the real email address of that user is necessary. On the other hand, the Anonymous remailers deliver a mail after either encrypting or deleting the real email address of the sender in order to guarantee the anonymity of the sender. In order to identify the identity of the sender under this condition, it is necessary to trace the delivery route of the mail using the traffic analysis. However, the Anonymous remailers may delay the mail delivery or interchange the delivery orders of mails. Also, The Mixmaster remailers deliver the mail by dividing it into plural blocks. For this reason, it is difficult to trace the delivery route by the traffic analysis, and therefore the identification of the identity of the sender is also difficult.

The Pseudonymous servers also utilize the Anonymous remailers for the mail delivery, so that it is possible to guarantee the anonymity of the sender but it is also difficult to uniquely identify the identity of the sender.

On the other hand, the German Digital Signature Law allows entry of a pseudonym instead of a real name into a digital certificate for generating the digital signature to be used in communication services. The digital certificate is uniquely assigned to the user so that the identity of the user can be uniquely identified even if the pseudonym is entered. Also, the right for naming the pseudonym is given to the user side so that it is possible to enter the pseudonym from which it is difficult to guess the real name.

SUMMARY OF THE INVENTION

It is therefore an object of the present invention to provide an email access control scheme in a communication network which is capable of resolving the above described problems of the real email address which is one of the causes of the SPAM and the harassment.

It is another object of the present invention to provide an email access control scheme in a communication network which is capable of enabling a unique identification of the identity of the user while concealing the user identification.

In order to resolve the problems associated with the transfer and the cancellation of the real email address, the present invention employs the email access control scheme using a personalized access ticket (PAT). In order to resolve the problem associated with the transfer of the real email address, the destination is specified by the PAT which contains both the real email address of the sender and a real email address of the recipient. Also, in order to resolve the problem associated with the cancellation of the real email address, a validity period is set in the PAT by a Trusted Third Party. Then, the mail delivery from the sender who presented the PAT with the expired validity period will be refused. Also, instead of cancelling the real email address, the PAT is registered at a secure storage device managed by a secure communication service.

In other words, the present invention controls accesses in units in which the real email address of the sender and the real email address of the recipient is paired. For this reason, even when the real email address is transferred, it is possible to avoid receiving mails from users to which the real email address has been transferred as long as the PAT is not acquired by these users.

Also, in the present invention, it is possible to refuse receiving mails without cancelling the real email address because the mail delivery from the sender who presented the PAT with the expired validity period or the PAT that is registered in a database by the recipient will be refused.

Also, in the present invention, the mail receiving can be resumed without re-acquiring the real email address because the mail receiving can be resumed by deleting the PAT from the above described storage device.

Also, in the present invention, the time consumption and economical loads required for the mail receiving or downloading at the user side can be reduced because the transmission of mails are refused at the server side.

In addition, the present invention employs the email access control scheme using an official identification (OID) and an anonymous identification (AID) in order to make it possible to identify the identity of the user while guaranteeing the anonymity of the user.

Namely, in the present invention, a certificate in which the personal information is signed by a secret key of the Trusted Third Party is assigned to each user in order to uniquely identify each user. This certificate will be referred to as OID. Also, a certificate which contains fragments of the OID information is assigned to each user as a user identifier on a communication network in order to make it possible to identify the identity while guaranteeing the anonymity of the user. This certificate will be referred to as AID.

Also, in the present invention, the OID is reconstructed by judging the identity of a plurality of AIDs in order to identify the identity of the user. Also, the AID is contained in the PAT and the PAT is authenticated at a secure communication service (SCS) in order to resolve the problems associated with the transfer and the cancellation of the AID.

Also, in the present invention, the AID is managed in a directory which is accessible for search by unspecified many and which outputs the PAT containing the AID as a destination, in order to meet the user side demand for being able to admit accesses from unspecified many without revealing the own identity.

In this way, in the present invention, the identity of the user can be concealed in the mail transmission and reception because the AID only contains fragments of the OID. Also, the identity of the user can be concealed from unspecified many even when the AID is registered at the directory service which is accessible from unspecified many.

Also, in the present invention, the identity of the user can be identified probabilistically by reconstructing the OID by Judging the identity of a plurality of AIDs. For this reason, it is possible to provide a measure against the SPAM and the harassment without revealing the identity.

Also, in the present invention, it is possible to admit accesses from unspecified many without revealing the identity, by managing the AID rather than the real email address at the directory and outputting the PAT containing the AID as a destination at the directory.

More specifically, according to one aspect of the present invention there is provided a method of email access control, comprising the steps of: receiving a personalized access ticket containing a sender's identification and a recipient's identification in correspondence, which is presented by a sender who wishes to send an email to a recipient so as to specify the recipient as an intended destination of the email, at a secure communication service for connecting communications between the sender and the receiver; and controlling accesses between the sender and the recipient by verifying an access right of the sender with respect to the recipient according to the personalized access ticket at the secure communication service.

Also, in this aspect of the present invention, at the controlling step the secure communication service authenticates the personalized access ticket presented by the sender, and refuses a delivery of the email when the personalized access ticket presented by the sender has been altered.

Also, in this aspect of the present invention, the personalized access ticket is signed by a secret key of a secure processing device which issued the personalized access ticket, and at the controlling step the secure communication service authenticates the personalized access ticket by verifying a signature of the secure processing device in the personalized access ticket using a public key of the secure processing device.

Also, in this aspect of the present invention, at the receiving step the secure communication service also receives the sender's identification presented by the sender along with the personalized access ticket, and at the controlling step the secure communication service checks whether the sender's identification presented by the sender is contained in the personalized access ticket presented by the sender, and refuses a delivery of the email when the sender's identification presented by the sender is not contained in the personalized access ticket presented by the sender.

Also, in this aspect of the present invention, the personalized access ticket also contains a validity period indicating a period for which the personalized access ticket is valid, and at the controlling step the secure communication service checks the validity period contained in the personalized access ticket presented by the sender and refuses a delivery of the email when the personalized access ticket presented by the sender contains the validity period that has already been expired.

Also, in this aspect of the present invention, the validity period of the personalized access ticket is set by a trusted third party.

Also, in this aspect of the present invention, the method can further comprise the step of: issuing the personalized access ticket to the sender at a directory service for managing an identification of each registrant and a disclosed information of each registrant which has a lower secrecy than a personal information, in a state which is accessible for search by unspecified many, in response to search conditions specified by the sender, by using an identification of a registrant whose disclosed information matches the search conditions as the recipient's identification and the sender's identification specified by the sender along with the search conditions.

Also, in this aspect of the present invention, the method can further comprise the step of: registering in advance the personalized access ticket containing an identification of a specific user from which a delivery of emails to a specific registrant is to be refused as the sender's identification and an identification of the specific registrant as the recipient's identification, at the secure communication service; wherein the controlling step the secure communication service refuses a delivery of the email from the sender when the personalized access ticket presented by the sender is registered therein in advance at the registering step.

Also, in this aspect of the present invention, the method can further comprise the step of: deleting the personalized access ticket registered at the secure communication service upon request from the specific registrant who registered the personalized access ticket at the registering step.

Also, in this aspect of the present invention, the personalized access ticket also contains a transfer control flag indicating whether or not the sender should be authenticated by the secure communication service, and at the controlling step, when the transfer control flag contained in the personalized access ticket indicates that the sender should be authenticated, the secure communication service authenticates the sender's identification presented by the sender and refuses a delivery of the email when an authentication of the sender's identification fails.

Also, in this aspect of the present invention, the authentication of the sender's identification is realized by a challenge/response procedure between the sender and the secure communication service.

Also, in this aspect of the present invention, the transfer control flag of the personalized access ticket is set by a trusted third party.

Also, in this aspect of the present invention, the sender's identification and the recipient's identification in the personalized access ticket can be given by real email addresses of the sender and the recipient.

Also, in this aspect of the present invention, the sender's identification and the recipient's identification in the personalized access ticket can be given by anonymous identifications of the sender and the recipient, where an anonymous identification of each user contains at least one fragment of an official identification of each user by which each user is uniquely identifiable by a certification authority.

Also, in this aspect of the present invention, the anonymous identification of each user is an information containing the at least one fragment of the official identification of each user which is signed by the certification authority using a secret key of the certification authority.

Also, in this aspect of the present invention, the official identification of each user is a character string uniquely assigned to each user by the certification authority and a public key of each user which are signed by a secret key of the certification authority.

Also, in this aspect of the present invention, the method can further comprise the step of: probabilistically identifying an identity of the sender by reconstructing the official identification of the sender by judging identity of a plurality of anonymous identifications of the sender contained in a plurality of personalized access tickets used by the sender.

Also, in this aspect of the present invention, an anonymous identification of each user that contains at least one fragment of an official identification of each user by which each user is uniquely identifiable by a certification authority and a link information of each anonymous identification by which each anonymous identification can be uniquely identified can be defined, and the sender's identification and the recipient's identification in the personalized access ticket can be given by a link information of the anonymous identification of the sender and a link information of the anonymous identification of the recipient.

Also, in this aspect of the present invention, the link information of each anonymous identification is an identifier uniquely assigned to each anonymous identification by the certification authority.

Also, in this aspect of the present invention, the method can further comprise the step of: probabilistically identifying an identity of the sender by reconstructing the official identification of the sender by judging identity of a plurality of anonymous identifications of the sender corresponding to the link information contained in a plurality of personalized access tickets used by the sender.

Also, in this aspect of the present invention, the personalized access ticket can contain a single sender's identification and a single recipient's identification in 1-to-1 correspondence.

Also, in this aspect of the present invention, the personalized access ticket can contain a single sender's identification and a plurality of recipient's identifications in 1-to-N correspondence, where N is an integer greater than 1.

Also, in this aspect of the present invention, one identification among the single sender's identification and the plurality of recipient's identifications is a holder identification for identifying a holder of the personalized access ticket while other identifications among the single sender's identification and the plurality of recipient's identifications are member identifications for identifying members of a group to which the holder belongs.

Also, in this aspect of the present invention, the method can further comprise the step of: issuing an identification of each user and an enabler of the identification of each user indicating a right to change the personalized access ticket containing the identification of each user as the holder identification, to each user at a certification authority, such that prescribed processing on the personalized access ticket can be carried out at a secure processing device only by a user who presented both the holder identification contained in the personalized access ticket and the enabler corresponding to the holder identification to the secure processing device.

Also, in this aspect of the present invention, the certification authority issues the enabler of the identification of each user as an information indicating that it is the enabler and the identification of each user itself which are signed by a secret key of the certification authority.

Also, in this aspect of the present invention, the prescribed processing includes a generation of a new personalized access ticket, a merging of a plurality of personalized access tickets, a splitting of one personalized access ticket into a plurality of personalized access tickets, a changing of the holder of the personalized access ticket, changing of a validity period of the personalized access ticket, and a changing of a transfer control flag of the personalized access ticket.

Also, in this aspect of the present invention, a special identification and a special enabler corresponding to the special identification which are known to all users can be defined such that the generation of a new personalized access ticket and the changing of the holder of the personalized access ticket can be carried out by the holder of the personalized access ticket by using the special identification and the special enabler without using an enabler of a member identification.

Also, in this aspect of the present invention, the special identification is defined to be capable of being used only as the holder identification of the personalized access ticket.

Also, in this aspect of the present invention, a special identification which is known to all users can be defined such that a read only attribute can be set to the personalized access ticket by using the special identification.

Also, in this aspect of the present invention, at the controlling step, when the access right of the sender with respect to the recipient is verified according to the personalized access ticket, the secure communication service takes out the recipient's identification from the personalized access ticket by using the sender's identification presented by the sender, converts the mail by using a taken out recipient's identification into a format that can be interpreted by a mail transfer function for actually carrying out a mail delivery processing, and gives the mail after conversion to the mail transfer function by attaching the personalized access ticket.

According to another aspect of the present invention there is provided a method of email access control, comprising the steps of: defining an official identification of each user by which each user is uniquely identifiable by a certification authority, and an anonymous identification of each user containing at least one fragment of the official identification; and identifying each user by the anonymous identification of each user in communications for emails on a communication network.

Also, in this aspect of the present invention, the anonymous identification of each user is an information containing the at least one fragment of the official identification of each user which is signed by the certification authority using a secret key of the certification authority.

Also, in this aspect of the present invention, the official identification of each user is a character string uniquely assigned to each user by the certification authority and a public key of each user which are signed by a secret key of the certification authority.

Also, in this aspect of the present invention, the method can further comprise the steps of: receiving a personalized access ticket containing a sender's anonymous identification and a recipient's anonymous identification in correspondence, which is presented by a sender who wishes to send an email to a recipient so as to specify the recipient as an intended destination of the email, at a secure communication service for connecting communications between the sender and the receiver; and controlling accesses between the sender and the recipient by verifying an access right of the sender with respect to the recipient according to the personalized access ticket at the secure communication service.

Also, in this aspect of the present invention, the method can further comprises the step of: probabilistically identifying an identity of the sender at the secure communication service by reconstructing the official identification of the sender while judging identity of a plurality of anonymous identifications of the sender contained in a plurality of personalized access tickets used by the sender.

Also, in this aspect of the present invention, the defining step can also define a link information of each anonymous identification by which each anonymous identification can be uniquely identified, and each anonymous identification can also contain the link information of each anonymous identification.

Also, in this aspect of the present invention, the link information of each anonymous identification is an identifier uniquely assigned to each anonymous identification by the certification authority.

Also, in this aspect of the present invention, the method can further comprises the steps of: receiving a personalized access ticket containing a link information of a sender's anonymous identification and a link information of a recipient's anonymous identification in correspondence, which is presented by a sender who wishes to send an email to a recipient so as to specify the recipient as an intended destination of the email, at a secure communication service for connecting communications between the sender and the receiver; and controlling accesses between the sender and the recipient by verifying an access right of the sender with respect to the recipient according to the personalized access ticket at the secure communication service.

Also, in this aspect of the present invention, the method can further comprises the step of: probabilistically identifying an identity of the sender by reconstructing the official identification of the sender while judging identity of a plurality of anonymous identifications of the sender corresponding to the link information contained in a plurality of personalized access tickets used by the sender.

According to another aspect of the present invention there is provided a communication system realizing email access control, comprising: a communication network to which a plurality of user terminals are connected; and a secure communication service device for connecting communications between the sender and the receiver on the communication network, by receiving a personalized access ticket containing a sender's identification and a recipient's identification in correspondence, which is presented by a sender who wishes to send an email to a recipient so as to specify the recipient as an intended destination of the email, and controlling accesses between the sender and the recipient by verifying an access right of the sender with respect to the recipient according to the personalized access ticket.

Also, in this aspect of the present invention, the secure communication service device authenticates the personalized access ticket presented by the sender, and refuses a delivery of the email when the personalized access ticket presented by the sender has been altered.

Also, in this aspect of the present invention, the system further comprises: a secure processing device for issuing the personalized access ticket which is signed by a secret key of the secure processing device; wherein the secure communication service device authenticates the personalized access ticket by verifying a signature of the secure processing device in the personalized access ticket using a public key of the secure processing device.

Also, in this aspect of the present invention, the secure communication service device also receives the sender's identification presented by the sender along with the personalized access ticket, checks whether the sender's identification presented by the sender is contained in the personalized access ticket presented by the sender, and refuses a delivery of the email when the sender's identification presented by the sender is not contained in the personalized access ticket presented by the sender.

Also, in this aspect of the present invention, the personalized access ticket also contains a validity period indicating a period for which the personalized access ticket is valid, and the secure communication service device checks the validity period contained in the personalized access ticket presented by the sender and refuses a delivery of the email when the personalized access ticket presented by the sender contains the validity period that has already been expired.

Also, in this aspect of the present invention, the system further comprises: a trusted third party for setting the validity period of the personalized access ticket.

Also, in this aspect of the present invention, the system can further comprise: a directory service device for managing an identification of each registrant and and a disclosed information of each registrant which has a lower secrecy than a personal information, in a state which is accessible for search by unspecified many, and issuing the personalized access ticket to the sender in response to search conditions specified by the sender, by using an identification of a registrant whose disclosed information matches the search conditions as the recipient's identification and the sender's identification specified by the sender along with the search conditions.

Also, in this aspect of the present invention, the secure communication service device can register in advance the personalized access ticket containing an identification of a specific user from which a delivery of emails to a specific registrant is to be refused as the sender's identification and an identification of the specific registrant as the recipient's identification, and refuse a delivery of the email from the sender when the personalized access ticket presented by the sender is registered therein in advance.

Also, in this aspect of the present invention, the secure communication service device can delete the personalized access ticket registered therein upon request from the specific registrant who registered the personalized access ticket.

Also, in this aspect of the present invention, the personalized access ticket also contains a transfer control flag indicating whether or not the sender should be authenticated by the secure communication service, and when the transfer control flag contained in the personalized access ticket indicates that the sender should be authenticated, the secure communication service device authenticates the sender's identification presented by the sender and refuses a delivery of the email when an authentication of the sender's identification fails.

Also, in this aspect of the present invention, the authentication of the sender's identification is realized by a challenge/response procedure between the sender and the secure communication service device.

Also, in this aspect of the present invention, the system further comprises a trusted third party for setting the transfer control flag of the personalized access ticket.

Also, in this aspect of the present invention, the sender's identification and the recipient's identification in the personalized access ticket can be given by real email addresses of the sender and the recipient.

Also, in this aspect of the present invention, the system can further comprise: a certification authority device for issuing an anonymous identification of each user which contains at least one fragment of an official identification of each user by which each user is uniquely identifiable by the certification authority device; wherein the sender's identification and the recipient's identification in the personalized access ticket can be given by anonymous identifications of the sender and the recipient.

Also, in this aspect of the present invention, the anonymous identification of each user is an information containing the at least one fragment of the official identification of each user which is signed by the certification authority device using a secret key of the certification authority device.

Also, in this aspect of the present invention, the official identification of each user is a character string uniquely assigned to each user by the certification authority device and a public key of each user which are signed by a secret key of the certification authority device.

Also, in this aspect of the present invention, the secure communication service device can probabilistically identify an identity of the sender by reconstructing the official identification of the sender while judging identity of a plurality of anonymous identifications of the sender contained in a plurality of personalized access tickets used by the sender.

Also, in this aspect of the present invention, the system can further comprise: a certification authority device for issuing an anonymous identification of each user which contains at least one fragment of an official identification of each user by which each user is uniquely identifiable by the certification authority device and a link information of each anonymous identification by which each anonymous identification can be uniquely identified; wherein the sender's identification and the recipient's identification in the personalized access ticket can be given by a link information of the anonymous identification of the sender and a link information of the anonymous identification of the recipient.

Also, in this aspect of the present invention, the link information of each anonymous identification is an identifier uniquely assigned to each anonymous identification by the certification authority device.

Also, in this aspect of the present invention, the secure communication service device can probabilistically identify an identity of the sender by reconstructing the official identification of the sender while judging identity of a plurality of anonymous identifications of the sender corresponding to the link information contained in a plurality of personalized access tickets used by the sender.

Also, in this aspect of the present invention, the personalized access ticket can contain a single sender's identification and a single recipient's identification in 1-to-1 correspondence.

Also, in this aspect of the present invention, the personalized access ticket can contain a single sender's identification and a plurality of recipient's identifications in 1-to-N correspondence, where N is an integer greater than 1.

Also, in this aspect of the present invention, one identification among the single sender's identification and the plurality of recipient's identifications is a holder identification for identifying a holder of the personalized access ticket while other identifications among the single sender's identification and the plurality of recipient's identifications are member identifications for identifying members of a group to which the holder belongs.

Also, in this aspect of the present invention, the system can further comprises: a certification authority device for issuing to each user an identification of each user and an enabler of the identification of each user indicating a right to change the personalized access ticket containing the identification of each user as the holder identification; and a secure processing device at which prescribed processing on the personalized access ticket can be carried out only by a user who presented both the holder identification contained in the personalized access ticket and the enabler corresponding to the holder identification to the secure processing device.

Also, in this aspect of the present invention, the certification authority device issues the enabler of the identification of each user as an information indicating that it is the enabler and the identification of each user itself which are signed by a secret key of the certification authority device.

Also, in this aspect of the present invention, the prescribed processing includes a generation of a new personalized access ticket, a merging of a plurality of personalized access tickets, a splitting of one personalized access ticket into a plurality of personalized access tickets, a changing of the holder of the personalized access ticket, changing of a validity period of the personalized access ticket, and a changing of a transfer control flag of the personalized access ticket.

Also, in this aspect of the present invention, a special identification and a special enabler corresponding to the special identification which are known to all users can be defined such that the generation of a new personalized access ticket and the changing of the holder of the personalized access ticket can be carried out by the holder of the personalized access ticket by using the special identification and the special enabler without using an enabler of a member identification.

Also, in this aspect of the present invention, the special identification is defined to be capable of being used only as the holder identification of the personalized access ticket.

Also, in this aspect of the present invention, a special identification which is known to all users can be defined such that a read only attribute can be set to the personalized access ticket by using the special identification.

Also, in this aspect of the present invention, when the access right of the sender with respect to the recipient is verified according to the personalized access ticket, the secure communication service device takes out the recipient's identification from the personalized access ticket by using the sender's identification presented by the sender, converts the mail by using a taken out recipient's identification into a format that can be interpreted by a mail transfer function for actually carrying out a mail delivery processing, and gives the mail after conversion to the mail transfer function by attaching the personalized access ticket.

According to another aspect of the present invention there is provided a communication system realizing email access control, comprising: a certification authority device for defining an official identification of each user by which each user is uniquely identifiable by the certification authority device, and an anonymous identification of each user which contains at least one fragment of the official identification; and a communication network on which each user is identified by the anonymous identification of each user in communications for emails on the communication network.

Also, in this aspect of the present invention, the anonymous identification of each user is an information containing the at least one fragment of the official identification of each user which is signed by the certification authority device using a secret key of the certification authority device.

Also, in this aspect of the present invention, the official identification of each user is a character string uniquely assigned to each user by the certification authority device and a public key of each user which are signed by a secret key of the certification authority device.

Also, in this aspect of the present invention, the system can further comprises: a secure communication service device for connecting communications between the sender and the receiver on the communication network, by receiving a personalized access ticket containing a sender's anonymous identification and a recipient's anonymous identification in correspondence, which is presented by a sender who wishes to send an email to a recipient so as to specify the recipient as an intended destination of the email, and controlling accesses between the sender and the recipient by verifying an access right of the sender with respect to the recipient according to the personalized access ticket.

Also, in this aspect of the present invention, the secure communication service device can probabilistically identify an identity of the sender by reconstructing the official identification of the sender while judging identity of a plurality of anonymous identifications of the sender contained in a plurality of personalized access tickets used by the sender.

Also, in this aspect of the present invention, the certification authority device can also define a link information of each anonymous identification by which each anonymous identification can be uniquely identified, and each anonymous identification can also contain the link information of each anonymous identification.

Also, in this aspect of the present invention, the link information of each anonymous identification is an identifier uniquely assigned to each anonymous identification by the certification authority device.

Also, in this aspect of the present invention, the system can further comprise: a secure communication service device for connecting communications between the sender and the receiver on the communication network, by receiving a personalized access ticket containing a link information of a sender's anonymous identification and a link information of a recipient's anonymous identification in correspondence, which is presented by a sender who wishes to send an email to a recipient so as to specify the recipient as an intended destination of the email, and controlling accesses between the sender and the recipient by verifying an access right of the sender with respect to the recipient according to the personalized access ticket.

Also, in this aspect of the present invention, the secure communication service device can probabilistically identify an identity of the sender by reconstructing the official identification of the sender while judging identity of a plurality of link informations of anonymous identifications of the sender contained in a plurality of personalized access tickets used by the sender.

According to another aspect of the present invention there is provided a secure communication service device for use in a communication system realizing email access control, comprising: a computer hardware; and a computer software for causing the computer hardware to connect communications between the sender and the receiver, by receiving a personalized access ticket containing a sender's identification and a recipient's identification in correspondence, which is presented by a sender who wishes to send an email to a recipient so as to specify the recipient as an intended destination of the email, and controlling accesses between the sender and the recipient by verifying an access right of the sender with respect to the recipient according to the personalized access ticket.

Also, in this aspect of the present invention, the computer software causes the computer hardware to authenticate the personalized access ticket presented by the sender, and refuse a delivery of the email when the personalized access ticket presented by the sender has been altered.

Also, in this aspect of the present invention, the personalized access ticket is signed by a secret key of a secure processing device which issued the personalized access ticket, and the computer software causes the computer hardware to authenticate the personalized access ticket by verifying a signature of the secure processing device in the personalized access ticket using a public key of the secure processing device.

Also, in this aspect of the present invention, the computer software causes the computer hardware to also receive the sender's identification presented by the sender along with the personalized access ticket, check whether the sender's identification presented by the sender is contained in the personalized access ticket presented by the sender, and refuse a delivery of the email when the sender's identification presented by the sender is not contained in the personalized access ticket presented by the sender.

Also, in this aspect of the present invention, the personalized access ticket also contains a validity period indicating a period for which the personalized access ticket is valid, and the computer software causes the computer hardware to check the validity period contained in the personalized access ticket presented by the sender and refuse a delivery of the email when the personalized access ticket presented by the sender contains the validity period that has already been expired.

Also, in this aspect of the present invention, the computer software can cause the computer hardware to register in advance the personalized access ticket containing an identification of a specific user from which a delivery of emails to a specific registrant is to be refused as the sender's identification and an identification of the specific registrant as the recipient's identification, at the secure communication service device, and refuse a delivery of the email from the sender when the personalized access ticket presented by the sender is registered at the secure communication service device in advance.

Also, in this aspect of the present invention, the computer software can cause the computer hardware to delete the personalized access ticket registered at the secure communication service device upon request from the specific registrant who registered the personalized access ticket.

Also, in this aspect of the present invention, the personalized access ticket also contains a transfer control flag indicating whether or not the sender should be authenticated by the secure communication service device, and when the transfer control flag contained in the personalized access ticket indicates that the sender should be authenticated, the computer software causes the computer hardware to authenticate the sender's identification presented by the sender and refuse a delivery of the email when an authentication of the sender's identification fails.

Also, in this aspect of the present invention, the computer software causes the computer hardware to realize the authentication of the sender's identification by a challenge/response procedure between the sender and the secure communication service device.

Also, in this aspect of the present invention, the sender's identification and the recipient's identification in the personalized access ticket can be given by anonymous identifications of the sender and the recipient, where an anonymous identification of each user contains at least one fragment of an official identification of each user by which each user is uniquely identifiable by a certification authority, and the computer software can also cause the computer hardware to probabilistically identify an identity of the sender by reconstructing the official identification of the sender by judging identity of a plurality of anonymous identifications of the sender contained in a plurality of personalized access tickets used by the sender.

Also, in this aspect of the present invention, an anonymous identification of each user that contains at least one fragment of an official identification of each user by which each user is uniquely identifiable by a certification authority and a link information of each anonymous identification by which each anonymous identification can be uniquely identified can be defined, the sender's identification and the recipient's identification in the personalized access ticket can be given by a link information of the anonymous identification of the sender and a link information of the anonymous identification of the recipient, and the computer software can also cause the computer hardware to probabilistically identify an identity of the sender by reconstructing the official identification of the sender by judging identity of a plurality of anonymous identifications of the sender corresponding to the link information contained in a plurality of personalized access tickets used by the sender.

Also, in this aspect of the present invention, when the access right of the sender with respect to the recipient is verified according to the personalized access ticket, the computer software causes the computer hardware to take out the recipient's identification from the personalized access ticket by using the sender's identification presented by the sender, convert the mail by using a taken out recipient's identification into a format that can be interpreted by a mail transfer function for actually carrying out a mail delivery processing, and give the mail after conversion to the mail transfer function by attaching the personalized access ticket.

According to another aspect of the present invention there is provided a secure processing device for use in a communication system realizing email access control, comprising: a computer hardware; and a computer software for causing the computer hardware to receive a request for a personalized access ticket from a user, and issue a personalized access ticket containing a sender's identification and a recipient's identification in correspondence, which is signed by a secret key of the secure processing device.

According to another aspect of the present invention there is provided a directory service device for use in a communication system realizing email access control, comprising: a computer hardware; and a computer software for causing the computer hardware to manage an identification of each registrant and a disclosed information of each registrant which has a lower secrecy than a personal information, in a state which is accessible for search by unspecified many, and issue a personalized access ticket containing a sender's identification and a recipient's identification in correspondence, to the sender in response to search conditions specified by the sender, by using an identification of a registrant whose disclosed information matches the search conditions as the recipient's identification and the sender's identification specified by the sender along with the search conditions.

According to another aspect of the present invention there is provided a certification authority device for use in a communication system realizing email access control, comprising: a computer hardware; and a computer software for causing the computer hardware to issue to each user an official identification of each user by which each user is uniquely identifiable by the certification authority device, and an anonymous identification of each user which contains at least one fragment of the official identification.

According to another aspect of the present invention there is provided a certification authority device for use in a communication system realizing email access control, comprising: a computer hardware; and a computer software for causing the computer hardware to issue to each user an identification of each user and an enabler of the identification of each user indicating a right to change any personalized access ticket that contains the identification of each user as a holder identification, where the persnalized access ticket generally contains a sender's identification and a plurality of recipient's identifications in correspondence, and one of the sender's identification and the recipient's identifications is a holder identification.

According to another aspect of the present invention there is provided a secure processing device for use in a communication system realizing email access control, comprising: a computer hardware; and a computer software for causing the computer hardware to receive from a user a request for prescribed processing on a personalized access ticket containing a sender's identification and a plurality of recipient's identifications in correspondence, where one of the sender's identification and the recipient's identifications is a holder identification, and execute the prescribed processing on the personalized access ticket when the user presented both the holder identification contained in the personalized access ticket and an enabler corresponding to the holder identification which indicates a right to change the personalized access ticket containing the identification of the user as the holder identification.

According to another aspect of the present invention there is provided a computer usable medium having computer readable program code means embodied therein for causing a computer to function as a secure communication service device for use in a communication system realizing email access control, the computer readable program code means includes: first computer readable program code means for causing said computer to receive a personalized access ticket containing a sender's identification and a recipient's identification in correspondence, which is presented by a sender who wishes to send an email to a recipient so as to specify the recipient as an intended destination of the email; and second computer readable program code means for causing said computer to control accesses between the sender and the recipient by verifying an access right of the sender with respect to the recipient according to the personalized access ticket, so as to connect communications between the sender and the receiver on the communication network.

Also, in this aspect of the present invention, the second computer readable program code means causes said computer to authenticate the personalized access ticket presented by the sender, and refuse a delivery of the email when the personalized access ticket presented by the sender has been altered.

Also, in this aspect of the present invention, the personalized access ticket is signed by a secret key of a secure processing device which issued the personalized access ticket, and the second computer readable program code means causes said computer to authenticate the personalized access ticket by verifying a signature of the secure processing device in the personalized access ticket using a public key of the secure processing device.

Also, in this aspect of the present invention, the first computer readable program code means causes said computer to also receive the sender's identification presented by the sender along with the personalized access ticket, and the second computer readable program code means causes said computer to check whether the sender's identification presented by the sender is contained in the personalized access ticket presented by the sender and refuse a delivery of the email when the sender's identification presented by the sender is not contained in the personalized access ticket presented by the sender.

Also, in this aspect of the present invention, the personalized access ticket also contains a validity period indicating a period for which the personalized access ticket is valid, and the second computer readable program code means causes said computer to check the validity period contained in the personalized access ticket presented by the sender and refuse a delivery of the email when the personalized access ticket presented by the sender contains the validity period that has already been expired.

Also, in this aspect of the present invention, the second computer readable program code means can cause said computer to register in advance the personalized access ticket containing an identification of a specific user from which a delivery of emails to a specific registrant is to be refused as the sender's identification and an identification of the specific registrant as the recipient's identification, at the secure communication service device, and refuse a delivery of the email from the sender when the personalized access ticket presented by the sender is registered at the secure communication service device in advance.

Also, in this aspect of the present invention, the second computer readable program code means can cause said computer to delete the personalized access ticket registered at the secure communication service device upon request from the specific registrant who registered the personalized access ticket.

Also, in this aspect of the present invention, the personalized access ticket also contains a transfer control flag indicating whether or not the sender should be authenticated by the secure communication service device, and when the transfer control flag contained in the personalized access ticket indicates that the sender should be authenticated, the second computer readable program code means causes said computer to authenticate the sender's identification presented by the sender and refuse a delivery of the email when an authentication of the sender's identification fails.

Also, in this aspect of the present invention, the second computer readable program code means causes said computer to realize the authentication of the sender's identification by a challenge/response procedure between the sender and the secure communication service device.

Also, in this aspect of the present invention, the sender's identification and the recipient's identification in the personalized access ticket can be given by anonymous identifications of the sender and the recipient, where an anonymous identification of each user contains at least one fragment of an official identification of each user by which each user is uniquely identifiable by a certification authority, and the second computer readable program code means can also cause said computer to probabilistically identify an identity of the sender by reconstructing the official identification of the sender by judging identity of a plurality of anonymous identifications of the sender contained in a plurality of personalized access tickets used by the sender.

Also, in this aspect of the present invention, an anonymous identification of each user that contains at least one fragment of an official identification of each user by which each user is uniquely identifiable by a certification authority and a link information of each anonymous identification by which each anonymous identification can be uniquely identified can be defined, the sender's identification and the recipient's identification in the personalized access ticket can be given by a link information of the anonymous identification of the sender and a link information of the anonymous identification of the recipient, and the second computer readable program code means can also cause said computer to probabilistically identify an identity of the sender by reconstructing the official identification of the sender by judging identity of a plurality of anonymous identifications of the sender corresponding to the link information contained in a plurality of personalized access tickets used by the sender.

Also, in this aspect of the present invention, when the access right of the sender with respect to the recipient is verified according to the personalized access ticket, the second computer readable program code means causes said computer to take out the recipient's identification from the personalized access ticket by using the sender's identification presented by the sender, convert the mail by using a taken out recipient's identification into a format that can be interpreted by a mail transfer function for actually carrying out a mail delivery processing, and give the mail after conversion to the mail transfer function by attaching the personalized access ticket.

According to another aspect of the present invention there is provided a computer usable medium having computer readable program code means embodied therein for causing a computer to function as a secure processing device for use in a communication system realizing email access control, the computer readable program code means includes: first computer readable program code means for causing said computer to receive a request for a personalized access ticket from a user; and second computer readable program code means for causing said computer to issue the personalized access ticket containing a sender's identification and a recipient's identification in correspondence, which is signed by a secret key of the secure processing device.

According to another aspect of the present invention there is provided a computer usable medium having computer readable program code means embodied therein for causing a computer to function as a directory service devicer for use in a communication system realizing email access control, the computer readable program code means includes: first computer readable program code means for causing said computer to manage an identification of each registrant and a disclosed information of each registrant which has a lower secrecy than a personal information, in a state which is accessible for search by unspecified many, and second computer readable program code means for causing said computer to issue a personalized access ticket containing a sender's identification and a recipient's identification in correspondence, to the sender in response to search conditions specified by the sender, by using an identification of a registrant whose disclosed information matches the search conditions as the recipient's identification and the sender's identification specified by the sender along with the search conditions.

According to another aspect of the present invention there is provided a computer usable medium having computer readable program code means embodied therein for causing a computer to function as a certification authority device for use in a communication system realizing email access control, the computer readable program code means includes: first computer readable program code means for causing said computer to issue to each user an official identification of each user by which each user is uniquely identifiable by the certification authority device; and second computer readable program code means for causing said computer to issue to each user an anonymous identification of each user which contains at least one fragment of the official identification.

According to another aspect of the present invention there is provided a computer usable medium having computer readable program code means embodied therein for causing a computer to function as a certification authority device for use in a communication system realizing email access control, the computer readable program code means includes: first computer readable program code means for causing said computer to issue to each user an identification of each user; and second computer readable program code means for causing said computer to issue to each user an enabler of the identification of each user indicating a right to change any personalized access ticket that contains the identification of each user as a holder identification, where the persnalized access ticket generally contains a sender's identification and a plurality of recipient's identifications in correspondence, and one of the sender's identification and the recipient's identifications is a holder identification.

According to another aspect of the present invention there is provided a computer usable medium having computer readable program code means embodied therein for causing a computer to function as a secure processing device for use in a communication system realizing email access control, the computer readable program code means includes: first computer readable program code means for causing said computer to receive from a user a request for prescribed processing on a personalized access ticket containing a sender's identification and a plurality of recipient's identifications in correspondence, where one of the sender's identification and the recipient's identifications is a holder identification; and second computer readable program code means for causing said computer to execute the prescribed processing on the personalized access ticket when the user presented both the holder identification contained in the personalized access ticket and an enabler corresponding to the holder identification which indicates a right to change the personalized access ticket containing the identification of the user as the holder identification.

Other features and advantages of the present invention will become apparent from the following description taken in conjunction with the accompanying drawings.

BRIEF DESCRIPTION OF THE DRAWINGS

FIG. 2 is a diagram showing exemplary data structures of an official identification, an anonymous identification, and a 1-to-1 personalized access ticket according to the first embodiment of the present invention.

FIG. 8 is a diagram showing exemplary data structures of an official identification, an anonymous identification, and a 1-to-N personalized access ticket according to the second embodiment of the present invention.

FIG. 25 is a diagram showing an exemplary data structure of Null-AID used in the third embodiment of the present invention.

FIG. 26 is a diagram showing an exemplary data structure of Enabler of Null-AID used in the third embodiment of the present invention.

FIG. 40 is a diagram showing exemplary data structures of an official identification, a link information attached anonymous identification, and a link specifying 1-to-N personalized access ticket according to the seventh embodiment of the present invention.

FIG. 49 is a flow chart for a link specifying anonymous identification list generation processing (for MakePAT, MergePAT, SplitPAT and TransPAT) according to the seventh embodiment of the present invention.

DETAILED DESCRIPTION OF THE PREFERRED EMBODIMENTS

Figure 1:
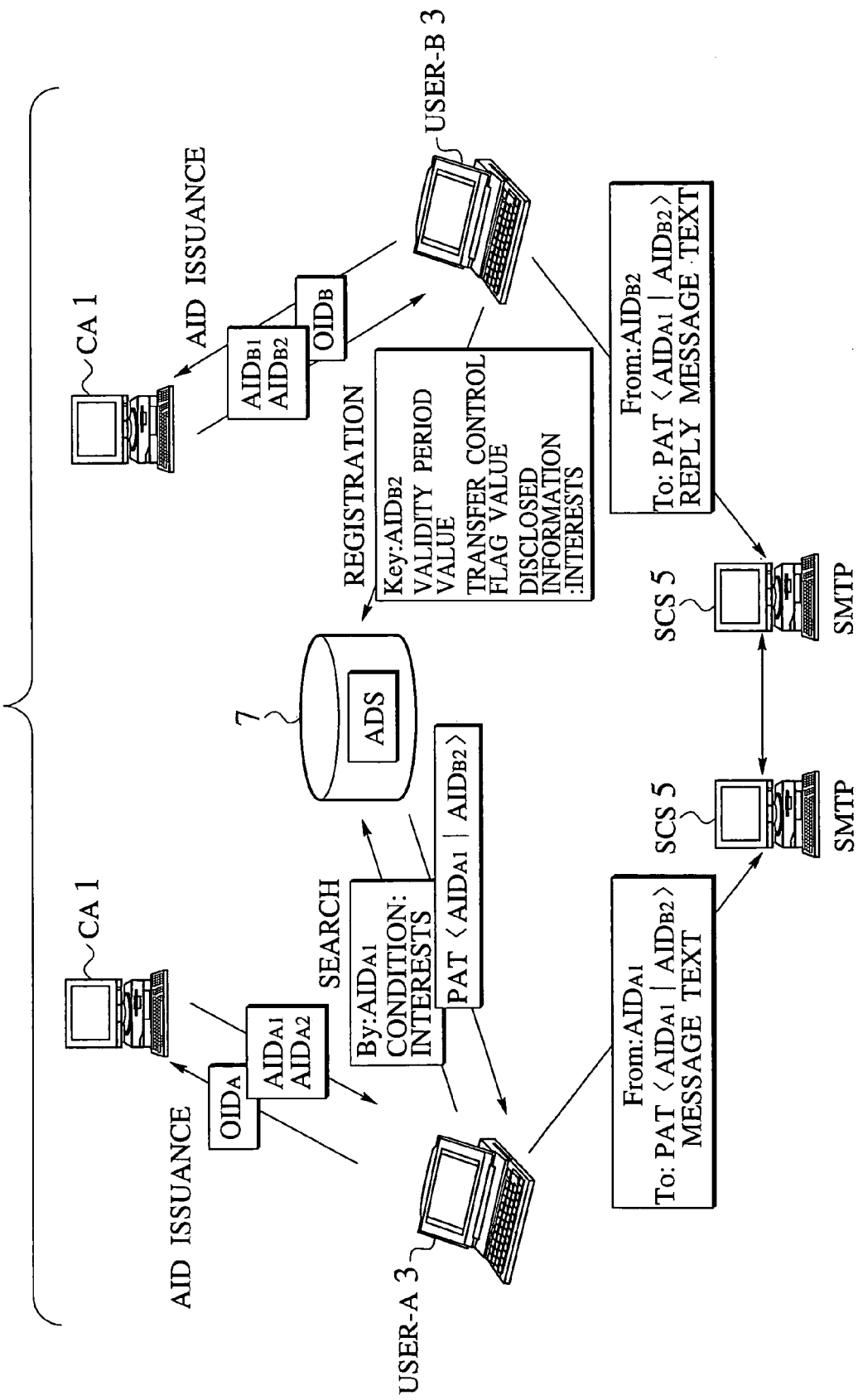
FIG. 1 is a diagram showing an overall configuration of a communication system according to the first embodiment of the present invention.

Referring now to FIG. 1 to FIG. 7, the first embodiment of the email access control scheme according to the present invention will be described in detail.

The email access control scheme of the present invention enables bidirectional communications between a sender and a recipient appropriately while maintaining anonymity of a sender and a recipient on a communication network. Basically, this is realized by disclosing only information indicative of characteristics of recipients in a state of concealing true identifiers of the recipients, and assigning limited access rights with respect to those who wish to carry out communications while maintaining the anonymity according to the disclosed information.

More specifically, an Anonymous Identification (abbreviated hereafter as AID) that functions as a role identifier in which a personal information is concealed is assigned to a user, and this AID is disclosed on the network in combination with an information indicative of characteristics of the user such as his/her interests, age, job, etc., which cannot be used in identifying the user on the network but which can be useful for a sender in judging whether or not it is worth communicating with that user.

Also, the sender can search out a recipient with whom he/she wishes to communicate by reading or searching through the disclosed information. Namely, in the case where the sender wishes to communicate with a recipient while maintaining his/her own anonymity, the sender specifies the AID of that recipient and acquires a Personalized Access Ticket (abbreviated hereafter as PAT). The PAT contains the AIDs of the sender and the recipient as well as information regarding a transfer control flag and a validity period. The transfer control flag is used in order to determine whether a Secure Communication Service (abbreviated hereafter as SCS) to be described below carries out the authentication with respect to the sender. Namely, when the transfer control flag is set ON, the SCS will carry out the authentication such as signature verification for example, with respect to the sender at a time of the connection request. On the other hand, when the transfer control flag is set OFF, the SCS will give the connection request to a physical communication network to which the SCS is connected, without carrying out the authentication. In other words, the transfer control is used in order to verify whether or not the AID is properly utilized by the user to whom it is allocated by a Certification Authority (abbreviated hereafter as CA).

In the communication network realizing the email access control scheme of the present invention, the assignment of AIDs with respect to users, the maintenance of information disclosed in combination with AIDs, the issuance of PATs, and the email access control based on PATs are realized by separate organizations. This is because it is more convenient to realize them by separate organizations from a perspective of maintaining the security of the entire network, since security levels to be maintained in relation to respective actions are different. Note however that the maintenance of the disclosed information and the issuance of PATs may be realized by the same organization.

FIG. 1 shows an overall-configuration of a communication system in this first embodiment, which is directed to the email service on Internet or Intranet.

In FIG. 1, the CA (Certification Authority) 1 has a right to authenticate an Official Identification (abbreviated hereafter as OID) that identifies each individual and a right to issue AIDs, and functions to generate AIDs from OIDs and allocate AIDs to users 3.

The SCS (Secure Communication Service) 5 Judges whether or not to admit a connection in response to a connection request by an email from a user 3, according to the PAT (Personalized Access Ticket) presented from a user 3. The SCS 5 also rejects a connection request by an email according to a request from a user 3. The SCS 5 also judges the identity of OIDs according to a request from a user 3.

An Anonymous Directory Service (abbreviated hereafter as ADS) 7 is a database for managing the AID, the transfer control flag value, the validity period value, and the disclosed information (such as interests, which can be regarded as requiring a lower secrecy compared with a personal information such as name, telephone number, and real email address) of each user 3. The ADS 7 has a function to generate the PAT from the AID of a user 3 who presented search conditions, the AID of a user 3 who has been registering the disclosed information that matches the search conditions in the ADS 7, the transfer control flag value given from a user 3 or administrators of the ADS, and the validity period value given from a user 3 or administrators of the ADS, and then allocate the PAT to a user 3 who presented the search conditions.

First, a series of processing from generating the AID from the OID according to a request from a user until allocating the AID to that user will be described.

FIG. 2 shows exemplary formats of the OID, the AID, and the PAT. As shown in a part (a) of FIG. 2, the OID is an information comprising an arbitrary character string according to a rule by which the CA 1 can uniquely identify the user and a public key, which is signed by the CA 1 using a secret key of the CA 1.

Also, as shown in a part (b) of FIG. 2, the AID is an information comprising fragments of the OID and their position information, redundant character strings, and an SCS information given by an arbitrary character string (host name, real domain name, etc.) by which a host or a domain that is operating the SCS 5 can be uniquely identified on the network, which is signed by the CA 1 using the secret key of the CA 1.

Also, as shown in a part (c) of FIG. 2, the PAT is an information comprising the transfer control flag, $AID_0$, $AID_1$, and the validity period, which is signed by the ADS 7 using a secret key of the ADS 7. Here, the transfer control flag value is defined to take either 0 or 1. Also, the validity period is defined by any one or combination of the number of times for which the PAT is available, the absolute time (UTC) by which the PAT becomes unavailable, the absolute time (UTC) by which the PAT becomes available, and the relative time (lifetime) since the PAT becomes available until it becomes unavailable.

Note that, as will be explained in the subsequent embodiments described below, in addition to the 1-to-1 PAT which sets one sender and one recipient in correspondence as described above, the present invention can also use a 1-to-N PAT which sets one sender and N recipients, as well as a link specifying PAT which specifies the AID by a link information that is capable of specifying the AID instead of specifying the AID itself in the PAT. The link specifying PAT can be either a link specifying 1-to-1 PAT or a link specifying 1-to-N PAT depending on the correspondence relationship between the sender and the recipients as described above. Namely, the PAT of the present invention can be given in four types: 1-to-1 PAT, 1-to-N PAT, link specifying 1-to-1 PAT, and link specifying 1-to-N PAT.

Next, a procedure by which the user 3 requests the AID to the CA 1 will be described. The user 3 generates a pair of a secret key and a public key. Then, the user 3 and the CA 1 carries out the bidirectional authentication using the OID of the user 3 and the certificate of the CA 1, and the user 3 transmits the public key to the CA 1 by arbitrary means. Here, there can be cases where communications between the user 3 and the CA 1 are to be encrypted.

Next, a procedure by which the CA 1 issues the AID to the user 3 in response to a request for the AID as described above will be described. Upon receiving the public key from the user 3, the CA 1 generates the AID. Then, the CA 1 transmits the AID to the user 3 by arbitrary means. Upon receiving the AID from the CA 1, the user 3 stores the received AID into its storage device. Here, there can be cases where communications between the user 3 and the CA 1 are to be encrypted.

Next, the AID generation processing at the CA will be described with reference to FIG. 3.

Figure 3:
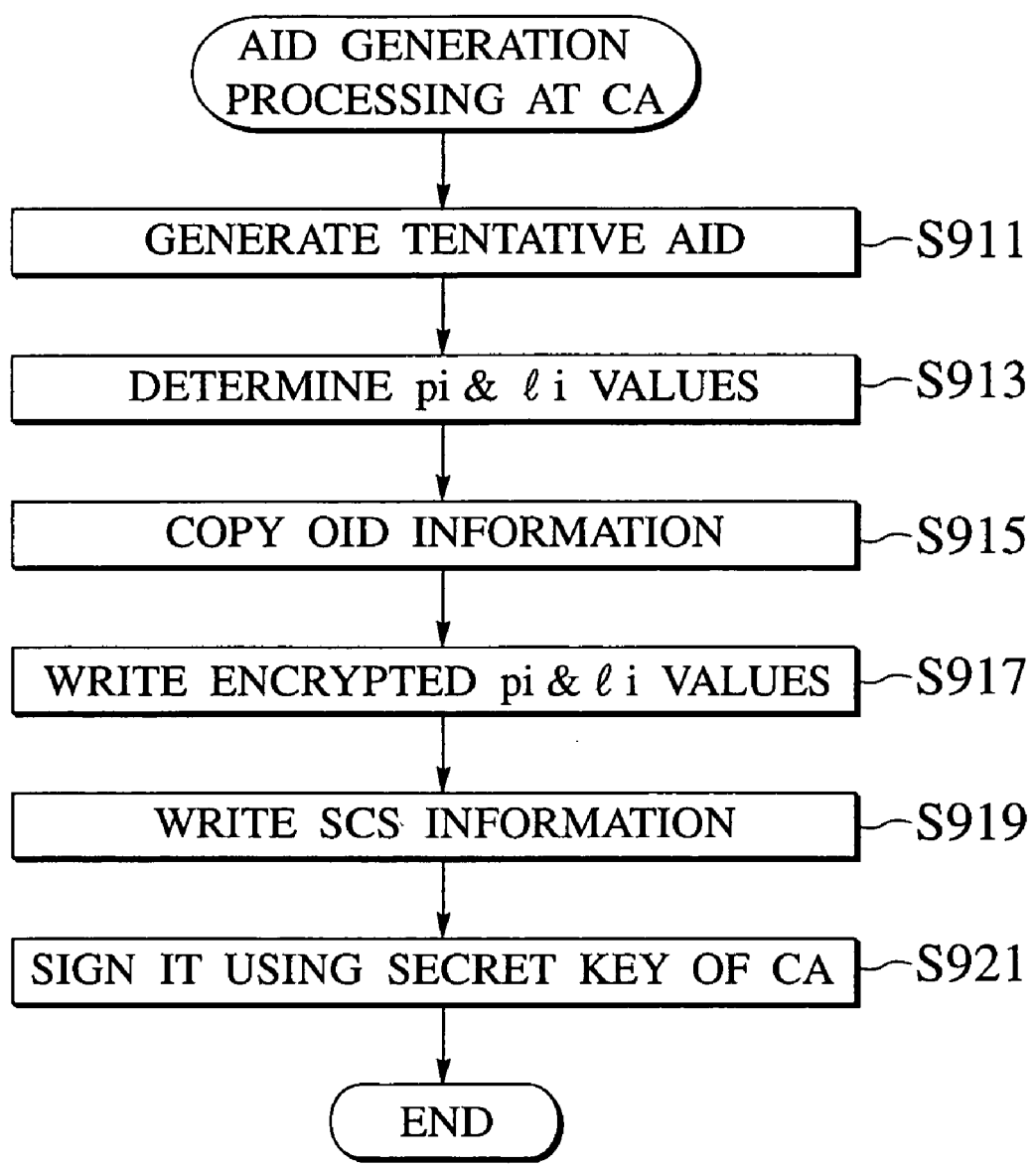
FIG. 3 is a flow chart for an anonymous identification generation processing at a certification authority according to the first embodiment of the present invention.

In the procedure of FIG. 3, the CA 1 generates an information of a length equal to the total length L of the OID, and sets this information as a tentative AID (step S911). Then, in order to carry out the partial copying of the OID, values of parameters $p_i$ and $l_i$ for specifying a copying region are determined using arbitrary means such as random number generation respectively (step S913). Here, L is equal to the total length L of the OID, and $l_i$ is an arbitrarily defined value within a range in which a relationship of $0 \leq l_i \leq L$ holds. Then, an information in a range between a position $p_i$ to a position $p_i+l_i$ from the top of the OID is copied to the same positions in the tentative AID (step S915). In other words, this OID fragment will be copies to a range between a position $p_i$ and a position $p_i+l_i$ from the top of the tentative AID. Then, the values of $p_i$ and $l_i$ are written into a prescribed range in the tentative AID into which the OID has been partially copied, in a form encrypted by an arbitrary means (step S917). Then, an SCS information given by an arbitrary character string (host name, real domain, etc.) that can uniquely identify a host or a domain that is operating the SCS 5 on the network is written into a prescribed range in the tentative AID into which these values are written (step S919). Then, the tentative AID into which the above character string is written is signed using a secret key of the CA 1 (step S921).

Next, a procedure for registering the AID of a user-B 3 and the disclosed information into the ADS 7 will be described. First, the bidirectional authentication by arbitrary means using the AID of the user-B 3 and the certificate of the ADS 7 is carried out between the user-B 3 who is a registrant and the ADS 7. Then, the user-B 3 transmits the transfer control flag value, the validity period value, and the disclosed information such as interests to the ADS 7. Then, the ADS 7 stores the transfer control flag value, the validity period value, and the entire disclosed information in relation to the AID of the user-B 3 in its storage device. Here, there can be cases where communications between the user-B 3 who is the registrant and the ADS 7 are to be encrypted.

Next, a procedure by which a user-A 3 searches through the disclosed information that is registered in the ADS 7 will be described. First, the bidirectional authentication by arbitrary means using the AID of the user-A 3 and the certificate of the ADS 7 is carried out between the user-A 3 who is a searcher and the ADS 7. Then, the user-A 3 transmits arbitrary search conditions to the ADS 7. Then, the ADS 7 presents all the received search conditions to its storage device, and extracts the AID of a registrant which satisfies these search conditions. Then, the ADS 7 generates the PAT from the AID of the user-A 3, the AID of the registrant who satisfied all the search conditions, the transfer control flag value, and the validity period value. Then, the ADS 7 transmits the generated PAT to the user-A 3. Here, there can be cases where communications between the user-A 3 who is a searcher and the ADS 7 are to be encrypted. Note that the 1-to-1 PAT is generated as a search result of the ADS 7.

Figure 4:
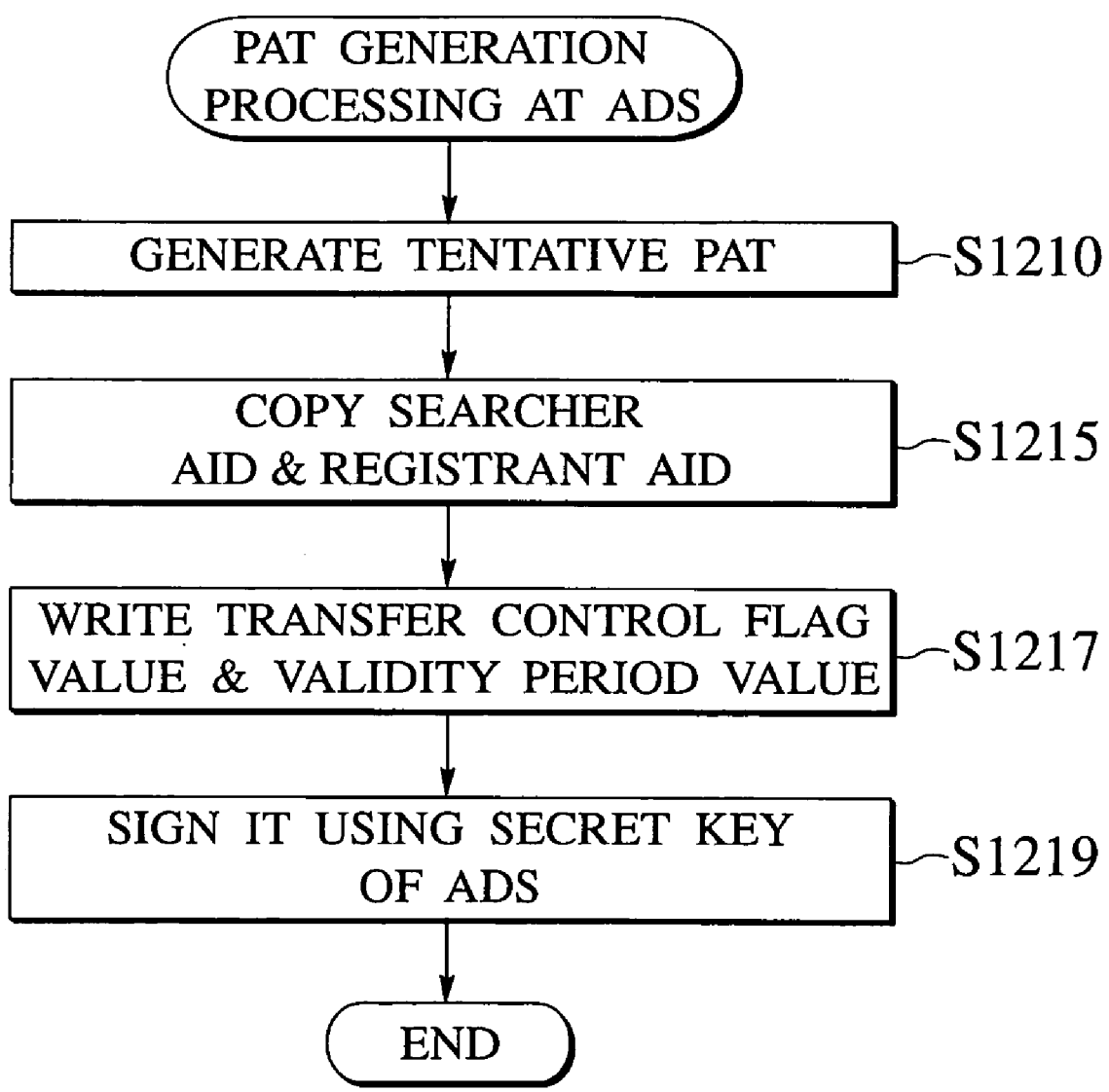
FIG. 4 is a flow chart for a personalized access ticket generation processing at an anonymous directory service according to the first embodiment of the present invention.

Next, the 1-to-1 PAT generation processing at the ADS 7 will be described with reference to FIG. 4.

First, an information of a prescribed length is generated, and this information is set as a tentative PAT (step S1210). Then, the AID of the user-A 3 who is a searcher and the AID of the user-B 3 who is a registrant are copied into a prescribed region of the tentative PAT (step S1215). Then, the transfer control flag value and the validity period value are written into respective prescribed regions of the tentative PAT into which the AIDs are copied (step S1217). Then, the tentative PAT into which these values are written is signed using a secret key of the ADS 7 (step S1219).

Next, the transfer control using the 1-to-1 PAT will be described. The transfer control is a function for limiting accesses to a user who has a proper access right from a third person to whom the PAT has been transferred or who has eavesdropped the PAT (a user who originally does not have the access right).

The ADS 7 and the user-B 3 of the registrant AID can prohibit a connection to the user-B 3 from a third person who does not have the access right, by setting a certain value in to the transfer control flag of the PAT.

When the transfer control flag value is set to be 1, the sender's AID is authenticated between the SCS 5 and the sender according to an arbitrary challenge/response process, so that even if the sender gives both the sender's AID and the PAT to another user other than the sender, that another user will not be able to make a connection to the registrant of the ADS 7 through the SCS 5.

On the other hand, when the transfer control flag value is set to be 0, no challenge/response process will be carried out between the SCS 5 and the sender, so that if the sender gives both the sender's AID and the PAT to another user other than the sender, that another user will also be able to make a connection to the registrant of the ADS 7 through the SCS 5.

Figure 5:
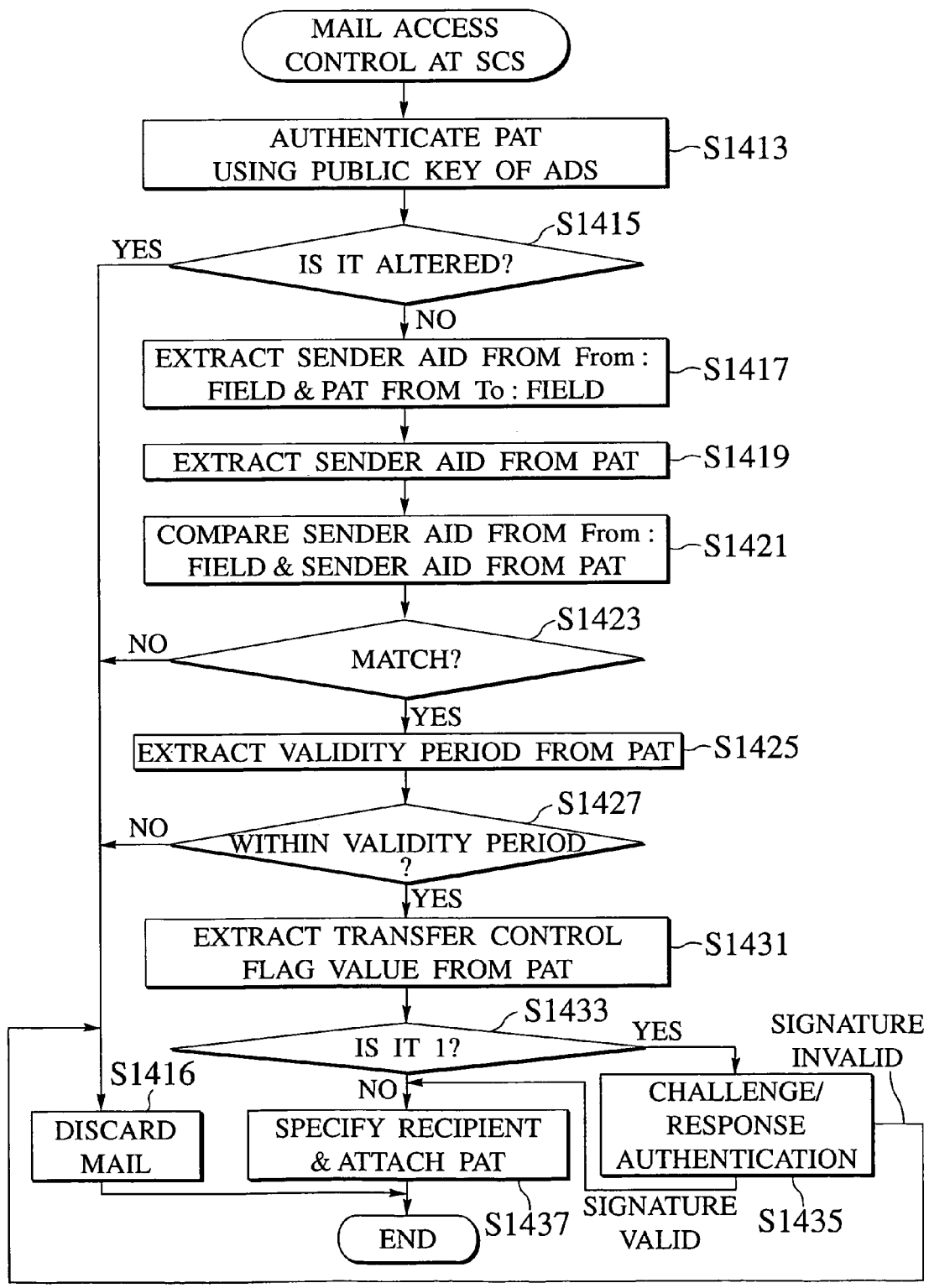
FIG. 5 is a flow chart for a mail access control processing at a secure communication service according to the first embodiment of the present invention.

Next, the email access control method at the SCS 5 will be described with reference to FIG. 5.

The sender specifies "[sender's AID]@[real domain of SCS of sender]" in From: line, and "[PAT]@[real domain of SCS of sender]" in To: line.

The SCS 5 acquires a mail received by an MTA (Message Transfer Agent) such as SMTP (Simple Mail Transfer Protocol), and executes the processing of FIG. 5 as follows.

(1) The signature of the PAT is verified using a public key of the ADS 7 (step S1413).

When the PAT is found to have been altered (step S1415 YES), the mail is discarded and the processing is terminated (step S1416).

When the PAT is found to have been not altered (step S1415 NO), the following processing (2) is executed.

(2) The search is carried out by presenting the sender's AID to the PAT (steps S1417, S1419, S1421).

When an AID that completely matches with the sender's AID is not contained in the PAT (step S1423 NO), the mail is discarded and the processing is terminated (step S1416).

When an AID that completely matches with the sender's AID is contained in the PAT (step S1423 YES), the following processing (3) is executed.

(3) The validity period value of the PAT is evaluated (steps S1425, S1427).

When the PAT is outside the validity period (step S1427 NO), the mail is discarded and the processing is terminated (step S1416).

When the PAT is within the validity period (step S1427 YES), the following processing (4) is executed.

(4) Whether or not to authenticate the sender is determined by referring to the transfer control flag value of the PAT (steps S1431, S1433).

When the value is 1 (step S1433 YES), the challenge/response authentication between the SCS 5 and the sender is carried out, and the signature of the sender is verified (step S1435). When the signature is valid, the recipient is specified and the PAT is attached (step S1437). When the signature is invalid, the mail is discarded and the processing is terminated (step S1416).

When the value is 0 (step S1433 NO), the recipient is specified and the PAT is attached without executing the challenge/response authentication (step S1437).

Next, an exemplary challenge/response authentication between the SCS 5 and the sender will be described.

First, the SCS 5 generates an arbitrary information such as a timestamp, for example, and transmits the generated information to the sender.

Then, the sender signs the received information using a secret key of the sender's AID and transmits it along with a public key of the sender's AID.

The SCS 5 then verifies the signature of the received information using the public key of the sender's AID. When the signature is valid, the recipient is specified and the PAT is attached. When the signature is invalid, the mail is discarded and the processing is terminated.

Next, a method for specifying the recipient at the SCS 5 will be described. First, the SCS 5 carries out the search by presenting the sender's AID to the PAT, so as to acquire all the AIDs which do not completely match the sender's AID. All these acquired AIDs will be defined as recipient's AIDs hereafter. Then, for every recipient's AID, the real domain of SCS of recipient is taken out from the recipient's AID. Then, the recipient is specified in a format of "[recipient's AID]@[real domain of SCS of recipient]". Finally, the SCS 5 changes the sender from a format of "[sender's AID]@[real domain of SCS of sender]" to a format of "sender's AID".

Next, a method for attaching the PAT at the SCS 5 will be described. The SCS 5 attaches the PAT to an arbitrary position in the mail. The SCS 5 gives the mail to the MTA after specifying the sender and the recipient and attaching the PAT.

Note that all the processings described above are the same in the case of the 1-to-N PAT.

Next, a method of receiving refusal with respect to the PAT at the SCS 5 will be described.

Receiving refusal setting: The bidirectional authentication is carried out by an arbitrary means between the user and the SCS 5. Then; the user transmits a registration command, his/her own AID, and arbitrary PATs to the SCS 5. Then, the SCS 5 verifies the signature of the received AID. If the signature is invalid, the processing of the SCS 5 is terminated. If the signature is valid, the SCS 5 next verifies the signature of each received PAT using a public key of the ADS. Those PATs with the invalid signature are discarded by the SCS 5. When the signature is valid, the SCS 5 carries out the search by presenting the received AID to each PAT. For each of those PATs which contain the AID that completely matches with the received AID, the SCS 5 presents the registration commands and the PAT to the storage device such that the PAT is registered into the storage device. Those PATs which do not contain the AID that completely matches with the received AID are discarded by the SCS 5 without storing them into the storage device. Here, there can be cases where communications between the user and the SCS 5 are to be encrypted.

Receiving refusal execution: The SCS 5 carries out the search by presenting the PAT to the storage device. When a PAT that completely matches the presented PAT is registered in the storage device, the mail is discarded. When a PAT that completely matches the present PAT is not registered in the storage device, the mail is not discarded.

Receiving refusal cancellation: The bidirectional authentication is carried out by an arbitrary means between the user and the SCS 5. Then, the user presents his/her own AID to the SCS 5. Then, the SCS 5 verifies the signature of the received AID. If the signature is invalid, the processing of the SCS 5 is terminated. If the signature is valid, the SCS 5 next presents the presented AID as a search condition to the storage device and acquire all the PATs that contain the presented AID, and then presents all the acquired PATs to the user. Then, the user selects all the PATs for which the receiving refusal is to be cancelled by referring to all the PATs presented from the SCS 5, and transmits all the selected PATs along with a deletion command to the SCS 5. Upon receiving the deletion command and all the PATs for which the receiving refusal is to be cancelled, the SCS 5 presents the deletion command and all the PATs received from the user to the storage device, such that all the received PATs are deleted from the storage device.

Note that the method of receiving refusal with respect to the 1-to-N PAT at the SCS 5 is the same as the method of receiving refusal with respect to the 1-to-1 PAT described above.

Note also the the case of returning of a mail from the user-B to the user-A is the same as in the case of transmitting a mail from the user-A to the user-B.

Figure 6:
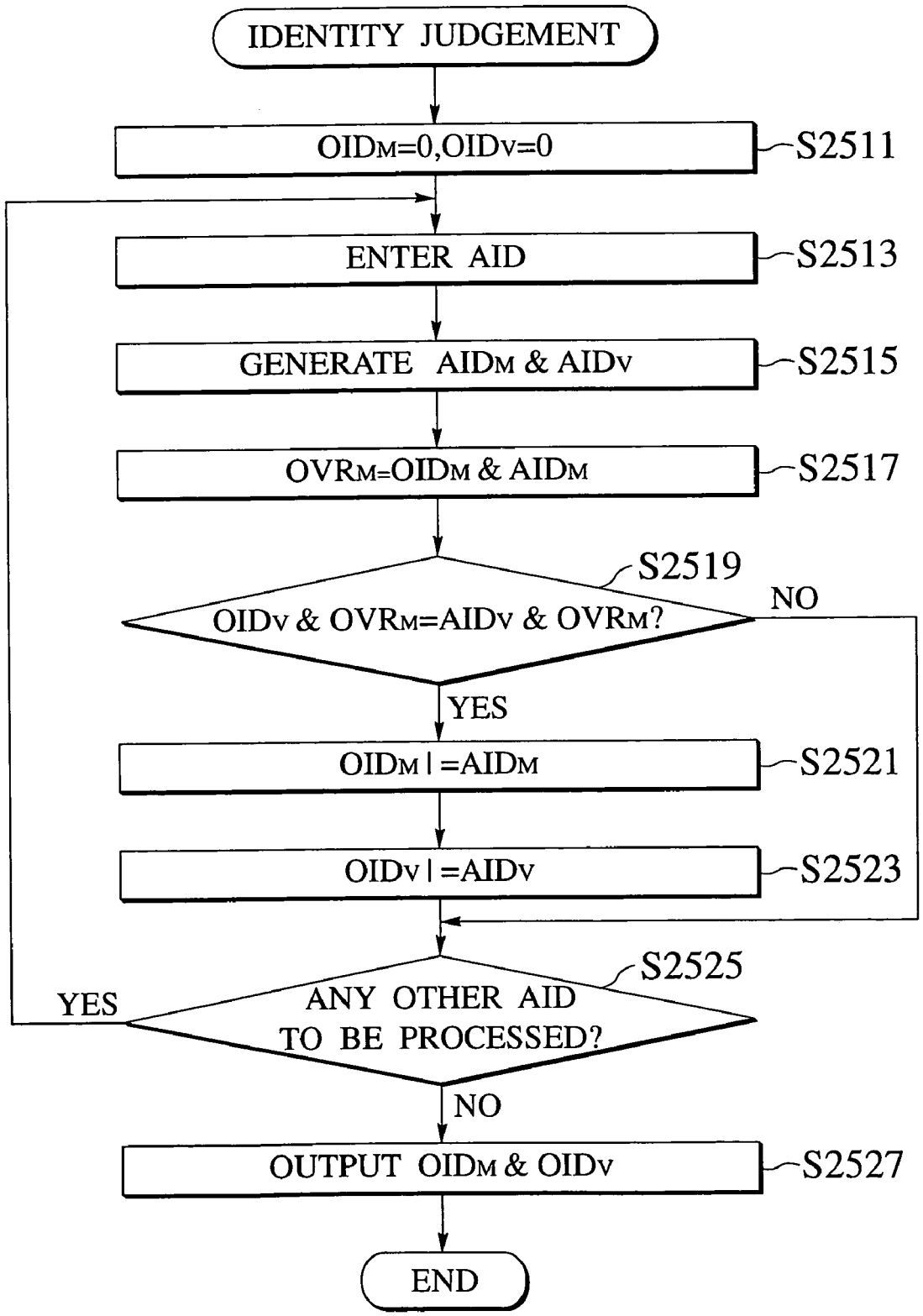
FIG. 6 is a flow chart for an anonymous identification identity judgement processing at a secure communication service according to the first embodiment of the present invention.
Figure 7:
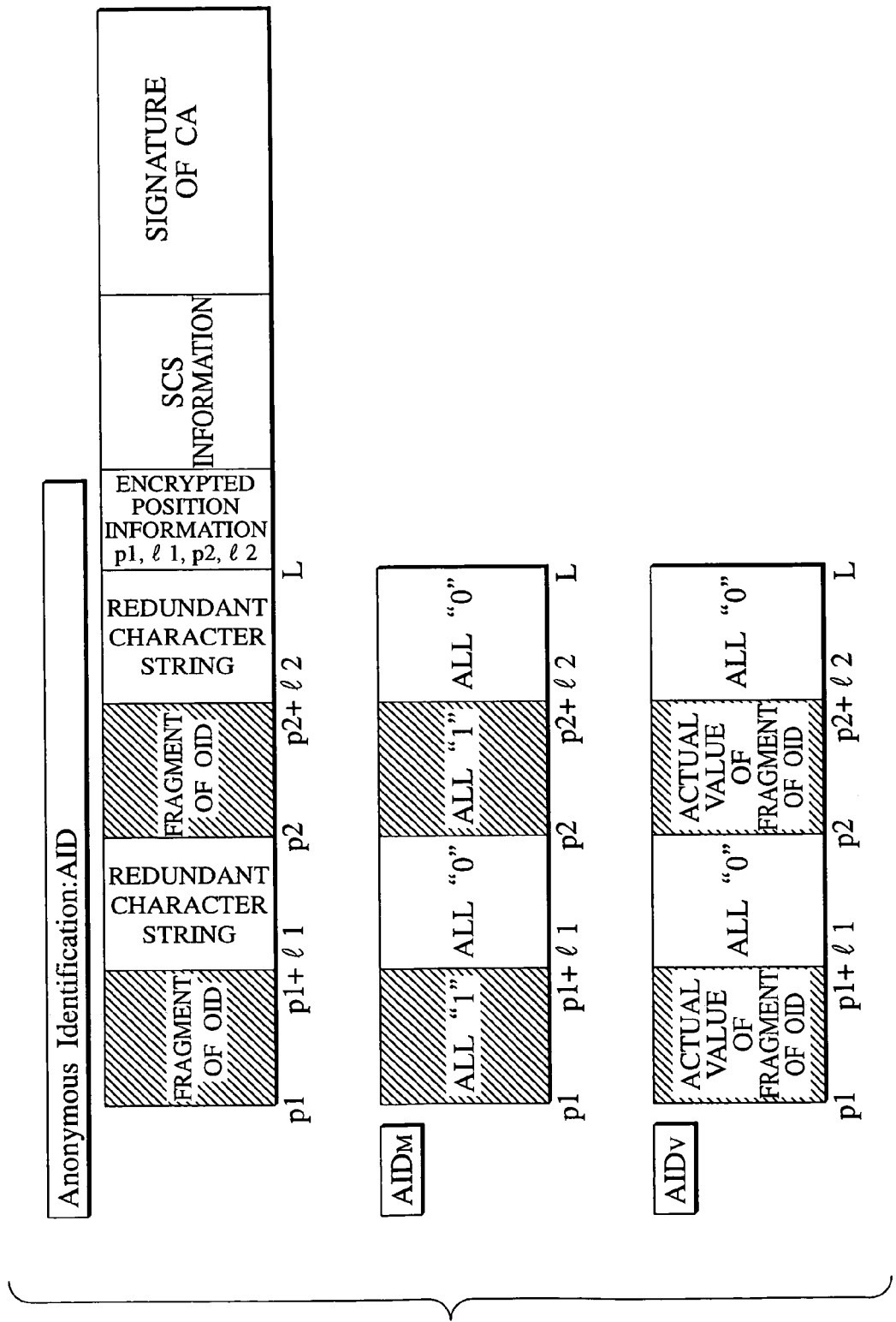
FIG. 7 is a diagram showing exemplary data structures of data used in the anonymous identification identity judgement processing of FIG. 6.

Next, the judgement of identity will be described with reference to FIG. 6 and FIG. 7.

(1) An initial value of a variable $OID_M$ is defined as a bit sequence with a length equal to the total length L of the OID and all values equal to "0". Also, an initial value of a variable $OID_U$ is defined as a bit sequence with a length equal to the total length of the OID and all values equal to "0" (step S2511).

(2) One AID is selected from a set of processing target AIDS, and the following bit processing is carried out (step S2513).

(a) Values of variables $AID_M$ and $AID_U$ are determined according to the position information contained in the AID (step S2515). Here, $AID_M$ is defined as a bit sequence with a length equal to the total length L of the OID and a value of a position at which the OID information is defined is "1" while a value of a position at which the OID information is not defined is "0" (see FIG. 7). Also, $AID_U$ is defined as a bit sequence with a length equal to the total length L of the OID and a value of a position at which the OID information is defined is an actual value of the OID information while a value of a position at which the OID information is not defined is 0 (see FIG. 7).

(b) AND processing of $OID_M$ and $AID_M$ is carried out and its result is substituted into a variable $OVR_M$ (step S2517).

(c) AND processing of $OVR_M$ and $AID_M$ as well as AND processing of $OVR_M$ and $OID_M$ are carried out and their results are compared (step S2519). When they coincide, OR processing of $OID_M$ and $AID_M$ is carried out and its result is substituted into $OID_M$ (step S2521), while OR processing of $OID_U$ and $AID_U$ is also carried out and its result is substituted into $OID_M$ (step S2523). On the other hand, when they do not coincide, the processing proceeds to the step S2525.

(d) An AID to be processed next is selected from a set of processing target AIDs. When at least one another AID is contained in the set, the steps S2513 to S2523 are executed for that another AID. When no other AID is contained in the set, the processing proceeds to the step S2527.

(e) Values of $OID_M$ and $OID_U$ are outputted (step S2527).

The value of $OID_M$ that is eventually obtained indicates all positions of the OID information that can be recovered from the set of processing target AIDs. Also, the value of $OID_U$ that is eventually obtained indicates all the OID information that can be recovered from the set of processing target AID. In other words, by using the values of $OID_M$ and $OID_U$, it is possible to obtain the OID albeit probabilistically when the value of $OID_U$ is used as a search condition, and it is possible to quantitatively evaluate a precision of the above search by a ratio $OID_M/L$ with respect to the total length L of the OID.

As described above, in this first embodiment, the CA 1 which is a Trusted Third Party with high secrecy and credibility generates the AID in which the personal information is concealed, from the OID that contains the highly secret personal information such as name, telephone number, real email address, etc., according to a user request, and issues the AID to the user. By identifying the user by this AID on the communication network as well as in various services provided on the communication network, it becomes possible to provide both the anonymity guarantee and the identity guarantee for the user. In other words, it becomes possible for the user to communicate with another user without revealing the own real name, telephone number, email address, etc., to that another user, and it also becomes possible to disclose the disclosed information to unspecified many through the ADS 7 as will be described below.

The user registers the disclosed information, that is an information which is supposed to have a low secrecy compared with the personal information at the ADS 7. In the case of searching the disclosed information and the registrant AID, the searcher presents the AID of the searcher and arbitrary search conditions to the ADS 7. The ADS 7 then extracts the registrant AID that satisfies these search conditions, and generates the PAT from the AID of the searcher and the AID of the registrant who satisfied the search conditions, the transfer control flag value, and the validity period value.

In this 1-to-1 PAT, the transfer control flag value and the validity period value are set as shown a part (c) of FIG. 2, and by setting up this validity period in advance, it is possible to limit connections from the sender.

It is also possible to prohibit connections from a third person who does not have the access right, by using the transfer control flag value. Namely, when the transfer control flag value is set to be 1, the sender's AID is authenticated between the SCS 5 and the sender according to an arbitrary challenge/response process, so that even if the sender gives both the sender's AID and the PAT to another user other than the sender, that another user will not be able to make a connection to the registrant of the ADS 7 through the SCS 5. On the other hand, when the transfer control flag value is set to be 0, no challenge/response process will be carried out between the SCS 5 and the sender, so that if the sender gives both the sender's AID and the PAT to another user other than the sender, that another user will also be able to make a connection to the registrant of the ADS 7 through the SCS 5.

It is also possible to make a connection request to the communication network such that a call for which the recipient is specified by the 1-to-1 PAT will be received by the recipient's AID or the sender's AID defined within the PAT. In addition, it is also possible to refuse receiving calls with the 1-to-1 PAT selected by the recipient among calls which are specified by the 1-to-1 PAT. It is also possible to cancel the receiving refusal of the calls with the 1-to-1 PAT selected by the recipient. In addition, as a measure against the sender who repeats the personal attach using a plurality of sender's AIDs by taking an advantage of the anonymity, it is possible to Judge the identity of the OID from these plurality of sender's AIDs and it is possible to extract that OID at some probability.

Next, with references to FIG. 8 to FIG. 24, the second embodiment of the email access control scheme according to the present invention will be described in detail.

In contrast to the first embodiment described above which is directed to the case where a sender and a recipient are set in 1-to-1 correspondence, this second embodiment is directed to the case where a sender and recipients are set in 1-to-N correspondence and a generation of a new PAT and a content change of the existing PAT can be made by the initiative of a user. Here, the sender is either a holder of the PAT or a member of the PAT. Similarly, the recipient is either a holder of the PAT or a member of the PAT.

In general, a membership of a group communication (mailing list, etc.) is changing dynamically so that it is necessary for a host of the group communication to manage information on a point of contact such as telephone number, email address, etc., of each member. In contrast, in the case where it is only possible to newly generate a 1-to-1 PAT as in the first embodiment, the management of a point of contact is difficult. For example, it is difficult to manage the group collectively, and even if it is given to the others for the purpose of the transfer control, it does not function as an address of the group communication such as mailing list.

In this second embodiment, in order to resolve such a problem, it is made possible to carry out a generation of a new 1-to-N PAT and a content change or the existing 1-to-N PAT by the initiative of a user.

Figure 9:
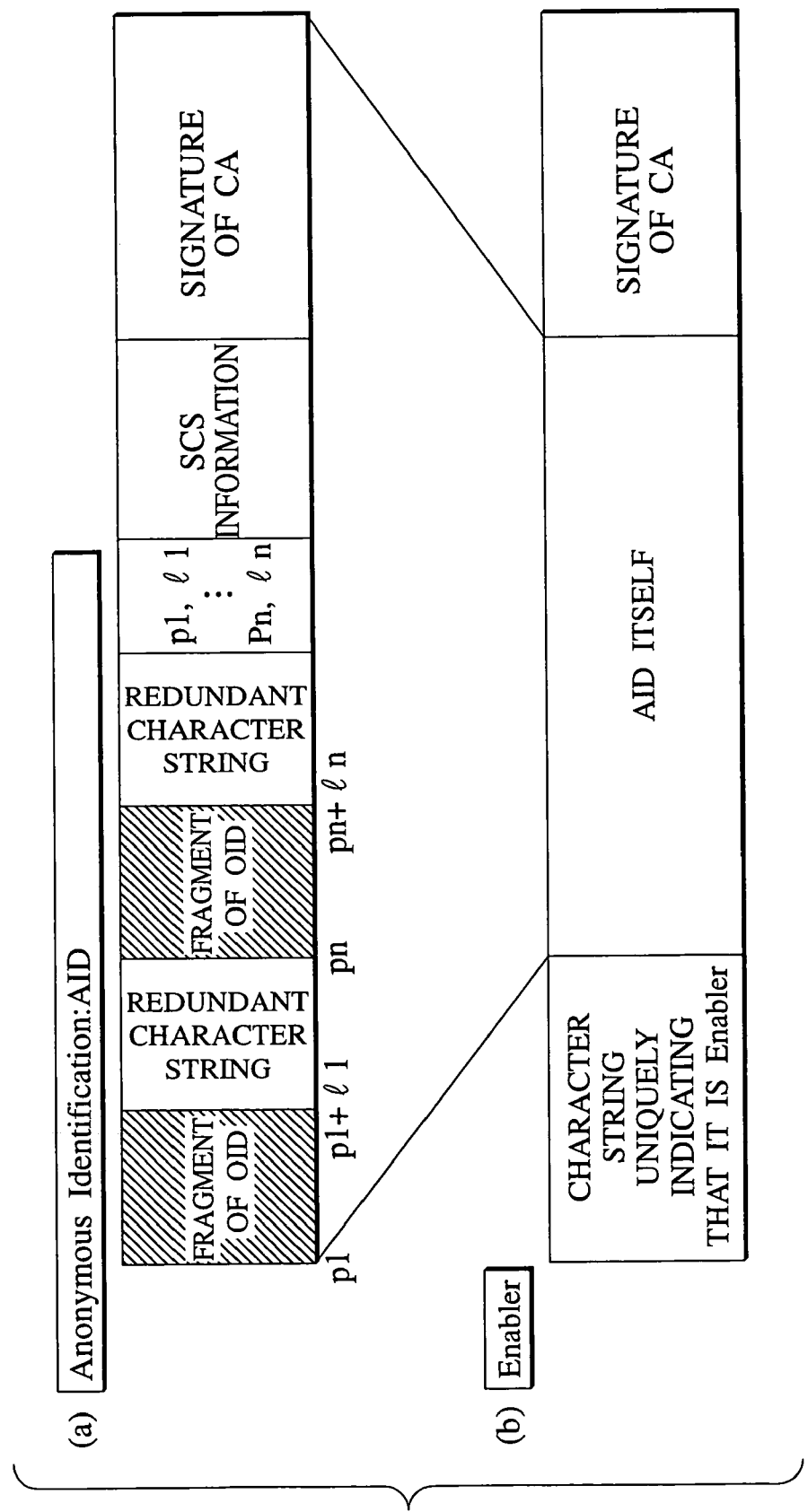
FIG. 9 is a diagram showing exemplary data structures of an anonymous identification and an enabler according to the second embodiment of the present invention.
Figure 10:
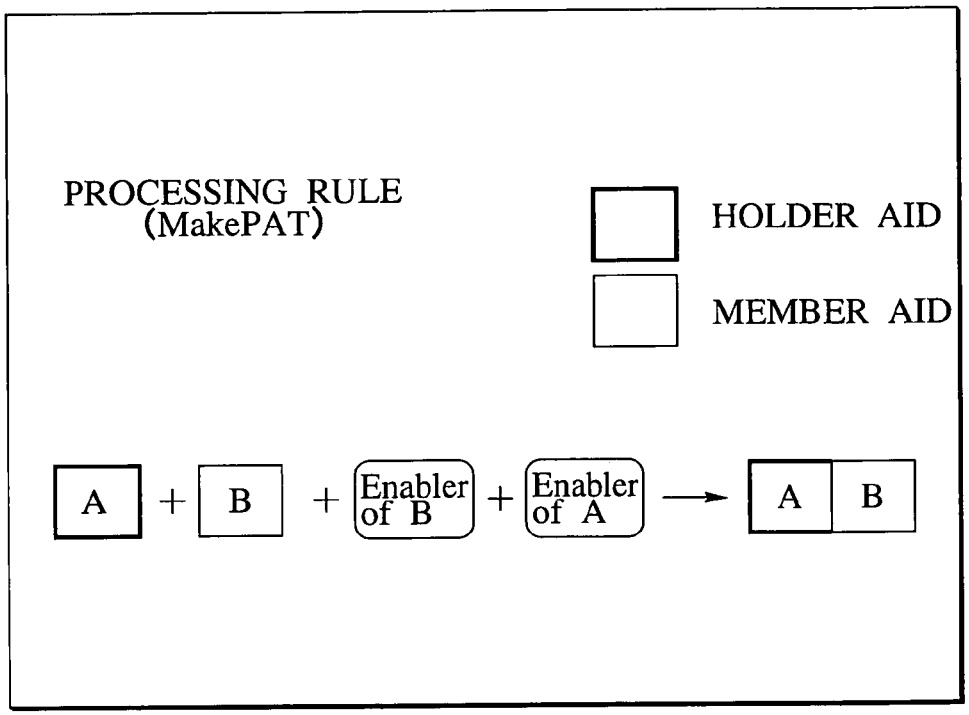
FIG. 10 is a diagram showing a definition of a processing rule (MakePAT) used in the second embodiment of the present invention.
Figure 11:
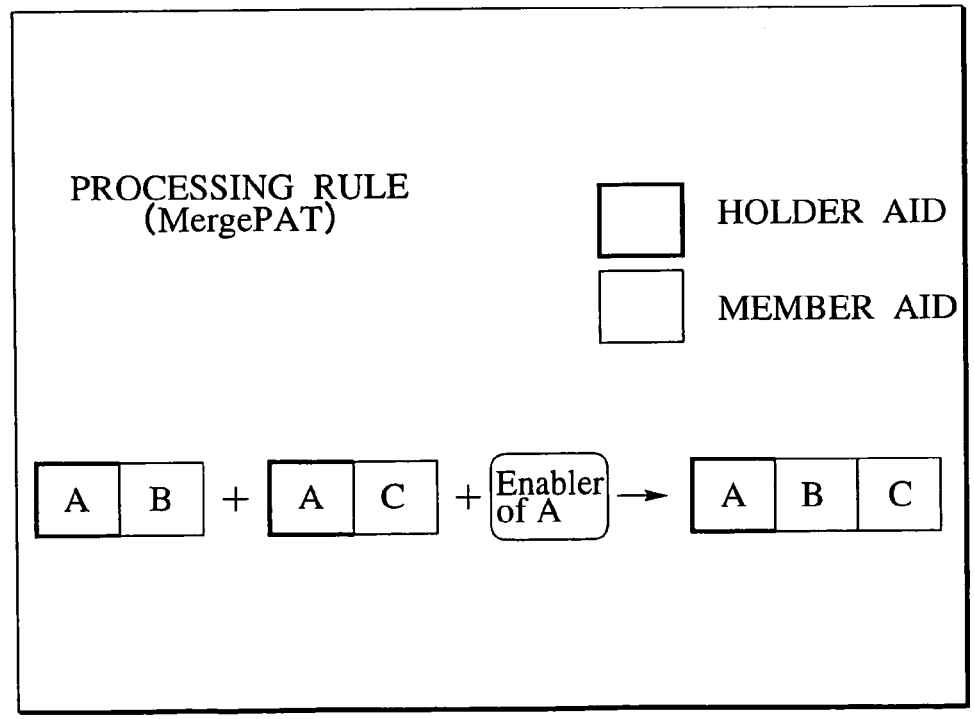
FIG. 11 is a diagram showing a definition of a processing rule (MergePAT) used in the second embodiment of the present invention.
Figure 12:
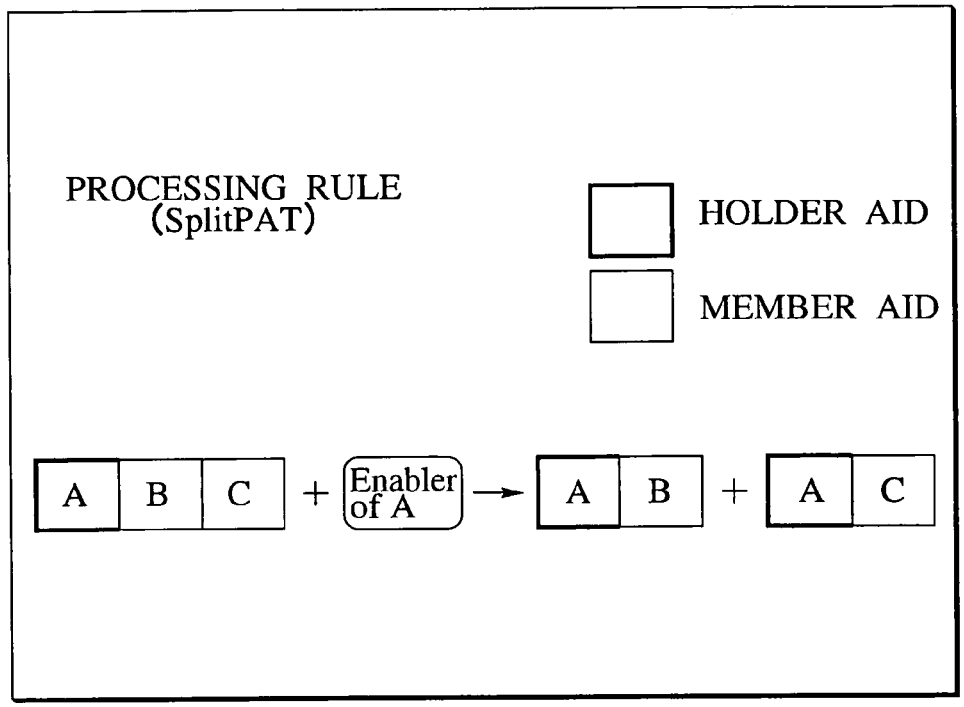
FIG. 12 is a diagram showing a definition of a processing rule (SplitPAT) used in the second embodiment of the present invention.
Figure 13:
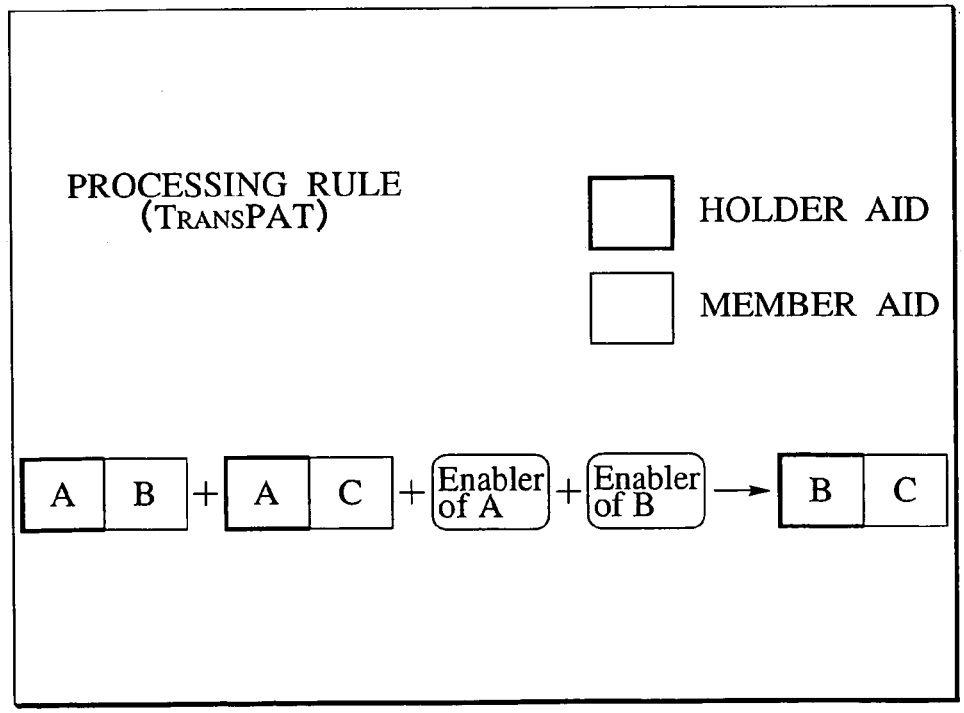
FIG. 13 is a diagram showing a definition of a processing rule (TransPAT) used in the second embodiment of the present invention.

First, the definition of various identifications used in this second embodiment will be described with references to FIG. 8 and FIG. 9.

As shown in a part (a) of FIG. 8, the OID is an information comprising an arbitrary character string (telephone number, email address, etc.) according to a rule by which the CA 1 can uniquely identify the user and a public key, which is signed by the CA 1.

Also, as shown in a part (b) of FIG. 8, the AID is an information comprising fragments of the OID and their position information, redundant character strings, and an SCS information given by an arbitrary character string (host name, real domain name, etc.) by which a host or a domain that is operating the SCS 5 can be uniquely identified on the network, which is signed by the CA 1.

Also, as shown in a part (c) of FIG. 8, the 1-to-N PAT is an information comprising two or more AIDs, a holder index, the validity period, the transfer control flag, and a PAT processing device identifier, which is signed using a secret key of the PAT processing device.

Here, one of the AIDs is a holder AID of this PAT, where the change of the information contained in the PAT such as an addition of AID to the PAT, a deletion of AID from the PAT, a change of the validity period in the PAT, a change of the transfer control flag value in the PAT, etc., can be made by presenting the holder AID and a corresponding Enabler to the PAT processing device.

On the other hand, the AIDs other than the holder AID that are contained in the PAT are all member AIDs, where a change of the information contained in the PAT cannot be made even when the member AID and a corresponding Enabler are presented to the PAT processing device.

The holder index is a numerical data for identifying the holder AID, which is defined to take a value 1 when the holder AID is a top AID in the AID list formed from the holder AID and the member AIDs, a value 2 when the holder AID is a second AID from the top of the AID list, or a value n when the holder AID is an n-th AID from the top of the AID list.

The transfer control flag value is defined to take either 0 or 1 similarly as in the case of the 1-to-1 PAT.

The holder AID is defined to be an AID which is written at a position of the holder index value in the AID list. The member AIDs are defined to be all the AIDs other than the holder AID.

The validity period is defined by any one or combination of the number of times for which the PAT is available, the absolute time (UTC) by which the PAT becomes unavailable, the absolute time (UTC) by which the PAT becomes available, and the relative time (lifetime) since the PAT becomes available until it becomes unavailable.

The identifier of a PAT processing device (or a PAT processing object on the network) is defined as a serial number of the PAT processing device (or an distinguished name of the PAT processing object on the network). The secret key of the PAT processing device (or the PAT processing object on the network) is defined to be uniquely corresponding to the identifier.

Also, in this second embodiment, an Enabler is introduced as an identifier corresponding to the AID. As shown in FIG. 9, the Enabler is an information comprising a character string uniquely indicating that it is an Enabler and an AID itself, which is signed by the CA 1.

Next, the operations for a generation of a new PAT and a content change of the existing PAT will be described. Here, the following operations are defined at a secure PAT processing device on the communication terminal or a PAT processing object on the CA or on a network which is properly requested from the CA (which will also be referred to as a PAT processing device hereafter).

1. Editing of AID list:

A list of AIDs (referred hereafter as an AID list) contained in the PAT is edited using AIDs and Enabler. Else, the AID list is newly generated.

2. Setting of the validity period and the transfer control flag:

The validity period value and the transfer control flag value contained in the PAT are changed using an AID and Enabler. Also, a new validity period value and a new transfer control flag value are set in the newly generated AID list.

A user who presented the holder AID and the Enabler corresponding to this holder AID to the PAT processing device can edit the list of AIDs contained in the PAT. In this case, the following processing rules are used.

(1) Generating a new PAT (MakePAT) (see FIG. 10):

The AID list (ALIST<holder AID |member $AID_1$, member $AID_2$, . . . , member $AID_n$>) is newly generated, and the validity period value and the transfer control flag value are set with respect to the generated ALIST.

$AID_A + AID_B$ +Enabler of $AID_B$ +Enabler of $AID_A$
→ALIST<$AID_A$|$AID_B$>
ALIST<$AID_A$|$AID_B$>+Enabler of $AID_A$
+validity period value
+transfer control flag value
→PAT<$AID_A$|$AID_B$>

(2) Merging PATs (MergePAT) (see FIG. 11):

A plurality of ALISTs of the same holder AID are merged and the validity period value and the transfer control flag value are set with respect to the merged ALIST.

ALIST<$AID_A$|$AID_{B1}$, $AID_{B2}$, . . . >
+ALIST<$AID_A$|$AID_{C1}$, $AID_{C2}$, . . . >
+Enabler of $AID_A$
→ALIST<$AID_A$|$AID_{B1}$, $AID_{B2}$, . . . , $AID_{C1}$, $AID_{C2}$, . . . >
ALIST<$AID_A$|$AID_{B1}$, $AID_{B2}$, . . . , $AID_{C1}$, $AID_{C2}$, . . . >
+Enabler of $AID_A$+validity period value
+transfer control flag value
→PAT<$AID_A$|$AID_{B1}$, $AID_{B2}$, . . . , $AID_{C1}$, $AID_{C2}$, . . . >

(3) Splitting a PAT (SplitPAT) (see FIG. 12):

The ALIST is split into a plurality of ALISTs of the same holder AID, and the respective validity period value and transfer control flag value are set with respect to each one of the split ALISTs.

ALIST<$AID_A|AID_{B1}$, $AID_{B2}$, ..., $AID_{C1}$, $AID_{C2}$, ...>
+Enabler of $AID_A$
→ALIST<$AID_A|AID_{B1}$, $AID_{B2}$, ...>
+ALIST<$AID_A|AID_{C1}$, $AID_{C2}$, ...>
ALIST<$AID_A|AID_{C1}$, $AID_{C2}$, ...>
+Enabler of $AID_A$+validity period value
+transfer control flag value
→PAT<$AID_A|AID_{C1}$, $AID_{C2}$...>

(4) Changing a holder of a PAT (TransPAT) (see FIG. 13):

The holder AID of the ALIST is changed, and the validity period value and the transfer control flag value are set with respect to the changed ALIST.

ALIST<$AID_A|AID_B$>+ALIST<$AID_A|AID_{C1}$, $AID_{C2}$, ...>
+Enabler of $AID_A$+Enabler of $AID_B$
→ALIST<$AID_B|AID_{C1}$, $AID_{C2}$, ...>
ALIST<$AID_B|AID_{C1}$, $AID_{C2}$, ...>
+Enabler of $AID_B$+validity period value
+transfer control flag value
→PAT<$AID_B|AID_{C1}$, $AID_{C2}$, ...>

In the operation for setting the validity period value, in order to permit the setting of the validity period value only to a user who holds both the holder AID and the corresponding Enabler, the following operation is defined.

PAT<$AID_A|AID_B$>+Enabler of $AID_A$
+validity period value
→PAT<$AID_A|AID_B$>

In the operation for setting the transfer control flag value, in order to permit the setting of the transfer control flag value only to a user who holds both the holder AID and the corresponding Enabler, the following operation is defined.

PAT<$AID_A|AID_B$>+Enabler of $AID_A$
+transfer control flag value
→PAT<$AID_A|AID_B$>

Next, with references to FIG. 14 to FIG. 20, the overall system configuration of this second embodiment will be described. In FIG. 14 to FIG. 20, the user-A who has $AID_A$ allocated from the CA stores $AID_A$ and Enabler of $AID_A$ in a computer of the user-A, and the input/output devices such as floppy disk drive, CD-ROM drive, communication board, microphone, speaker, etc., are connected. Else, $AID_A$ and Enabler of $AID_A$ are stored in a communication terminal (telephone, cellular phone, etc.) which has a storage device and a data input/output function.

Similarly, the user-B who has $AID_B$ allocated from the CA stores $AID_B$ and Enabler of $AID_B$ in a computer of the user-B, and the input/output devices such as floppy disk drive, CD-ROM drive, communication board, microphone, speaker, etc., are connected. Else, $AID_B$ and Enabler of $AID_B$ are stored in a communication terminal (telephone, cellular phone, etc.) which has a storage device and a data input/output function.

In the following, a procedure by which the user-A generates PAT<$AID_A|AID_B$> will be described.

(1) The user-A acquires $AID_B$ and Enabler of $AID_B$ using any of the following means.

Figure 14:
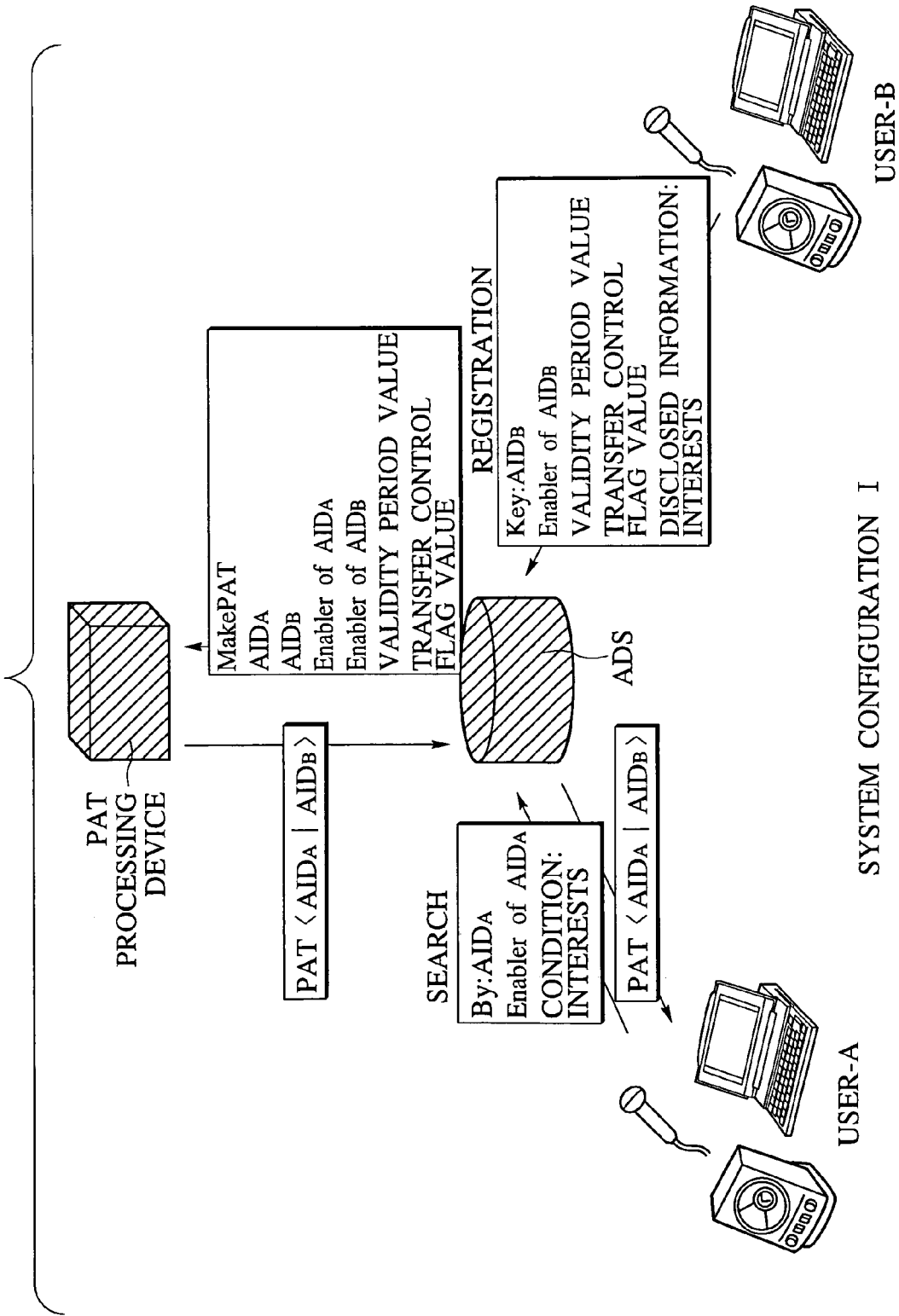
FIG. 14 is a first exemplary system configuration that can be used in the second embodiment of the present invention.

$AID_B$ and Enabler of $AID_B$ are registered at the ADS 7, and it is waited until the user-A acquires them as a search result (FIG. 14).

Figure 15:
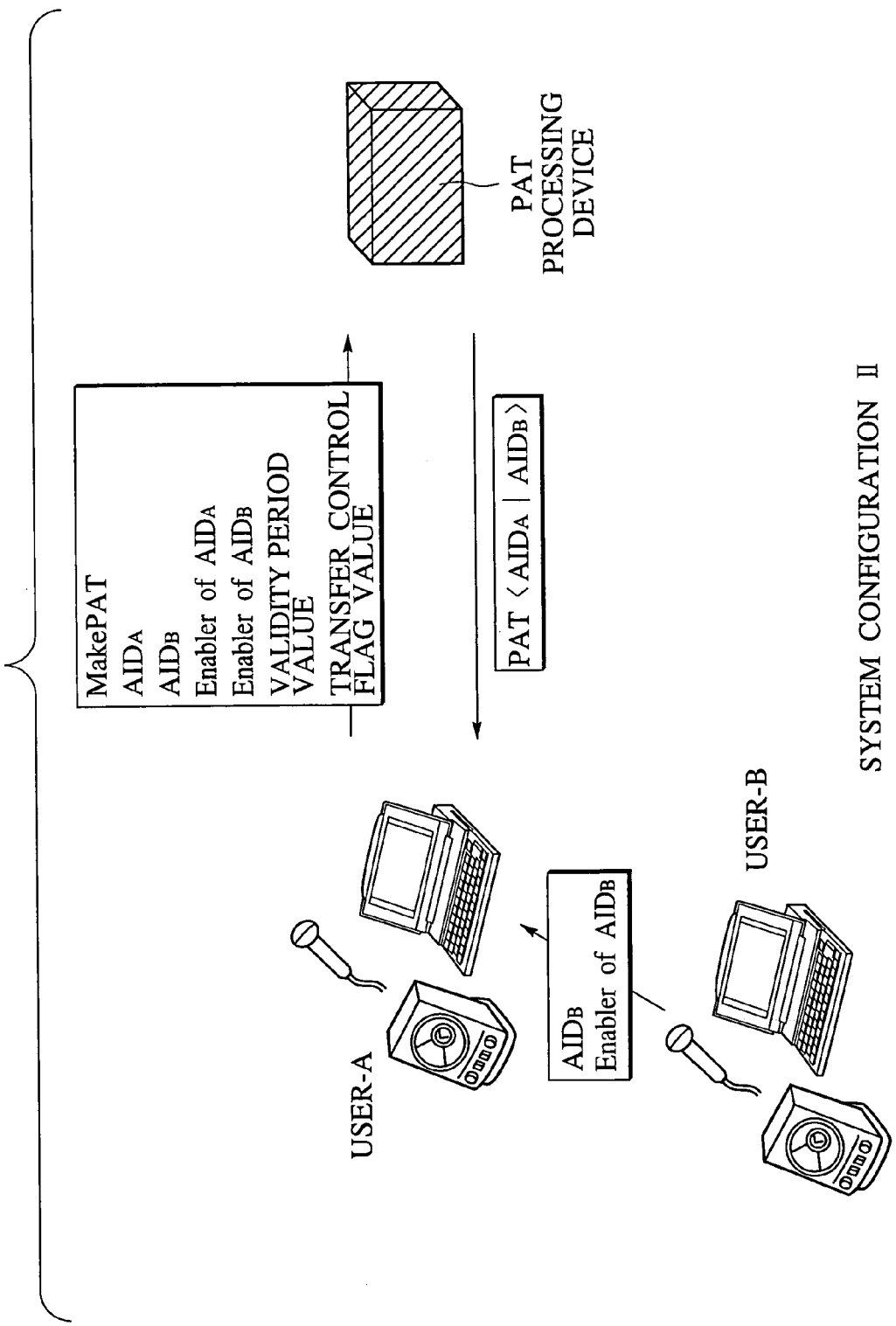
FIG. 15 is a second exemplary system configuration that can be used in the second embodiment of the present invention.
Figure 16:
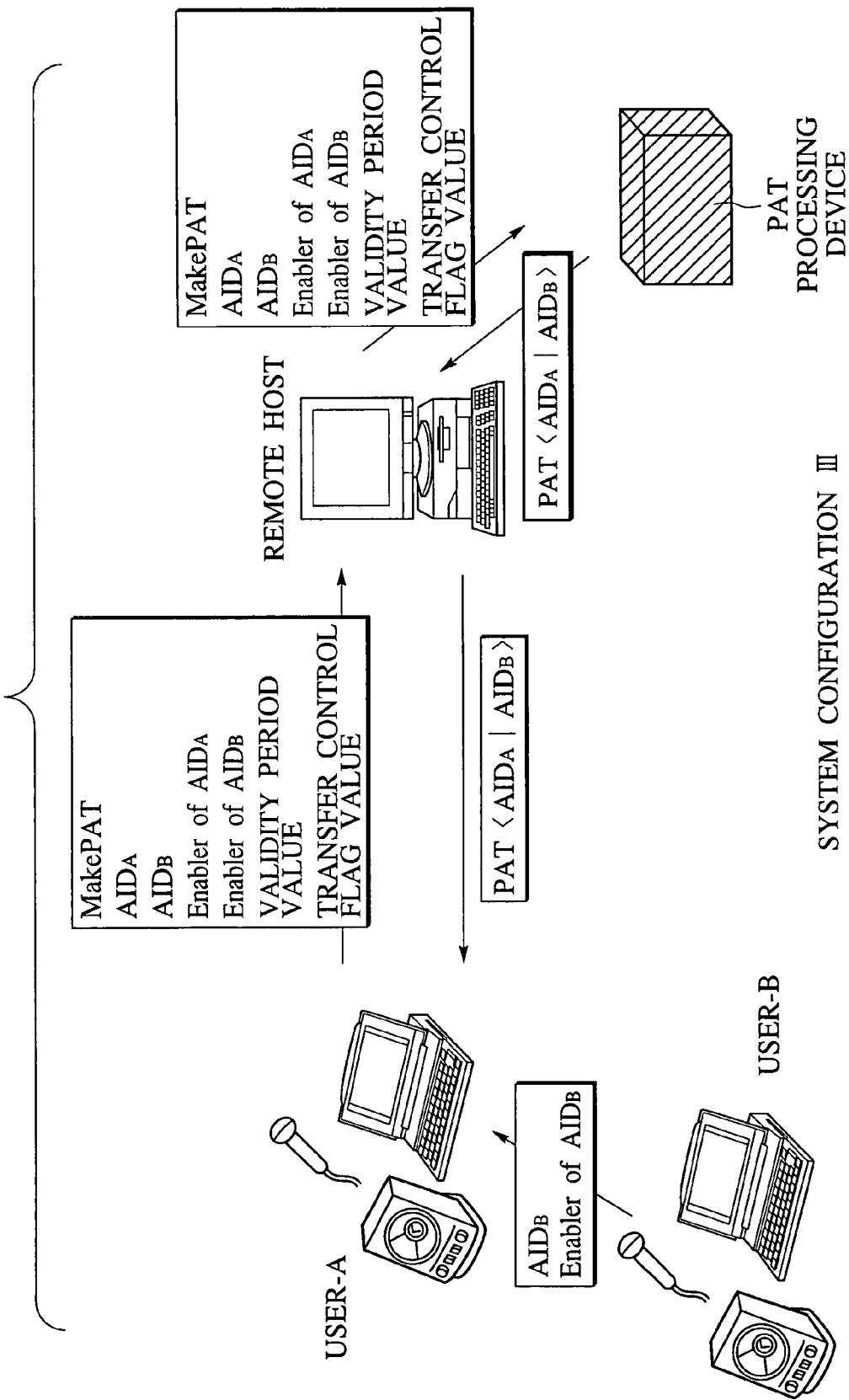
FIG. 16 is a third exemplary system configuration that can be used in the second embodiment of the present invention.

$AID_B$ and Enabler of $AID_B$ are directly transmitted to the user-A by the email, signaling, etc. (FIGS. 15, 16).

Figure 17:
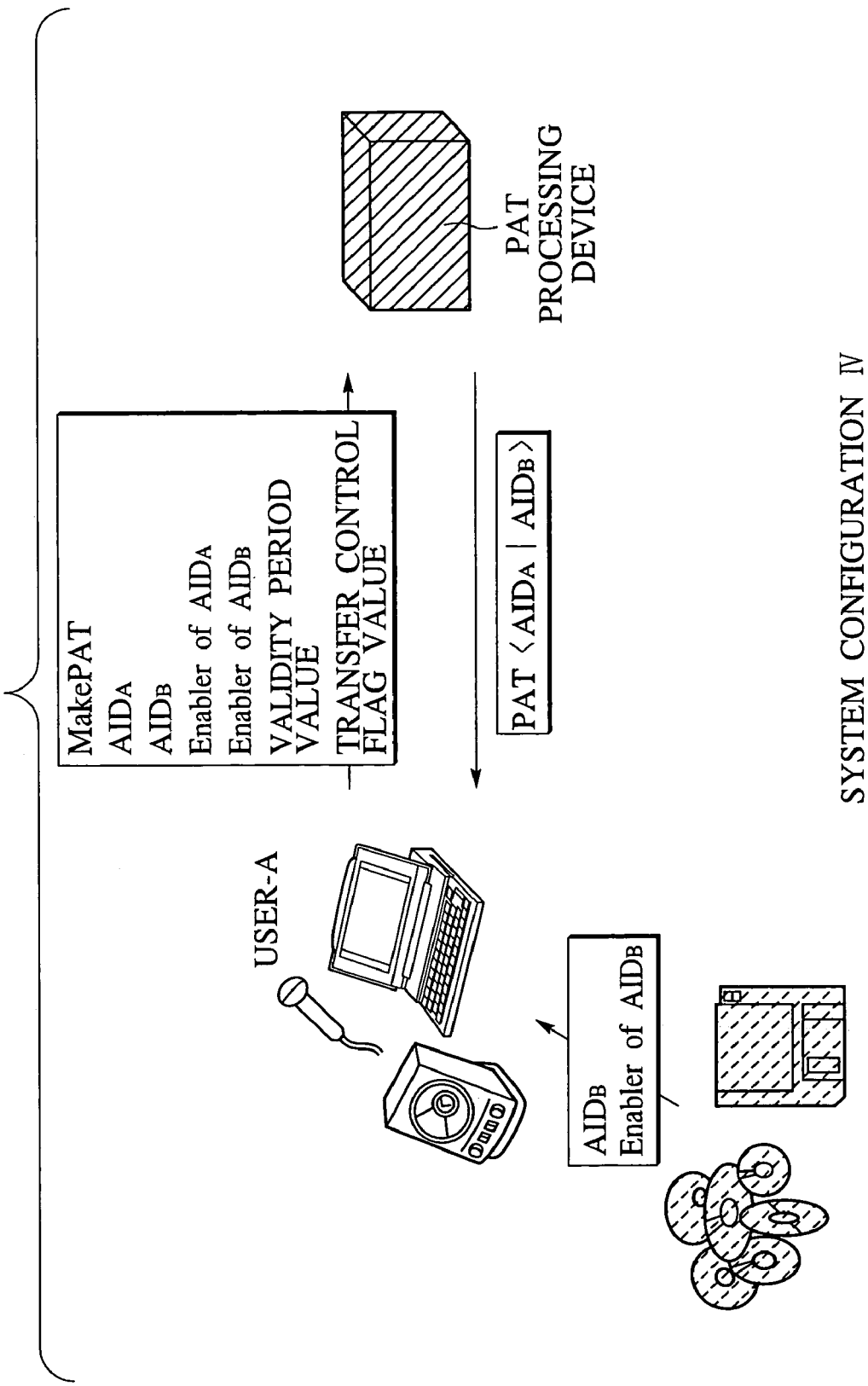
FIG. 17 is a fourth exemplary system configuration that can be used in the second embodiment of the present invention.
Figure 18:
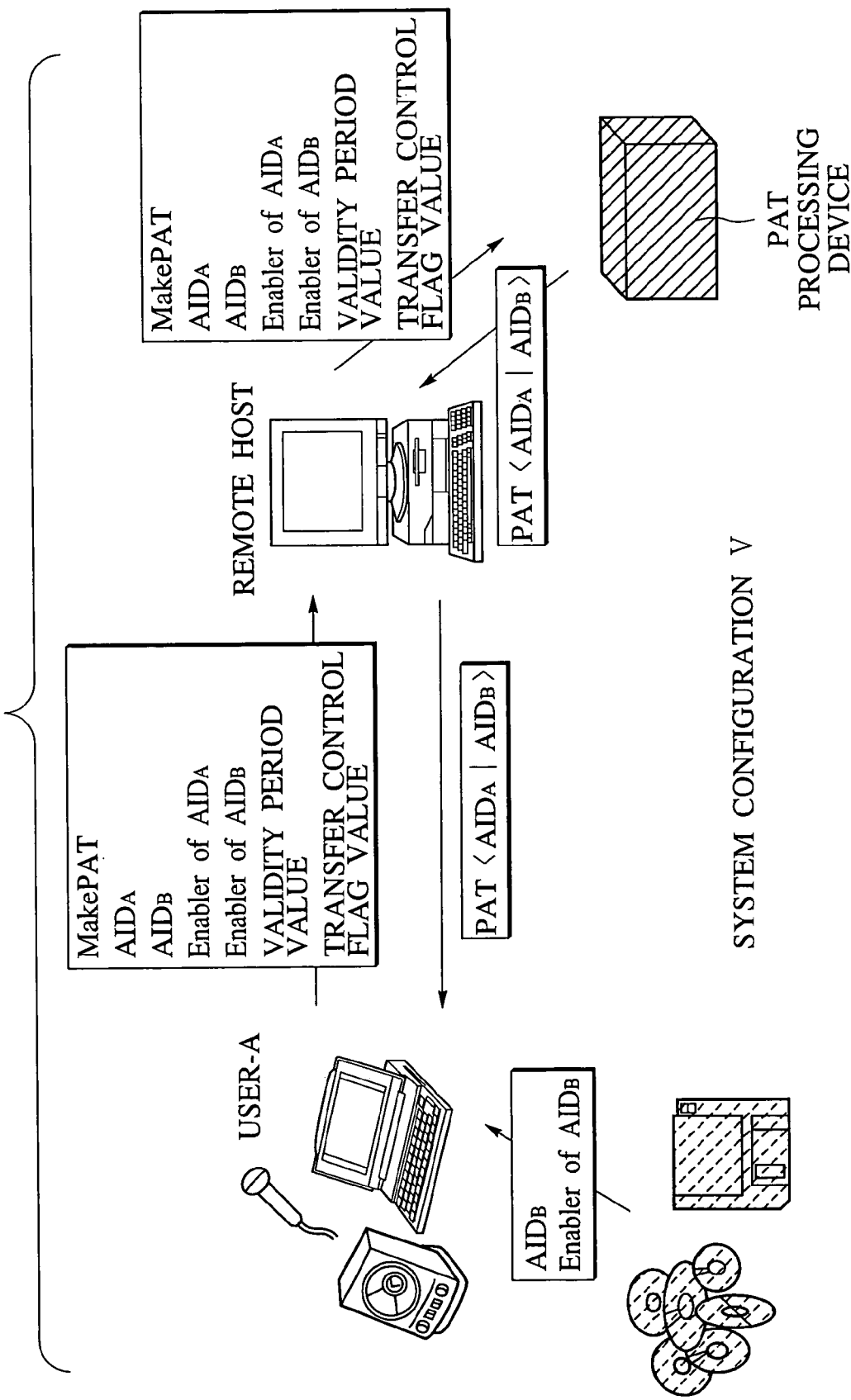
FIG. 18 is a fifth exemplary system configuration that can be used in the second embodiment of the present invention.

$AID_B$ and Enabler of $AID_B$ are stored in a magnetic, optic, or electronic medium such as floppy disk, CD-ROM, MO, IC card, etc., and this medium is given to the user-A. Else, it is waited until the user acquires them by reading this medium (FIGS. 17, 18).

Figure 19:
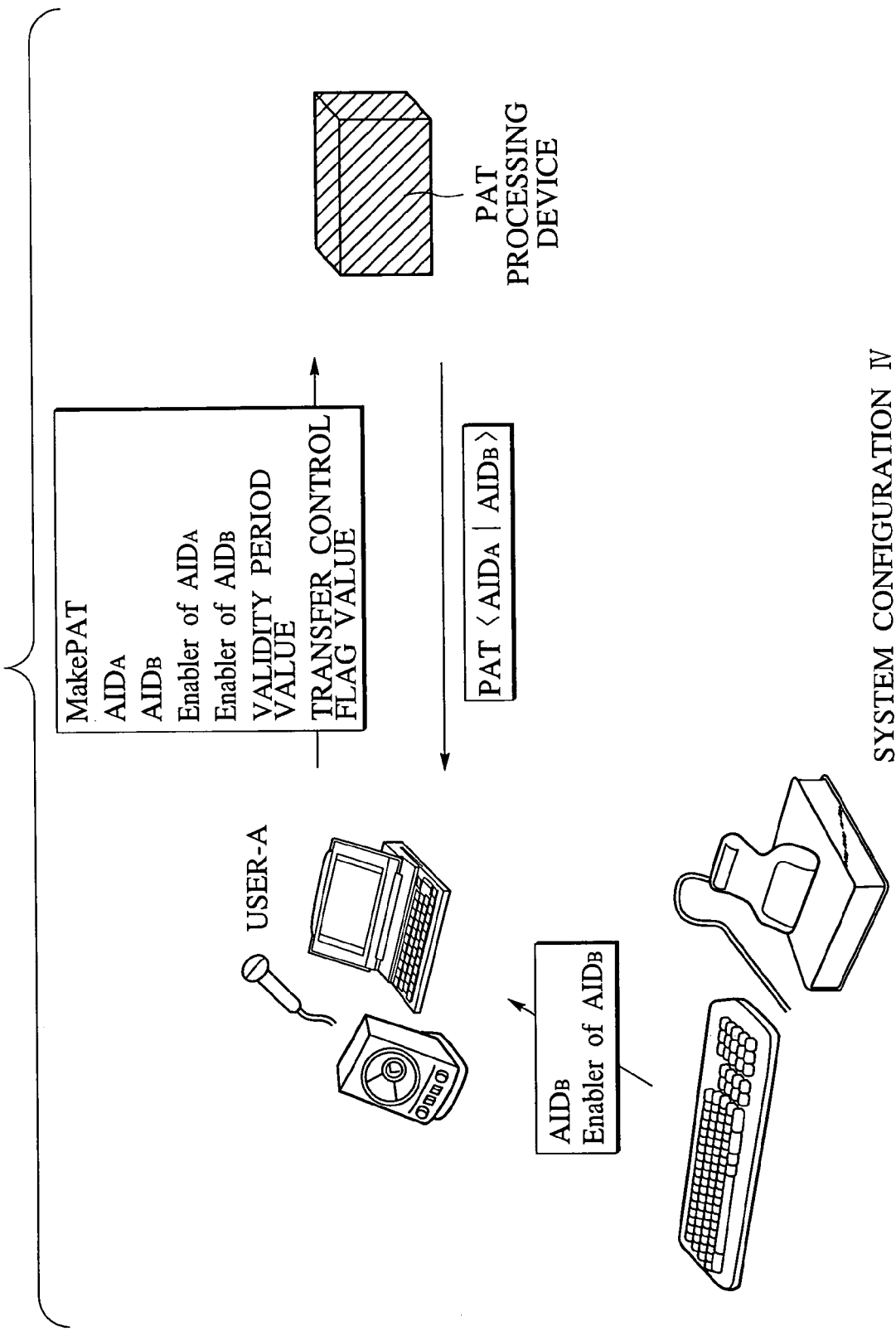
FIG. 19 is a sixth exemplary system configuration that can be used in the second embodiment of the present invention.
Figure 20:
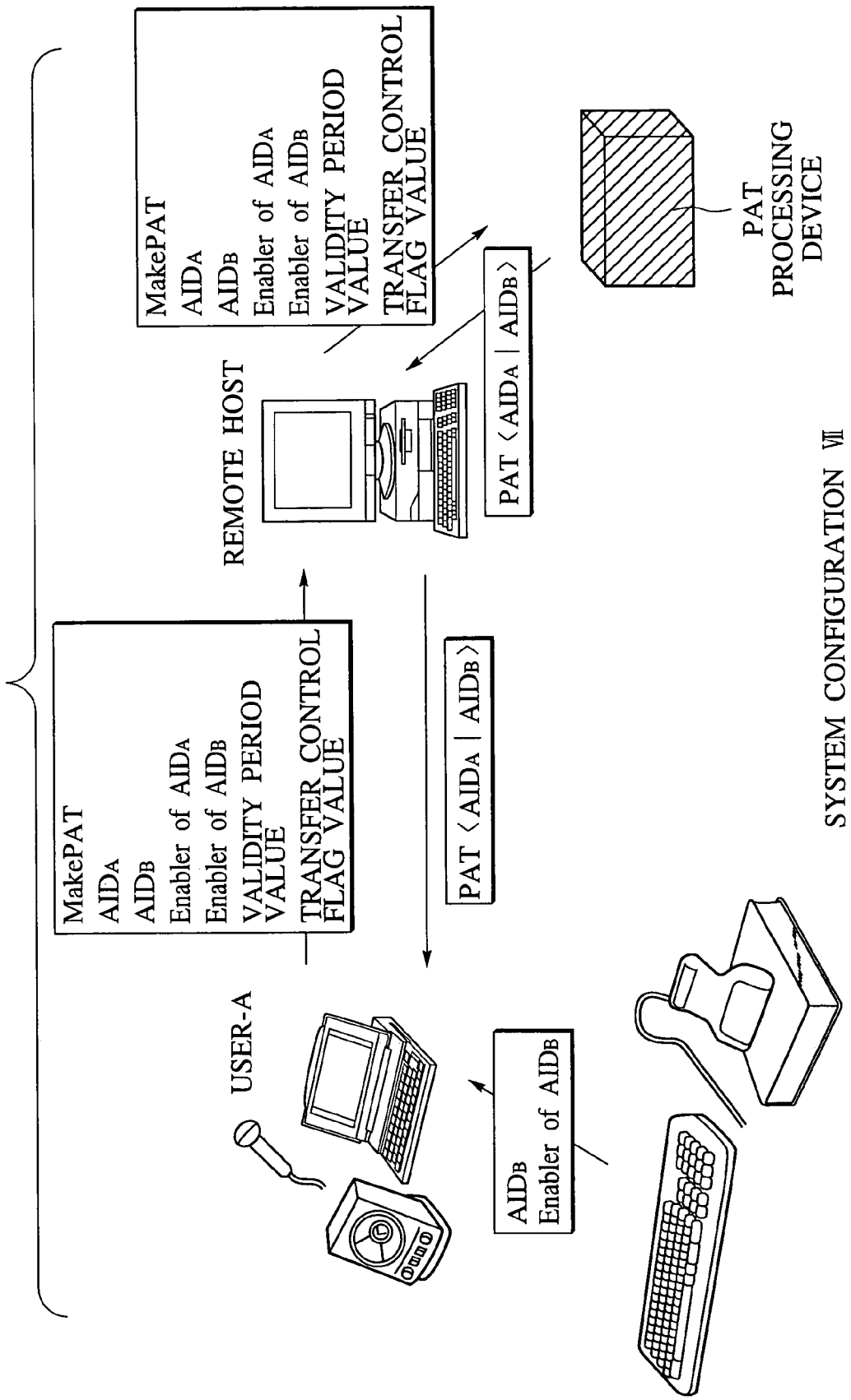
FIG. 20 is a seventh exemplary system configuration that can be used in the second embodiment of the present invention.

$AID_B$ and Enabler of $AID_B$ are printed on a paper medium such as book, name card, etc., and this medium is given to the user-A. Else, it is waited until the user-A acquire them by reading this medium (FIGS. 19, 20).

(2) The user-A who has acquired $AID_B$ and Enabler of $AID_B$ by any of the means described in the above (1) issues the MakePAT command to the PAT processing device. This procedure is common to FIG. 14 to FIG. 20, and defined as follows.

(a) The user-A requests the issuance of the MakePAT command by setting $AID_A$, Enabler of $AID_A$, $AID_B$, Enabler of $AID_B$, the validity period value, and the transfer control flag value into the communication terminal of the user-A.

(b) The communication terminal of the user-A generates the MakePAT command.

(c) The communication terminal of the user-A transmits the generated MakePAT command to the PAT processing device by means such as the email, signaling, etc. (the issuance of the MakePAT command).

Figure 21:
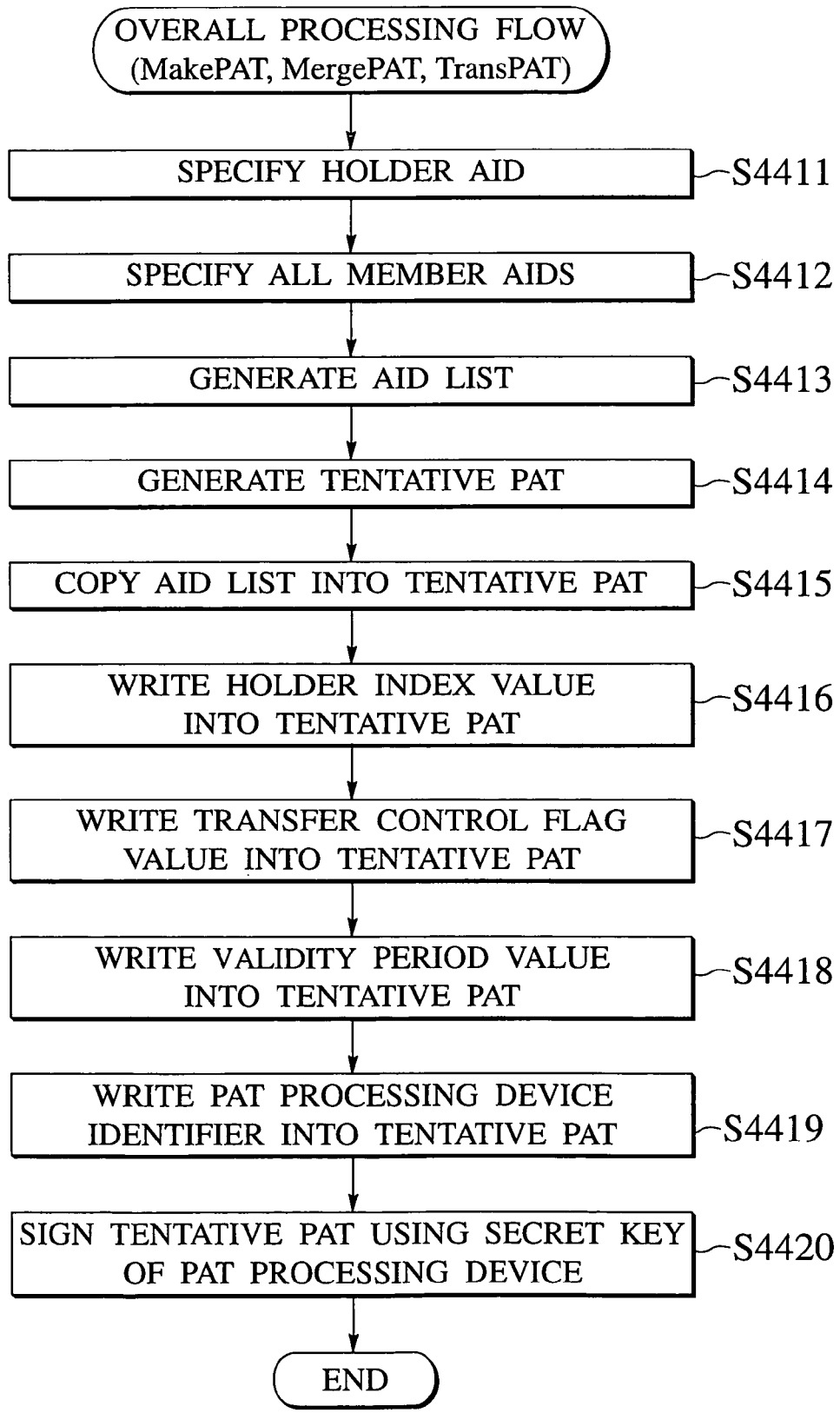
FIG. 21 is a flow chart showing an overall processing flow of MakePAT, MergePAT or TransPAT processing according to the second embodiment of the present invention.
Figure 23:
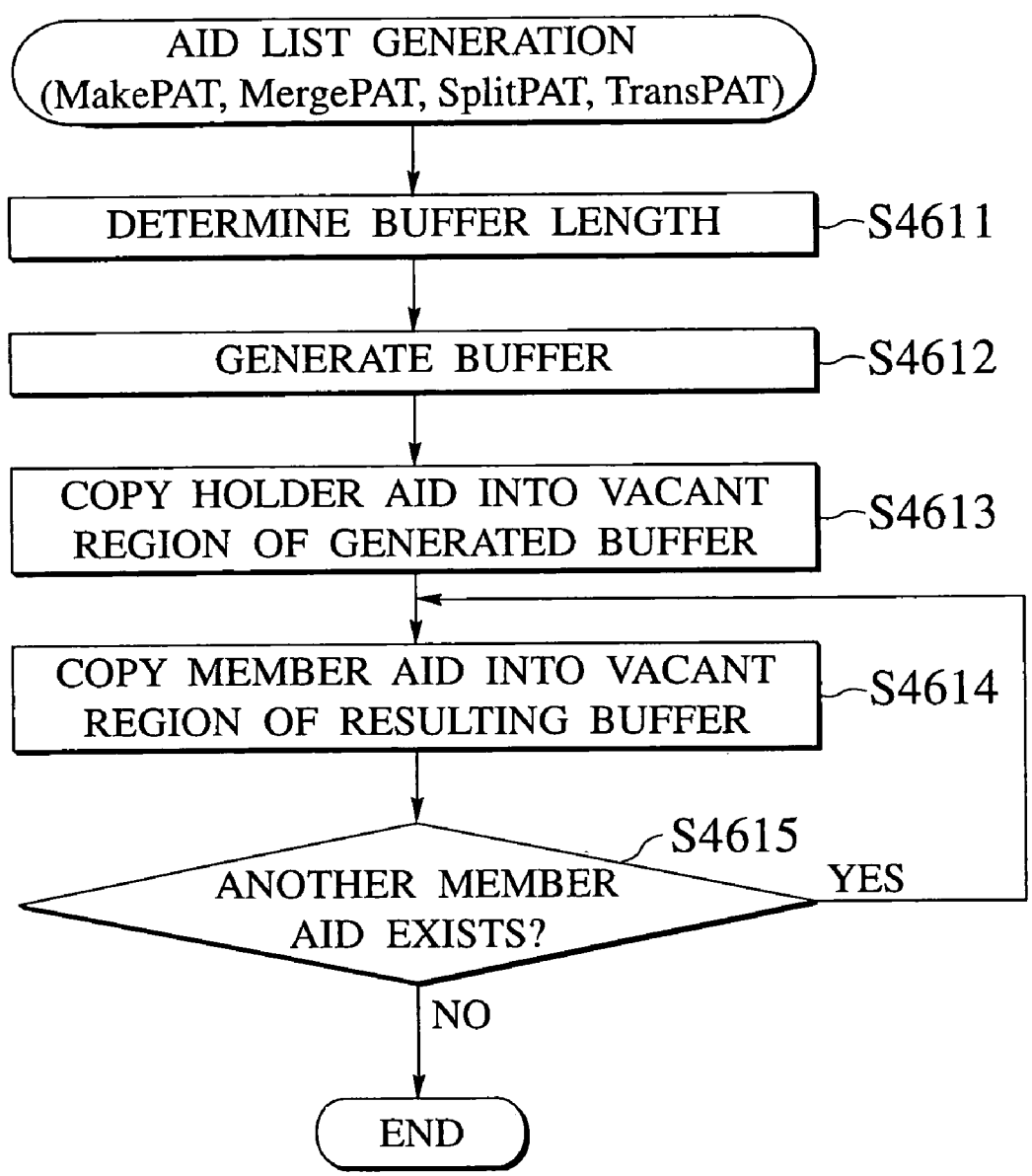
FIG. 23 is a flow chart for an anonymous identification list generation processing (for MakePAT, MergePAT, SplitPAT and TransPAT) according to the second embodiment of the present invention.
Figure 24:
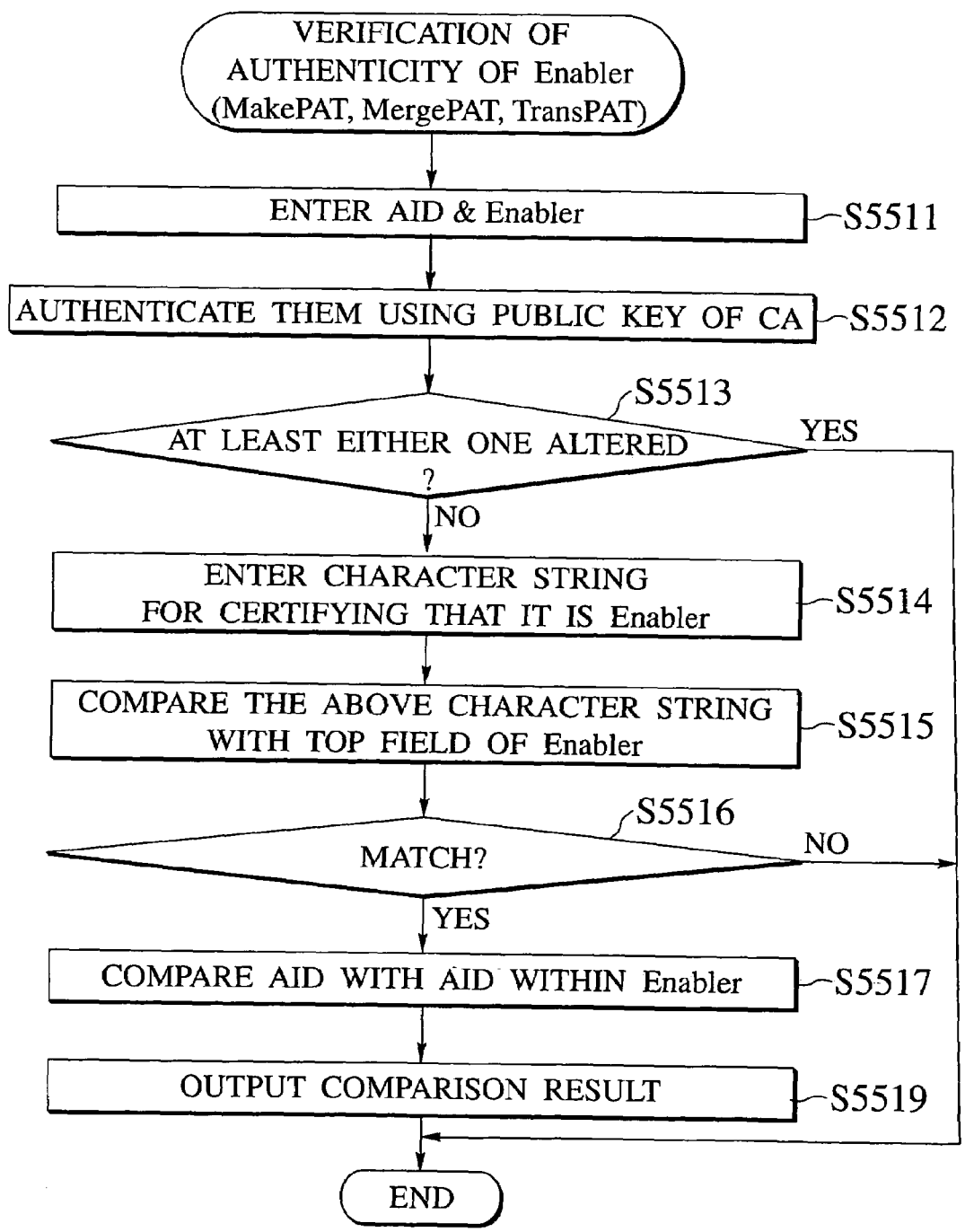
FIG. 24 is an enabler authenticity verification processing (for MakePAT, MergePAT, SplitPAT and TransPAT) according to the second embodiment of the present invention.

(d) The PAT processing device generates PAT<$AID_A|AID_B$> by processing the received MakePAT command according to FIG. 21 and FIG. 23. More specifically, this is done as follows.

$AID_A$+$AID_B$+Enabler of $AID_B$+Enabler of $AID_A$
→ALIST<$AID_A|AID_B$>
ALIST<$AID_A|AID_B$>+Enabler of $AID_A$
+validity period value+transfer control flag value
→PAT<$AID_A|AID_B$>

(e) The PAT processing device transmits the generated PAT<$AID_A|AID_B$> to the communication terminal of the user-A, or to the communication terminal of the user-B according to the need, by means such as the email, signaling, etc.

(f) The communication terminal of the user-A (or the user-B) stores the received PAT<$AID_A|AID_B$> in the storage device of the communication terminal of the user-A.

The merging of PATs (MergePAT, FIG. 21, FIG. 23), the splitting of a PAT (SplitPAT, FIG. 22, FIG. 23), and the changing of a holder of a PAT (TransPAT, FIG. 21, FIG. 23) are also carried out by the similar procedure.

Next, the procedure of MakePAT, MergePAT and TransPAT will be described with reference to FIG. 21.

(1) The holder AID is specified (step S4411).

(2) All the member AIDs are specified (step S4412).

(3) The AID list is generated from the specified holder AID and all the specified member AIDs (step S4413). More specifically the specified holder AID and all the specified member AIDs are concatenated using arbitrary means.

(4) A tentative PAT is generated using arbitrary means, similarly as in the case of a tentative AID (step S4414).

(5) The generated AID list is copied to a prescribed region of the generated tentative PAT (step S4415).

(6) The holder index value is written into the tentative pat to which the AID list has been copied (step S4416).

(7) The transfer control flag value is written into the tentative PAT into which the holder index value has been written (step S4417).

(8) The validity period value is written into the tentative PAT into which the transfer control flag value has been written (step S4418).

(9) The PAT processing device identifier is written into the tentative PAT into which the validity period value has been written (step S4419).

(10) The tentative PAT into which the PAT processing device identifier has been written is signed using the secret key of the PAT processing device (step S4420).

Figure 22:
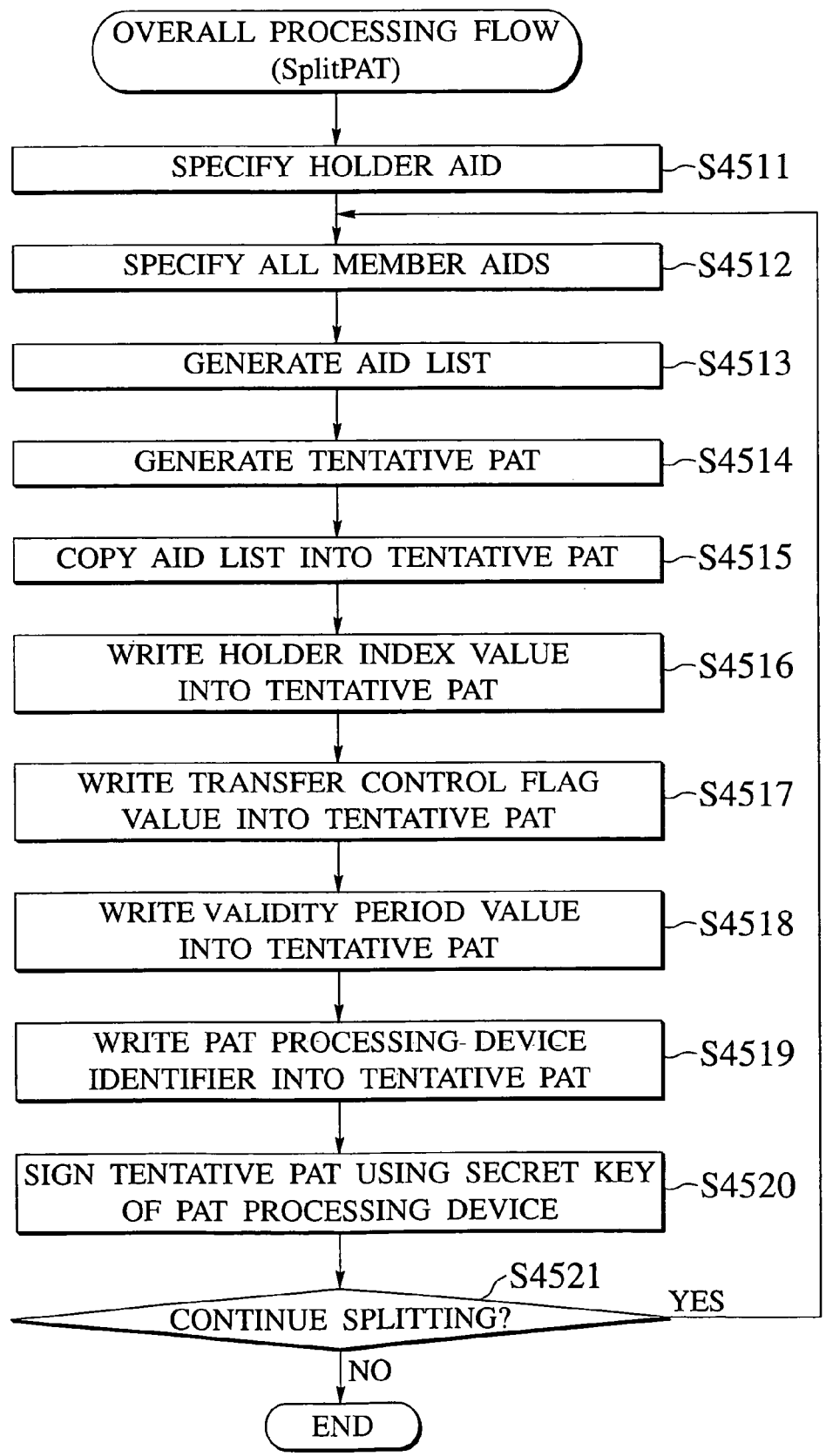
FIG. 22 is a flow chart showing an overall processing flow of SplitPAT processing according to the second embodiment of the present invention.

Next, the procedure of SplitPAT will be described with reference to FIG. 22.

(1) The holder AID is specified (step S4511).

(2) All the AIDs to be the member AIDs of the PATs after the splitting are specified (step S4512).

(3) The AID list is generated from the specified holder AID and all the specified member AIDs (step S4513). More specifically, the specified holder AID and all the specified member AIDs are concatenated using arbitrary means.

(4) A tentative PAT is generated using arbitrary means, similarly as in the case of a tentative AID (step S4514).

(5) The generated AID list is copied to a prescribed region of the generated tentative PAT (step S4515).

(6) The holder index value is written into the tentative pat to which the AID list has been copied (step S4516).

(7) The transfer control flag value is written into the tentative PAT into which the holder index value has been written (step S4517).

(8) The validity period value is written into the tentative PAT into which the transfer control flag value has been written (step S4518).

(9) The PAT processing device identifier is written into the tentative PAT into which the validity period value has been written (step S4519).

(10) The tentative PAT into which the PAT processing device identifier has been written is signed using the secret key of the PAT processing device (step S4520).

(11) In the case of continuing the splitting (step S4521 YES), the procedure returns to (2), and repeats (2) to (10) sequentially.

Note that, in the procedures of FIG. 21 and FIG. 22, the AID list generation is carried out according to FIG. 23 as follows. Namely, a buffer length is determined first (step S4611) and a buffer is generated (step S4612). Then, the holder AID is copied to a vacant region of the generated buffer (step S4613). Then, the member AID is copied to a vacant region of the resulting buffer (step S4614), and if the next member AID exists (step S4615 YES), the step S4614 is repeated.

Next, the determination of the holder AID will be described. Bach of the MakePAT, the MergePAT, the SplitPAT, and the TransPAT commands is defined to have two or more arguments, where AID, PAT, or Enabler can be specified as an argument. In this case, the PAT processing device specifies the holder AID of the PAT to be outputted after executing each command according to the following rules.

Case of the MakePAT:

For the MakePAT command, it is defined that AIDs are to be specified for the first argument to the N-th argument (N=2, 3, . . . ) and Enablers are to be specified for the N+1-th and subsequent arguments. For example, they can be specified as follows.

MakePAT $AID_1$, $AID_2$, . . . , $AID_N$, Enabler of $AID_1$, Enabler of $AID_2$, Enabler of $AID_N$ The PAT processing device interprets the AID of the first argument of the MakePAT command as the holder AID.

Only when one of the Enablers of the N+1-th and subsequent arguments corresponds to the AID of the first argument, the PAT processing device specifies this AID (that is the AID of the first argument) as the holder AID of the PAT to be outputted after executing the MakePAT command.

Case of the MergePAT:

For the MergePAT command, it is defined that PATs are to be specified for the first argument to the N-th argument (N=2, 3, . . . ) and Enabler is to be specified for the N+1-th argument. Namely, they can be specified as follows.

MergePAT $PAT_1$ $PAT_2$ . . . $PAT_N$ Enabler of AID

The PAT processing device interprets the holder AID of the PAT of the first argument of the MergePAT command as the holder AID of the PAT to be outputted after executing the MergePAT command.

Only when the Enabler of the N+1-th argument corresponds to the holder AID of the PAT of the first argument, the PAT processing device specifies this AID (that is the holder AID of the PAT of the first argument) as the holder AID of the PAT to be outputted after executing the MergePAT command.

Case of the SplitPAT:

For the SplitPAT command, it is defined that PAT is to be specified for the first argument, a set of one or more AIDs grouped together by some prescribed symbols (assumed to be parentheses ( ) in this example) are to be specified for the second argument to the N-th argument (N=3, 4, . . . ), and Enabler is to be specified for the N+1-th argument. Namely, they can be specified as follows.

SplitPAT $PAT_1$ ($AID_{11}$) ($AID_{21}$ $AID_{22}$) . . . ($AID_{N1}$ $AID_{N2}$ . . . $AID_{NM}$) Enabler of AID The PAT processing device interprets the holder AID of the PAT of the first argument of the SplitPAT command as the holder AID of the PAT to be outputted after executing the SplitPAT command.

Only when the Enabler of the N+1-th argument corresponds to the holder AID of the PAT of the first argument, the PAT processing device specifies this AID (that is the holder AID of the PAT of the first argument) as the holder AID of the PAT to be outputted after executing the SplitPAT command.

Case of the TransPAT:

For the TransPAT command, it is defined that PATs are to be specified for the first argument and the second argument, AID is to be specified for the third argument, and Enablers are to be specified for the fourth argument and the fifth argument. Namely, they can be specified as follows.

TransPAT $PAT_1$ $PAT_2$ AID Enabler of $AID_1$ Enabler of $AID_2$

The PAT processing device interprets the AID of the third argument as the holder AID of the PAT to be outputted after executing the TransPAT command provided that the AID of the third argument of the TransPAT command is contained in the PAT of the second argument.

Only when the Enabler of the fourth argument corresponds to both the PAT of the first argument and the PAT of the second argument and the Enabler of the fifth argument corresponds to the AID of the third argument, the PAT processing device specifies the AID of the third argument as the holder AID of the PAT to be outputted after executing the TransPAT command.

Next, the determination of the member AIDs will be described. The definitions of the MakePAT, the MergePAT, the SplitPAT, and the TransPAT commands are as described above. The PAT processing device specifies the member AIDs of the PAT to be outputted after executing each command according to the following rules.

Case of the MakePAT:

Only when the holder AID of the PAT to be outputted after executing the MakePAT command is formally determined, the PAT processing device interprets all the AIDs of the second and subsequent arguments of the MakePAT command as the member AIDs of the PAT to be outputted after executing the MakePAT command.

The PAT processing device specifies only those AIDs among all the AIDs of the second and subsequent arguments which correspond to the Enablers specified by the N+1-th and subsequent arguments as the member AIDs of the PAT to be outputted after executing the MakePAT command.

Case of the MergePAT:

Only when the holder AID of the PAT to be outputted after executing the MergePAT command is formally determined, the PAT processing device specifies the member AIDs of all the PATs specified by the first to N-th arguments of the MergePAT as the member AIDs of the PAT to be outputted after executing the MergePAT command.

Case of the SplitPAT:

Only when the holder AID of the PAT to be outputted after executing the SplitPAT command is formally determined, the PAT processing device specifies the member AID of the PAT specified by the first argument of the SplitPAT command as the member AID of the PAT to be outputted after executing the SplitPAT command. At this point, the member AIDs are distributed into different PATs in units of parentheses ( ). For example, in the case of:

SplitPAT PAT (AID$_{11}$) (AID$_{21}$ AID$_{22}$) . . . (AID$_{N1}$ AID$_{N2}$ . . . AID$_{NM}$) Enabler of AID (AID$_{11}$), (AID$_{21}$ AID$_{22}$) and (AID$_{N1}$ AID$_{N2}$ . . . AID$_{NM}$) will be the member AIDs of different PATs having a common holder AID.

Case of TransPAT:

Only when the holder AID of the PAT to be outputted after executing the TransPAT command is formally determined, the PAT processing device specifies all the member AIDs remaining after excluding the member AID that is scheduled to be a new holder AID from all the member AIDs of the PAT specified by the first argument of the TransPAT command and the member AIDs of the PAT specified by the second argument as the member AIDs of the PAT to be outputted after executing the TransPAT command.

Next, the verification of the properness of the Enabler will be described. This verification of the properness of the Enabler is common to the MakePAT, the MergePAT, the SplitPAT and the TransPAT, and carried out according to FIG. 24 as follows.

(1) AID and Enabler are entered (step S5511).

(2) Bach of these entered AID and Enabler is verified using the public key of the CA 1 (step S5512). If at least one of them is altered (step S5513 YES), the processing is terminated.

(3) A character string for certifying that it is Enabler is entered (step S5514).

(4) The top field of the Enabler of the step S5511 and the character string of the step S5514 are compared (step S5515). If they do not match (step S5516 NO), the processing is terminated.

(5) If they match (step S5516 YES), the AID of the step S5511 and the AID within the Enabler are compared (step S5517).

(6) A comparison result is outputted (step S5519).

Next, with references to FIG. 25 to FIG. 28, the third embodiment of the email access control scheme according to the present invention will be described in detail.

In the generation of a new PAT (MakePAT) and the PAT holder change (TransPAT) of the above described embodiment, it is necessary to give member AIDs and Enablers of member AIDs to the holder of the PAT, but when they are given to the holder, it becomes possible for that holder to participate the group communications hosted by the other holders by using the acquired member AIDs. Namely, there arises a problem that the pretending using the member AIDs become possible. Moreover, if that holder places the acquired member AIDs and Enablers of member AIDs on a medium that is readable by unspecified many, these member AIDs become accessible to anyone so that there arises a problem that the harassment to the users of the member AIDs may occur and the pretending using the member AIDs by a third person also become possible.

For this reason, in this third embodiment, it is made possible to carry out the MakePAT and the TransPAT without giving the Enablers of member AIDs to the holder.

To this end, in this third embodiment, the generation of a new PAT and the content change of the existing PAT are carried out by using Null-AID (AID$_{Null}$) and Enabler of Null-AID (Enabler of AID$_{Null}$).

Here, the processing involving the Null-AID obeys all of the following rules:

(a) the processing rules of MakePAT, MergePAT, SplitPAT and TransPAT as in the above described embodiment; and (b) the rules applicable only to the Null-AID, including:
(i) Null-AID is known to every user, and
(ii) Enabler of Null-AID is known to every user.

Here, the processing rules as defined in the above described embodiment in the case of this third embodiment will be described.

(1) Making a PAT from plural AIDs (MakePAT):

AID$_{holder}$+AID$_{member1}$+AID$_{member2}$+ . . . +AID$_{memberN}$
+Enabler of AID$_{member1}$+Enabler of AID$_{member2}$+ . . .
+Enabler of AID$_{memberN}$+Enabler of AID$_{holder}$
→PAT<AID$_{holder}$|AID$_{member1}$, AID$_{member2}$+ . . .
AID$_{memberN}$>

(2) Merging plural PATs of the same holder (MergePAT):

PAT<AID$_{holder}$ |AID$_{membera1}$, AID$_{membera2}$, . . . , AID$_{memberaM}$>
+PAT<AID$_{holder}$|AID$_{memberb1}$, AID$_{memberb2}$, . . . , AID$_{memberbN}$>
+Enabler of AID$_{holder}$
→PAT<AID$_{holder}$|AID$_{membera1}$, AID$_{membera2}$, . . . , AID$_{memberaM}$, AID$_{memberb1}$, AID$_{memberb2}$, . . . , AID$_{memberbN}$>

(3) Splitting a PAT into plural PATs of the same holder (SplitPAT):

PAT<AID$_{holder}$|AID$_{membera1}$, AID$_{membera2}$, . . . , AID$_{memberaM}$ AID$_{memberb1}$, AID$_{memberb2}$, . . . , AID$_{memberbN}$>
+Enabler of AID$_{holder}$
→PAT<AID$_{holder}$|AID$_{membera1}$, AID$_{membera2}$, . . . , AID$_{memberaM}$>
+PAT<AID$_{holder}$|AID$_{memberb1}$, AID$_{memberb2}$, . . . , AID$_{memberbN}$>

(4) Changing a holder AID of a PAT (TransPAT):

PAT<AID$_{holder}$|AID$_{membera1}$, AID$_{membera2}$, . . . , AID$_{memberaM}$>+PAT<AID$_{holder}$|AID$_{newholder}$>
+Enabler of AID$_{holder}$+Enabler of AID$_{newholder}$
→PAT<AID$_{newholder}$ |AID$_{membera1}$, AID$_{membera2}$, . . . , AID$_{memberaM}$>

The method for specifying the validity period value and the transfer control flag value in the PAT containing the Null-AID is similar to the method for specifying the validity period value and the transfer control flag value in the second embodiment described above. Next, the exemplary processings involving the Null-AID will be described.

(1) Case of producing PAT<$AID_{Null}|AID_A$> from $AID_A$ and Enabler of $AID_A$:

(a) According to the above described rules (b)(i) and (b)(ii) of the Null-AID, $AID_{Null}$ and Enabler of $AID_{Null}$ are known.

(b) Using MakePAT, $AID_{Null}$+$AID_A$+Enabler of $AID_A$+Enabler of $AID_{Null}$
→PAT<$AID_{Null}|AID_A$>.

(2) Case of producing PAT<$AID_{Null}|AID_A$, $AID_B$> from PAT<$AID_{Null}|AID_A$> and PAT<$AID_{Null}|AID_B$>:

(a) According to the above described rules (b)(i) and (b)(ii) of the Null-AID, $AID_{Null}$ and Enabler of $AID_{Null}$ are known.

(b) Using MergePAT,

PAT<$AID_{Null}|AID_A$>+PAT<$AID_{Null}|AID_B$>
+Enabler of $AID_{Null}$
→PAT<$AID_{Null}|AID_A$, $AID_B$>.

(3) Case of producing PAT<$AID_A|AID_B$> from PAT<$AID_{Null}|AID_A$>, PAT<$AID_{Null}|AID_B$> and Enabler of $AID_A$:

(a) According to the above described rules (b)(i) and (b)(ii) of the Null-AID, $AID_{Null}$ and Enabler of $AID_{Null}$ are known.

(b) Using TransPAT,

PAT<$AID_{Null}|AID_A$>+PAT<$AID_{Null}|AID_B$>
+Enabler of $AID_{Null}$+Enabler of $AID_A$
→PAT<$AID_A|AID_B$>.

As shown in FIG. 25, the data structure of the Null-AID comprises a character string uniquely indicating that it is Null-AID (a character string defined by the CA, for example), which is signed by the CA using the secret key of the CA.

Also, as shown in FIG. 26, the data structure of the Enabler of Null-AID comprises a character string uniquely indicating that it is Enabler (a character string defined by the CA, for example) and the Null-AID itself, which is signed by the CA using the secret key of the CA.

Note that the Null-AID and the Enabler of Null-AID are maintained at secure PAT processing devices and secure PAT certification authority.

Figure 27:
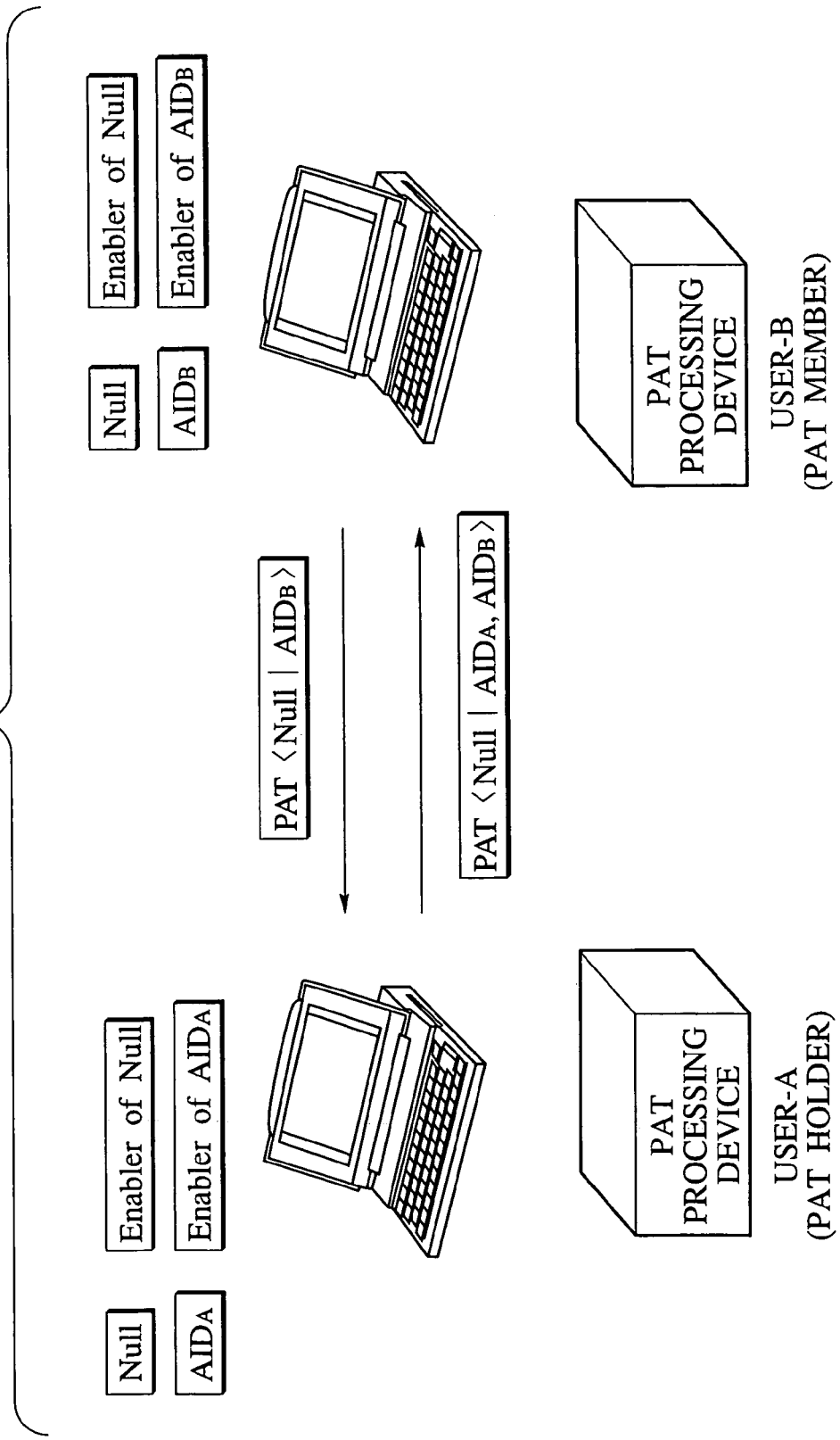
FIG. 27 is a diagram showing a first exemplary application of the third embodiment of the present invention.

Next, the first exemplary application of this third embodiment will be described with reference to FIG. 27, which includes the following operations.

(1) The user-B (PAT member) generates PAT<$AID_{Null}|AID_B$> by executing the above described exemplary processing (1) involving the Null-AID at the secure PAT processing device which is connected with the terminal of the user-B, and gives it to the user-A (PAT holder) by arbitrary means.

(2) The user-A who received PAT<$AID_{Null}|AID_B$> carries out the following operations at the secure PAT processing device which is connected with the terminal of the user-A.

(a) PAT<$AID_{Null}|AID_A$> is produced by executing the above described exemplary processing (1) involving the Null-AID.

(b) PAT<$AID_A|AID_B$> is produced by executing the above described exemplary processing (3) involving the Null-AID.

(3) The user-A gives the generated PAT<$AID_A|AID_B$> to the user-B by arbitrary means.

Note that the method for determining the validity period is the same as described above so that it will not be repeated here. Also, the processing involving the Null-AID is the same as described above so that it will not be repeated here.

In the case of giving PAT<$AID_{Null}|AID_A$, $AID_B$> to the user-B, the above described exemplary processing (2) involving the Null-AID will be executed in the operation (2) described above.

Figure 28:
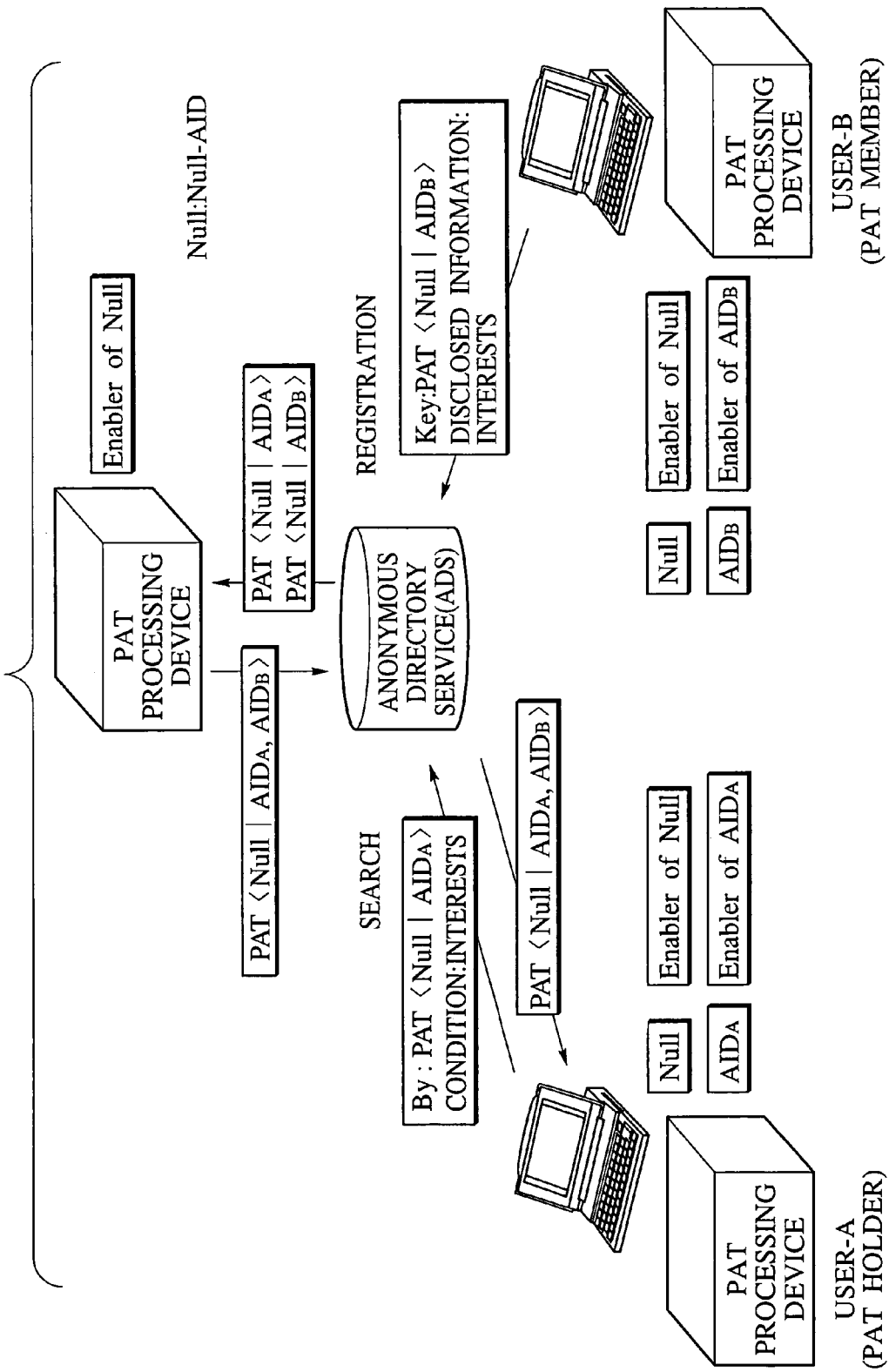
FIG. 28 is a diagram showing a second exemplary application of the third embodiment of the present invention.

Next, the second exemplary application of this third embodiment will be described with reference to FIG. 28, which includes the following operations.

(1) The user-B (PAT member) produces PAT<$AID_{Null}|AID_B$> by executing the above described exemplary processing (1) involving the Null-AID at the secure PAT processing device which is connected with the terminal of the user-B, and registers it along arbitrary disclosed information at the ADS.

(2) The user-A produces PAT<$AID_{Null}|AID_A$> by executing the above described exemplary processing (1) involving the Null-AID at the secure PAT processing device which is connected with the terminal of the user-A, and presents it along arbitrary search conditions to the ADS.

(3) When the personal information of the user-B satisfies the search conditions presented by the user-A, the secure PAT processing device connected with the ADS carries out the following operations.

(a) PAT<$AID_{Null}|AID_A$, $AID_B$> is produced by executing the above described exemplary processing (2) involving the Null-AID.

(b) The produced PAT<$AID_{Null}|AID_A$, $AID_B$> is given to the ADS.

(4) The ADS gives PAT<$AID_{Null}|AID_A$, $AID_B$> produced by the PAT processing device to the user-A.

(5) The user-A who received PAT<$AID_{Null}|AID_A$, $AID_B$> produces PAT<$AID_A|AID_B$> by executing the following TransPAT processing at the secure PAT processing device which is connected with the terminal of the user-A.

PAT<$AID_{Null}|AID_A$>+PAT<$AID_{Null}|AID_A$, $AID_B$>
+Enabler of $AID_{Null}$+Enabler of $AID_A$
→PAT<$AID_A|AID_B$>.

Note that the method for determining the validity period is the same as described above so that it will not be repeated here. Also, the processing involving the Null-AID is the same as described above so that it will not be repeated here.

In the case of generating PAT<$AID_A|AID_B$> at the PAT processing device connected with the ADS, Enabler of $AID_A$ will be given to that PAT processing device, and the above described exemplary processing (3) involving the Null-AID will be executed in the operation (3) described above.

In the case of generating PAT<$AID_B|AID_A$> at the PAT processing device connected with the ADS and giving it to the user-B, Enabler of $AID_B$ will be given to that PAT processing device, and the above described exemplary processing (3) involving the Null-AID will be executed in the operation (3) described above.

Next, with references to FIG. 29 to FIG. 31, the fourth embodiment of the email access control scheme according to the present invention will be described in detail.

In the group communication, a situation where it is desired to fix the participants is frequently encountered, but the above described embodiment does not have a function for making it impossible to change the PAT so that the participants cannot be fixed. Namely, in the above described embodiment, whether or not to fix the participants is left to the judgement of the holder of the PAT.

For this reason, in this fourth embodiment, a read only attribute is set up in the PAT. More specifically, in this fourth embodiment, the read only attribute is set up in the PAT by using God-AID ($AID_{God}$).

Figure 29:
FIG. 29 is a diagram showing an exemplary data structure of God-AID used in the fourth embodiment of the present invention.

Here, the processing involving the God-AID obeys all of the following rules:

(a) God-AID is known to every user, and (b) the processing involving God-AID is allowed only in the following cases:

(i) a case where the $AID_{holder}$ is neither $AID_{Null}$ nor $AID_{God}$:

$PAT<AID_{holder}|AID_{member1}, AID_{member2}, \ldots, AID_{memberN}>$+Enabler of $AID_{holder}$
→$PAT<AID_{god}|AID_{holder}, AID_{member1}, AID_{member\ 2}, \ldots, AID_{memberN}>$ (ii) a case where $AID_{holder}$ is $AID_{Null}$:

$PAT<AID_{Null}|AID_{member1}, AID_{member2}, \ldots, AID_{memberN}>$+Enabler of $AID_{Null}$
→$PAT<AID_{god}|AID_{member1}, AID_{member2}, \ldots, AID_{memberN}>$ As shown in FIG. 29, the data structure of the God-AID comprises a character string uniquely indicating that it is God-AID (a character string defined by the CA, for example), which is signed by the CA using the secret key of the CA. The God-AID is maintained at the secure PAT processing devices and the secure PAT certification authority described above.

The processings of a PAT that contains the Null-AID are according to FIG. 21 to FIG. 24. When the holder AID is neither Null-AID nor God-AID the God-AID is appended to the AID list and the holder index value is specified to be a position of the God-AID in the AID list after appending the God-AID. When the holder AID is Null-AID, the Null-AID is deleted from the AID list, the God-AID is appended to the AID list, and then the holder index value is specified to be a position of the God-AID in the AID list after appending the God-AID.

Next, the exemplary application of this fourth embodiment will be described with reference to FIG. 30.

Figure 30:
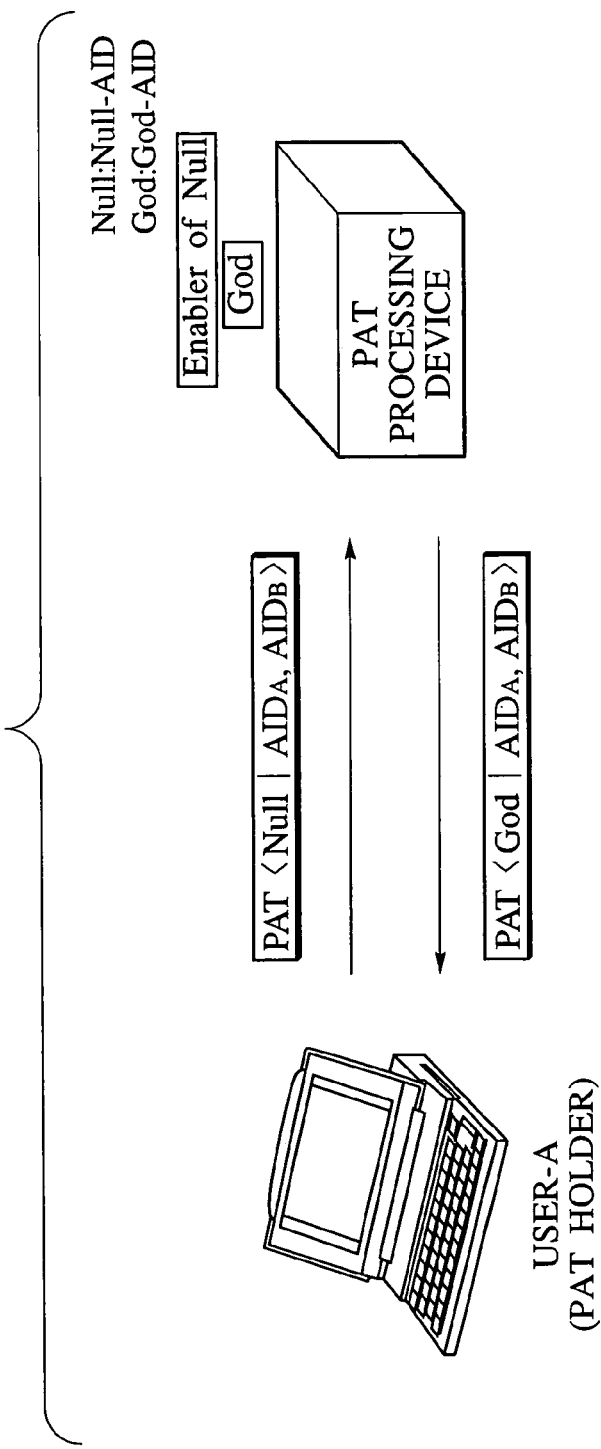
FIG. 30 is a diagram showing a first exemplary application of the fourth embodiment of the present invention.
Figure 31:
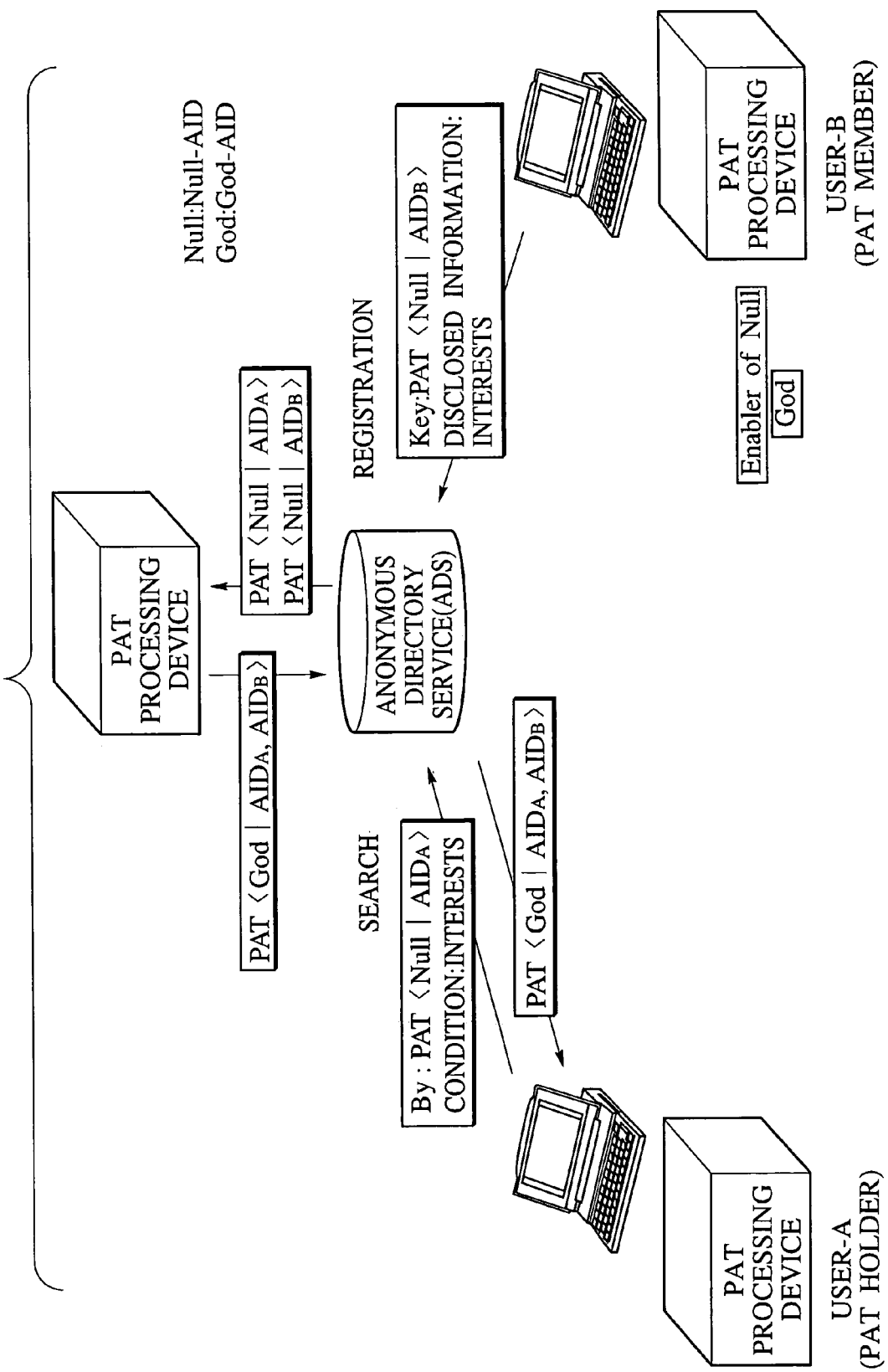
FIG. 31 is a diagram showing a second exemplary application of the fourth embodiment of the present invention.

In the case of producing $PAT<AID_{God}|AID_A, AID_B>$ from $PAT<AID_{Null}|AID_A>$ and $PAT<AID_{Null}|AID_B>$, the following processing is executed at the secure PAT processing device which is connected with the terminal of the PAT holder (user-A in FIG. 30).

(1) Using MergePAT, $PAT<AID_{Null}|AID_A>$+$PAT<AID_{Null}|AID_B>$
+Enabler of $AID_{Null}$
→$PAT<AID_{Null}|I\ AID_A, AID_B>$.

(2) According to the above described rule (a) of the God-AID, $AID_{God}$ is known.

(3) According to the above described rule (b)(ii) of the God-AID, $PAT<AID_{Null}\ |AIDA, AID_B>$+Enabler of $AID_{Null}$
→$PAT<AID_{god}|AID_A, AID_B>$ The above processing is also executed at the secure PAT processing device connected with a computer (search engine, etc.) of the third person (FIG. 31) or at the secure PAT certification authority.

Figure 32:
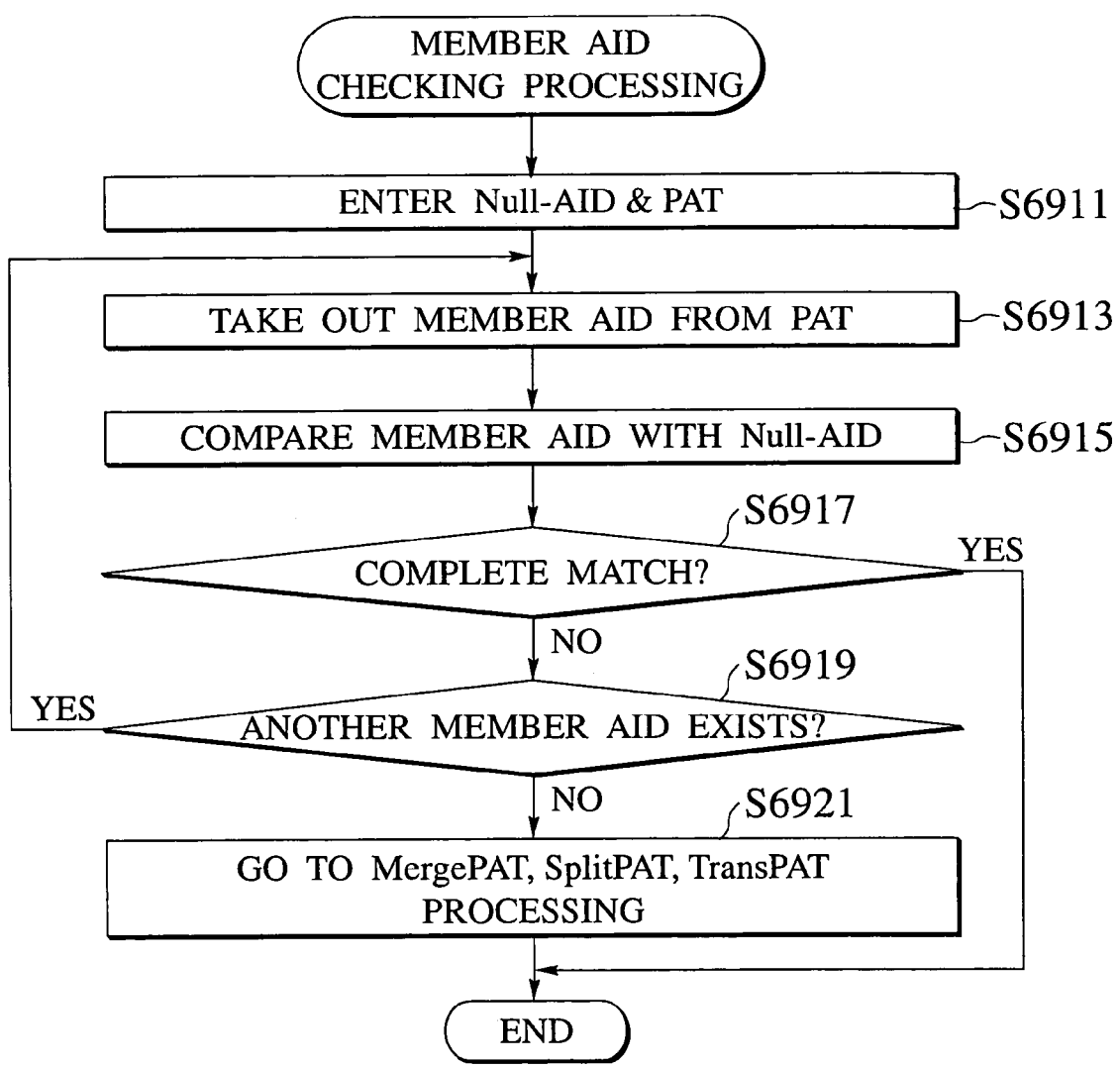
FIG. 32 is a flow chart for a member anonymous identification checking processing according to the fifth embodiment of the present invention.

Next, with reference to FIG. 32, the fifth embodiment of the email access control scheme according to the present invention will be described in detail.

When the Null-AID is added as described in the third embodiment, there arises a problem that it becomes possible for the holder of the PAT (the user of the holder AID) to transfer the access right with respect to the member (the user of the member AID) to the third person, and moreover this transfer can be done without a permission of the member, as will be described now.

(1) The holder-A of $PAT<AID_A|AID_B>$ (for the member-B) produces $PAT<AID_{Null}|AID_B>$ by using $PAT<AID_A|AID_B>$, $AID_A$ and Enabler of $AID_A$. Here, it is assumed that the holder-A knows all of $AID_A$, Enabler of $AID_A$, $AID_{Null}$, and Enabler of $AID_{Null}$ in addition to $PAT<AID_A|AID_B>$.

(a) The holder-A produces $PAT<AID_A|AID_{Null}>$ using the MakePAT as follows.

$AID_A$+$AID_{Null}$+Enabler of $AID_{Null}$+Enabler of $AID_A$
→$PAT<AID_A|AID_{Null}>$ (b) The holder-A produces $PAT<AID_{Null}|AID_B>$ using the TransPAT as follows.

$PAT<AID_A|AID_B>$+$PAT<AID_A|AID_{Null}>$
+Enabler of $AID_A$+Enabler of $AID_{Null}$
→*$PAT<AID_{Null}|AID_B>$ After the above described operation (1)(b), the holder-A gives $PAT<AID_{Null}|AID_B>$ to the third person-C, the following operation (2) becomes possible.

(2) The third person-C produces $PAT<AID_C|AID_B>$ by using $PAT<AID_{Null}|AID_B>$. Here, it is assumed that the third person-C knows all of $AID_C$, Enabler of $AID_C$, $AID_{Null}$, and Enabler of $AID_{Null}$ in addition to $PAT<AID_{Null}|AID_B>$.

(a) The third person-C produces $PAT<AID_{Null}|AID_C>$ using the MakePAT as follows.

$AID_{Null}$+$AID_C$+Enabler of $AID_C$+Enabler of $AID_{Null}$
→$PAT<AID_{Null}|AID_C>$ (b) The third person-C produces $PAT<AID_C|AID_B>$ using the TransPAT as follows.

$PAT<AID_{Null}|AID_B>$+$PAT<AID_{Null}|AID_C>$
+Enabler of $AID_{Null}$+Enabler of $AID_C$
→$PAT<AID_C|AID_B>$ As a result of the above described operation (2)(b), the third person-C obtains $PAT<AID_C|AID_B>$ so that accesses to the member-B become possible.

For this reason, in this fifth embodiment, it is made impossible for the holder of $PAT<AID_{holder}|AID_{member}>$ to produce $PAT<AID_{Null}|AID_{member}>$ from this $PAT<AID_{holder}|AID_{member}>$ as long as the holder does not know Enabler of $AID_{member}$.

In the third embodiment described above, in order for the PAT holder to produce $PAT<AID_{Null}|AID_{member}>$ without using Enabler of $AID_{member}$, it is necessary to produce $PAT<AID_{holder}|AID_{Null}>$.

To this end, in this fifth embodiment, for the Null-AID described in the third embodiment, the following rule is added:

the Null-AID can be used only as the holder AID of the PAT (the Null-AID cannot be used as the member AID).

That is, $PAT<AID_{Null}|AID_{member1}, AID_{member2}, \ldots, AID_{memberN}>$ is allowed, but $PAT<AID_{holder}|AID_{Null}, AID_{member1}, AID_{member2}, \ldots, AID_{memberN}>$ is not allowed.

Each of the secure PAT processing devices and the secure PAT certification authority is additionally equipped with a function for checking whether the Null-AID is contained as the member AID or not. This member AID checking processing is carried out according to FIG. 32 as follows.

(1) Null-AID and PAT are entered (step S6911).

(2) All the member AIDs are taken out from the PAT entered at the step S6911 (step S6913).

(3) Bach of the taken out member AIDs is compared with the Null-AID entered at the step S6911 (step S6915).

If all the member AIDs do not completely match with the Null-AID (step S6917 NO, step S6919 NO), the processing proceeds to the MergePAT, SplitPAT or TransPAT processing (FIG. 21 or FIG. 22) (step S6921).

If there is a member AID that completely matches with the Null-AID (step S6917 YES), the processing is terminated.

Next, with reference to FIG. 33 to FIG. 39, the sixth embodiment of the email access control scheme according to the present invention will be described in detail.

Figure 34:
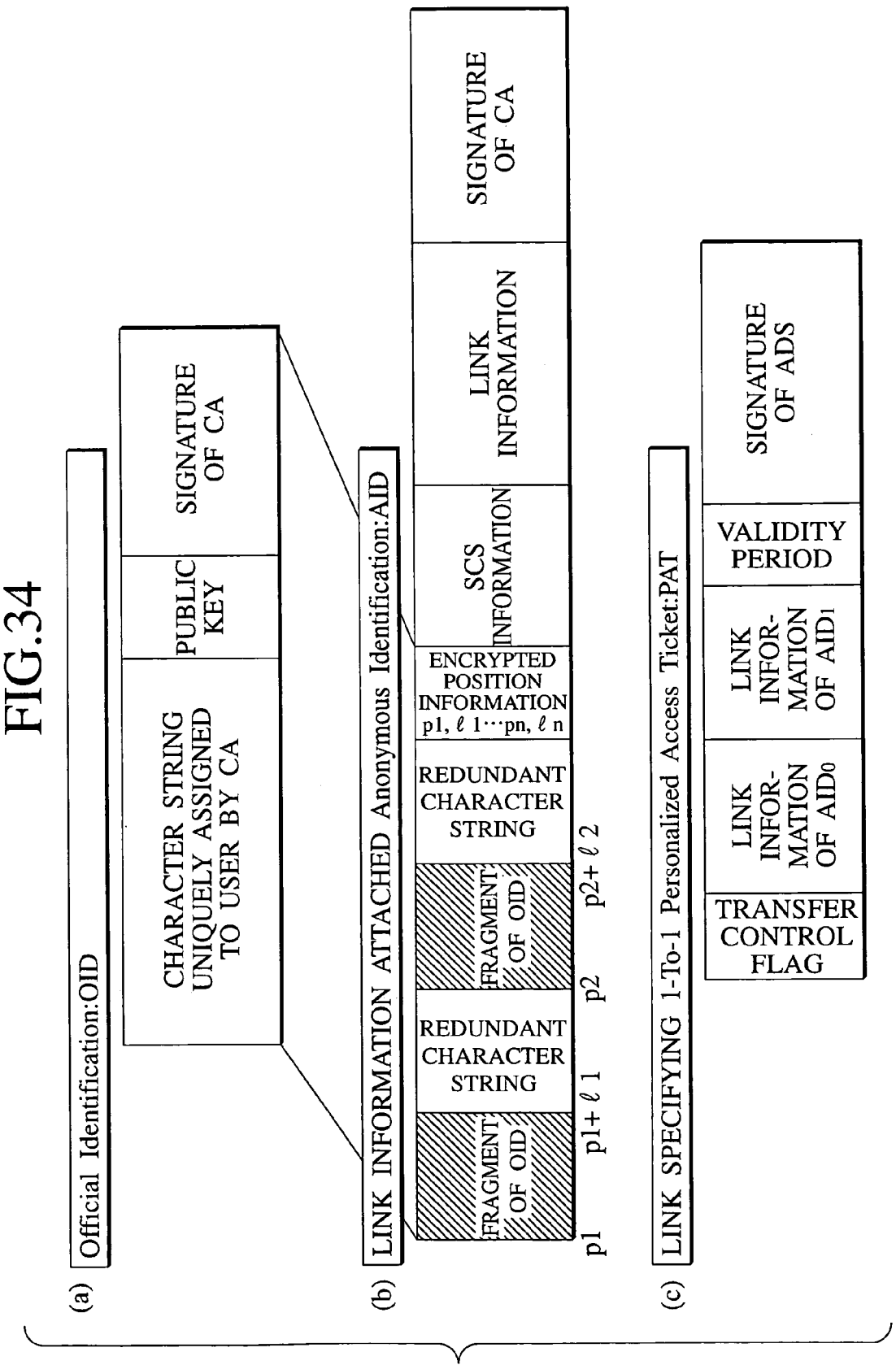
FIG. 34 is a diagram showing exemplary data structures of an official identification, a link information attached anonymous identification, and a link specifying 1-to-1 personalized access ticket according to the sixth embodiment of the present invention.

This sixth embodiment differs from the first embodiment described above in that a link information is added to the AID of FIG. 2 used in the first embodiment, as shown in a part (b) of FIG. 34, while a link information of the AID is set instead of the AID itself that is contained in the 1-to-1 PAT of FIG. 2, as shown in a part (c) of FIG. 34, such that the AID is uniquely identified by the link information.

Note that such an AID to which the link information is added will be referred to as a link information attached AID, and a 1-to-1 PAT having the link information of the AID will be referred to as a link specifying 1-to-1 PAT. Also, the link information is an information capable of uniquely identifying the AID, which is given by a kind of data generally known as identifier such as a serial number uniquely assigned to the AID by the CA for example.

Figure 33:
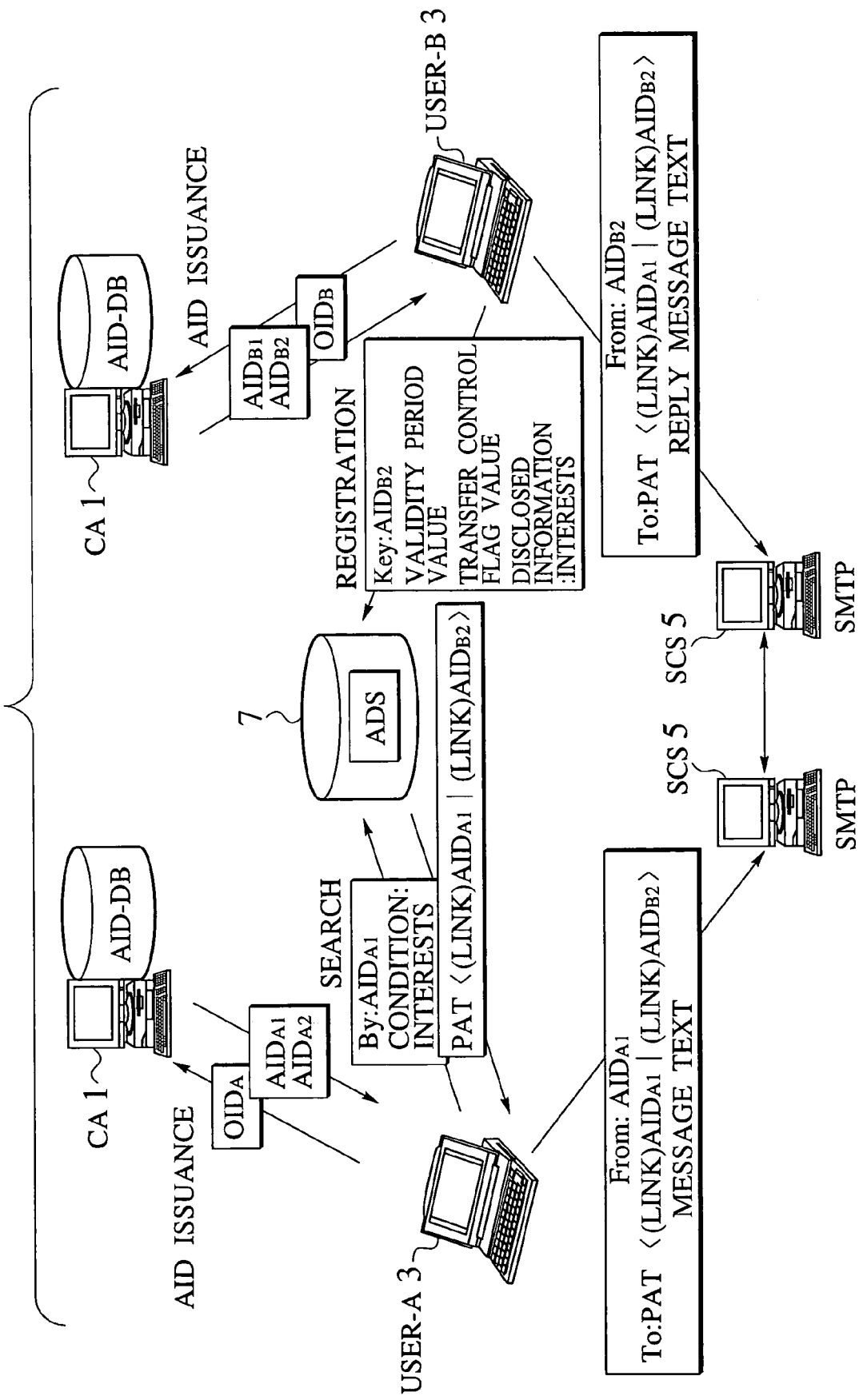
FIG. 33 is a diagram showing an overall configuration of a communication system according to the sixth embodiment of the present invention.

FIG. 33 shows an overall configuration of a communication system in this sixth embodiment.

In FIG. 33, the CA (Certification Authority) 1 has a right to authenticate OIDs and a right to issue AIDs, and functions to allocate AIDs to users 3.

The SCS (Secure Communication Service) 5 transfers emails among the users 3, carries out the receiving refusal and the identity judgement and the extraction of the OID according to the need.

The ADS (Anonymous Directory Service) 7 is a database for managing the AID, the transfer-control flag value, the validity period value, and the disclosed information of each user 3. The ADS 7 has a function to generate the PAT from the AID of a searcher and the AID of a registrant who satisfies the search conditions, and issue it to the searcher.

A series of processing from generating the AID from the OID according to a request from a user until allocating the AID to that user is basically the same as in the first embodiment, except that the link information is to be added, which will now be described with reference to FIG. 34.

FIG. 34 shows exemplary formats of the OID, the link information attached AID, and the link specifying 1-to-1 PAT. As shown in a part (a) of FIG. 34, the OID is an information comprising an arbitrary character string according to a rule by which the CA 1 can uniquely identify the user and a public key, which is signed by the CA 1.

Also, as shown in a part (b) of FIG. 34, the link information attached AID is an information comprising fragments of the OID and their position information, redundant character strings, an SCS information given by an arbitrary character string (host name, real domain name, etc.) by which a host or a domain that is operating the SCS 5 can be uniquely identified on the network, and the link information, which is signed by the CA 1.

Also, as shown in a part (c) of FIG. 34, the link specifying 1-to-1 PAT is an information comprising the transfer control flag, the link information of $AID_0$, the link information of $AID_1$, and the validity period, which is signed by the ADS 7 using a secret key of the ADS 7.

A procedure by which the user 3 requests the link information attached AID to the CA 1 is the same as that of the first embodiment. A procedure by which the CA 1 issues the link information attached AID to the user 3 in response to a request for the AID is also the same as that of the first embodiment.

Next, the link information attached AID generation processing at the CA will be described with reference to FIG. 35.

Figure 35:
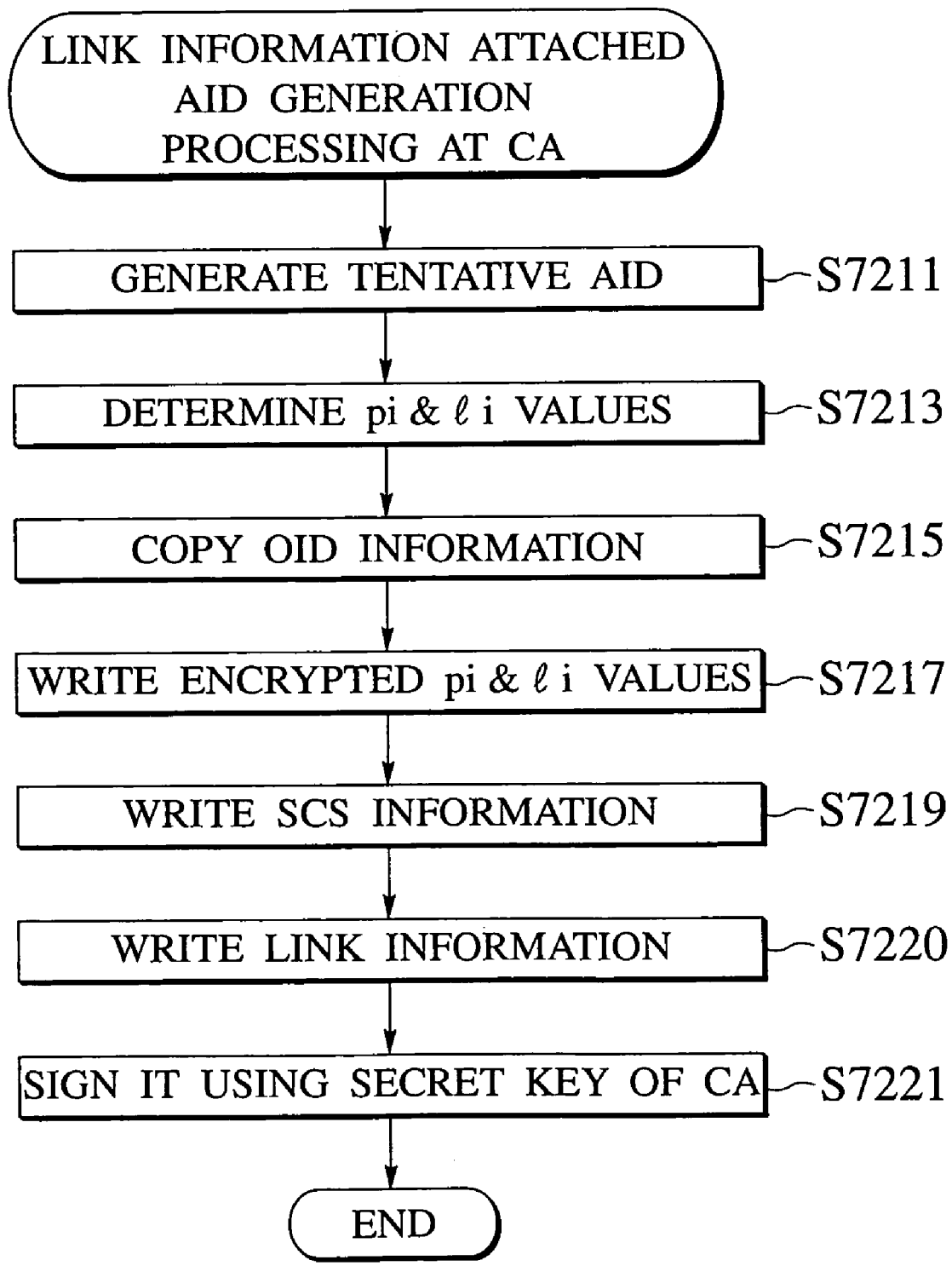
FIG. 35 is a flow chart for a link information attached anonymous identification generation processing at a certification authority according to the sixth embodiment of the present invention.

In the procedure of FIG. 35, the CA 1 generates an information of a length equal to the total length L of the OID, and sets this information as a tentative AID (step S7211). Then, in order to carry out the partial copying of the OID, values of parameters $p_i$ and $l_i$ for specifying a copying region are determined using arbitrary means such as random number generation respectively (step S7213). Here, L is equal to the total length L of the OID, and $l_i$ is an arbitrarily defined value within a range in which a relationship of $0 \leq l_i \leq L$ holds. Then, an information in a range between a position $p_i$ to a position $p_i+l_i$ from the top of the OID is copied to the same positions in the tentative AID (step S7215). In other words, this OID fragment will be copies to a range between a position $p_i$ and a position $p_i+l_i$ from the top of the tentative AID. Then, the values of $p_i$ and $l_i$ are written into a prescribed range in the tentative AID into which the OID has been partially copied, in a form encrypted by an arbitrary means (step S7217). Then, an SCS information given by an arbitrary character string (host name, real domain, etc.) that can uniquely identify a host or a domain that is operating the SCS 5 on the network is written into a prescribed range in the tentative AID into which these values are written (step S7219). Then, the link information is written (step S7220). Then, the tentative AID into which the above character string and the link information are written is signed using a secret key of the CA 1 (step S7221).

Next, a procedure for registering the AID of a user-B 3 and the disclosed information into the ADS 7 will be described. First, the bidirectional authentication by arbitrary means using the AID of the user-B 3 and the certificate of the ADS 7 is carried out between the user-B 3 who is a registrant and the ADS 7. Then, the user-B 3 transmits the transfer control flag value, the validity period value, and the disclosed information such as interests to the ADS 7. Then, the ADS 7 stores the transfer control flag value, the validity period value, and the entire disclosed information in relation to the AID of the user-B 3 in its storage device. Here, there can be cases where communications between the user-B 3 who is the registrant and the ADS 7 are to be encrypted.

Next, a procedure by which a user-A 3 searches through the disclosed information that is registered in the ADS 7 will be described. First, the bidirectional authentication by arbitrary means using the AID of the user-A 3 and the certificate of the ADS 7 is carried out between the user-A 3 who is a searcher and the ADS 7. Then, the user-A 3 transmits arbitrary search conditions to the ADS 7. Then, the ADS 7 presents all the received search conditions to its storage device, and extracts the AID of a registrant which satisfies these search conditions. Then, the ADS 7 generates the link specifying 1-to-1 PAT from the link information of the AID of the user-A 3 and the link information of the AID of the registrant who satisfied the search conditions, the transfer control flag value, and the validity period value. Then, the ADS 7 transmits the generated PAT to the user-A 3. Here, there can be cases where communications between the user-A 3 who is a searcher and the ADS 7 are to be encrypted. Note that the link specifying 1-to-1 PAT is generated as a search result of the ADS 7.

Figure 36:
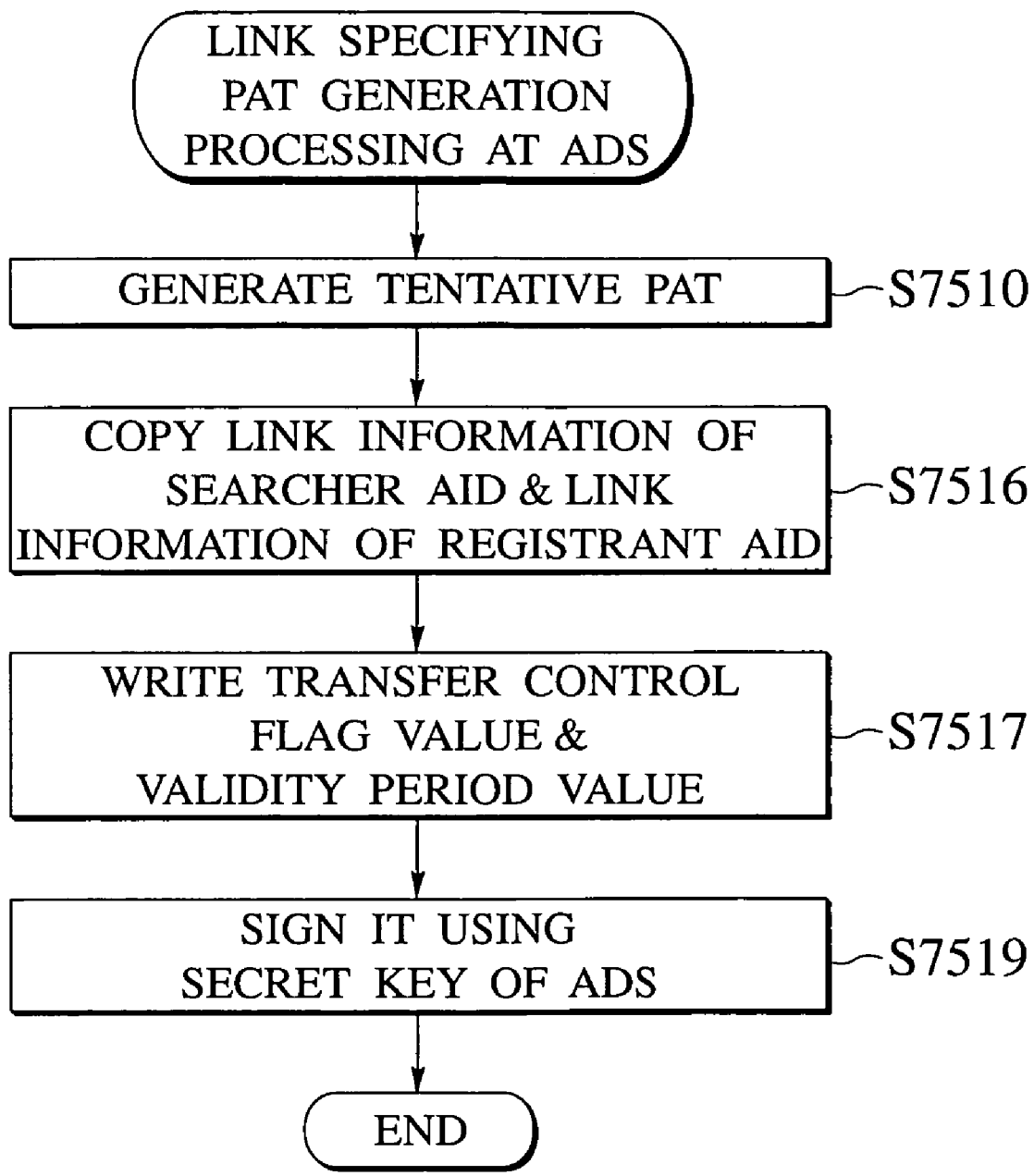
FIG. 36 is a flow chart for a link specifying 1-to-1 personalized access ticket generation processing at an anonymous directory service according to the sixth embodiment of the present invention.

Next, the link specifying 1-to-1 PAT generation processing at the ADS 7 will be described with reference to FIG. 36.

First, an information of a prescribed length is generated, and this information is set as a tentative PAT (step S7510). Then, the link information of the AID of the user-A 3 who is a searcher and the link information of the AID of the user-B 3 who is a registrant are copied into a prescribed region of the tentative PAT (step S7516). Then, the transfer control flag value and the validity period value are written into respective prescribed regions of the tentative PAT into which the link informations of the AIDs are copied (step S7517). Then, the tentative PAT into which these values are written is signed using a secret key of the ADS 7 (step S7519).

Next, the transfer control using the link specifying 1-to-1 PAT will be described. The transfer control is a function for limiting accesses to a user who has a proper access right from a third person to whom the PAT has been transferred or who has eavesdropped the PAT (a user who originally does not have the access right).

The ADS 7 and the user-B 3 of the registrant AID can prohibit a connection to the user-B 3 from a third person who does not have the access right, by setting a certain value in to the transfer control flag of the PAT.

When the transfer control flag value is set to be 1, the sender's AID is authenticated between the SCS 5 and the sender according to an arbitrary challenge/response process, so that even if the sender gives both the sender's AID and the PAT to another user other than the sender, that another user will not be able to make a connection to the registrant of the ADS 7 through the SCS 5.

On the other hand, when the transfer control flag value is set to be 0, no challenge/response process will be carried out between the SCS 5 and the sender, so that if the sender gives both the sender's AID and the PAT to another user other than the sender, that another user will also be able to make a connection to the registrant of the ADS 7 through the SCS 5.

Figure 37:
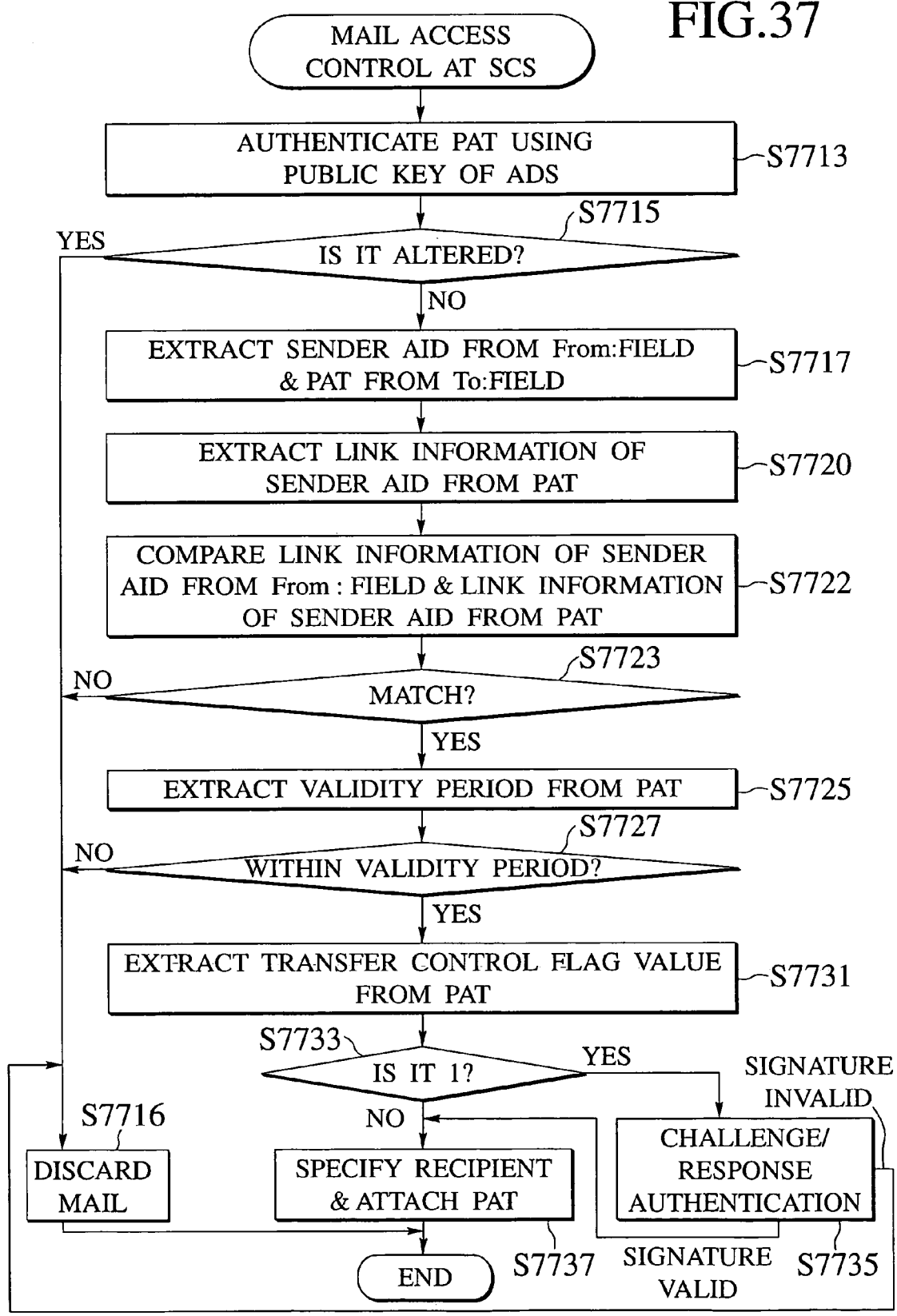
FIG. 37 is a flow chart for a mail access control processing at a secure communication service according to the sixth embodiment of the present invention.

Next, the email access control method at the SCS 5 will be described with reference to FIG. 37.

The sender specifies "[sender's AID]@[real domain of SCS of sender]" in From: line, and "[PAT]@[real domain of SCS of sender]" in To: line.

The SCS 5 acquires a mail received by an MTA (Message Transfer Agent) such as SMTP (Simple Mail Transfer Protocol), and executes the processing of FIG. 37 as follows.

(1) The signature of the PAT is verified using a public key of the ADS 7 (step S7713).

When the PAT is found to have been altered (step S7715 YES), the mail is discarded and the processing is terminated (step S7716).

When the PAT is found to have been not altered (step S7715 NO), the following processing (2) is executed.

(2) The search is carried out by presenting the link information of the sender's AID to the PAT (steps S7717, S7720, S7722).

When a link information that completely matches with the link information of the sender's AID is not contained in the PAT (step S7723 NO), the mail is discarded and the processing is terminated (step S7716).

When a link information that completely matches with the link information of the sender's AID is contained in the PAT (step S7723 YES), the following processing (3) is executed.

(3) The validity period value of the PAT is evaluated (steps S7725, S7727).

When the PAT is outside the validity period (step S7727 NO), the mail is discarded and the processing is terminated (step S7716).

When the PAT is within the validity period (step S7727 YES), the following processing (4) is executed.

(4) Whether or not to authenticate the sender is determined by referring to the transfer control flag value of the PAT (steps S7731, S7733).

When the value is 1 (step S7733 YES), the SCS 5 acquires the sender's AID itself and the public key of the sender's AID by presenting the link information to the CA 1, and then the challenge/response authentication between the SCS 5 and the sender is carried out, and the signature of the sender is verified (step S7735). When the signature is valid, the recipient is specified and the PAT is attached (step S7737). When the signature is invalid, the mail is discarded and the processing is terminated (step S7716).

When the value is 0 (step S7733 NO), the recipient is specified and the PAT is attached without executing the challenge/response authentication (step S7737).

The challenge/response authentication between the SCS 5 and the sender is the same as that for the 1-to-1 PAT described above.

Next, a method for specifying the recipient at the SCS 5 will be described. First, the SCS 5 carries out the search by presenting the link information of the sender's AID to the PAT, so as to acquire all the link informations which do not completely match the link information of the sender's AID. Then, the search is carried out by presenting all these acquired link informations to the CA 1 so as to acquire the AIDs. All these acquired AIDs will be defined as recipient's AIDs hereafter. Then, for every recipient's AID, the real domain of SCS of recipient is taken out from the recipient's AID. Then, the recipient is specified in a format of "[recipient's AID]@[real domain of SCS of recipient]". Finally, the SCS 5 changes the sender from a format of "[sender's AID]@[real domain of SCS of sender]" to a format of "sender's AID".

The method for attaching the PAT at the SCS 5 is the same as that for the 1-to-1 PAT described above.

Next, a method of receiving refusal with respect to the PAT at the SCS 5 will be described.

Receiving refusal setting: The bidirectional authentication is carried out by an arbitrary means between the user and the SCS 5. Then, the user transmits a registration command, his/her own AID, and arbitrary PATs 20- to the SCS 5. Then, the SCS 5 verifies the signature of the received AID. If the signature is invalid, the processing as of the SCS 5 is terminated. If the signature is valid, the SCS 5 next verifies the signature of each received PAT using a public key of the ADS. Those PATs with the invalid signature are discarded by the SCS 5. When the signature is valid, the SCS 5 takes out the link information from the received AID, and then carries out the search by presenting the taken out link information to each PAT. For each of those PATs which contain the link information that completely matches with the link information of the received AID, the SCS 5 presents the registration command and the PAT to the storage device such that the PAT is registered into the storage device. Those PATs which do not contain the link information that completely matches with the link information of the received AID are discarded by the SCS 5 without storing them into the storage device. Here, there can be cases where communications between the user and the SCS 5 are to be encrypted.

Receiving refusal execution: The SCS 5 carries out the search by presenting the PAT to the storage device. When a PAT that completely matches the presented PAT is registered in the storage device, the mail is discarded. When a PAT that completely matches the present PAT is not registered in the storage device, the mail is not discarded.

Receiving refusal cancellation: The bidirectional authentication is carried out by an arbitrary means between the user and the SCS 5. Then, the user presents his/her own AID to the SCS 5. Then, the SCS 5 verifies the signature of the received AID. If the signature is invalid, the processing of the SCS 5 is terminated. If the signature is valid, the SCS 5, next takes out the link information from the presented AID, and presents the taken out link information as a search condition to the storage device and acquire all the PATs that contain the presented link information, and then presents all the acquired PATs to the user. Then, the user selects all the PATs for which the receiving refusal is to be cancelled by referring to all the PATs presented from the SCS 5, and transmits all the selected PATs along with a deletion command to the SCS 5. Upon receiving the deletion command and all the PATs for which the receiving refusal is to be cancelled, the SCS 5 presents the deletion command and all the PATs received from the user to the storage device, such that all the received PATs are deleted from the storage-device.

Note that the method of receiving refusal with respect to the link specifying 1-to-N PAT at the SCS 5 is the same as the method of receiving refusal with respect to the link specifying 1-to-1 PAT described above.

Figure 38:
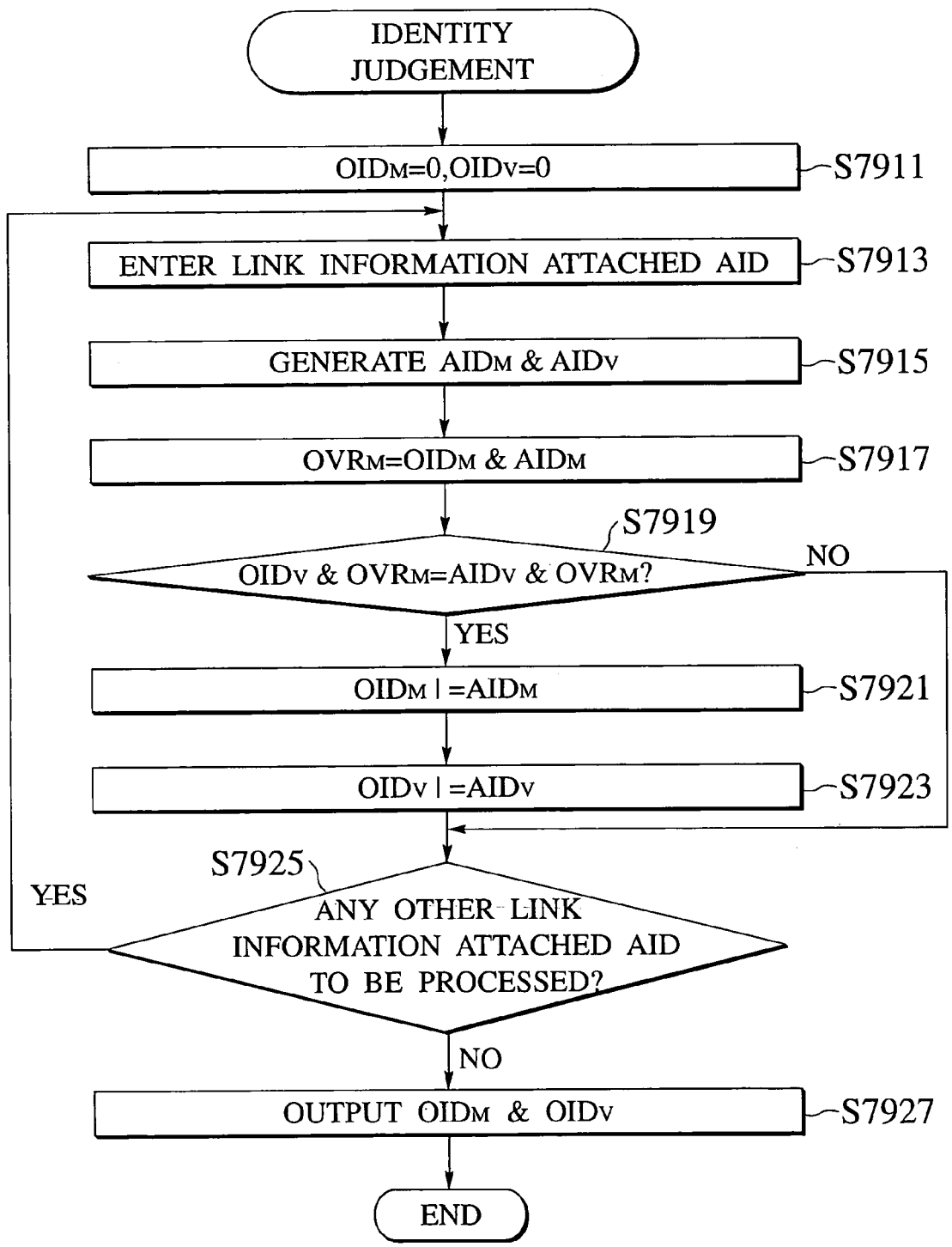
FIG. 38 is a flow chart for an anonymous identification identity judgement processing at a secure communication service according to the sixth embodiment of the present invention.
Figure 39:
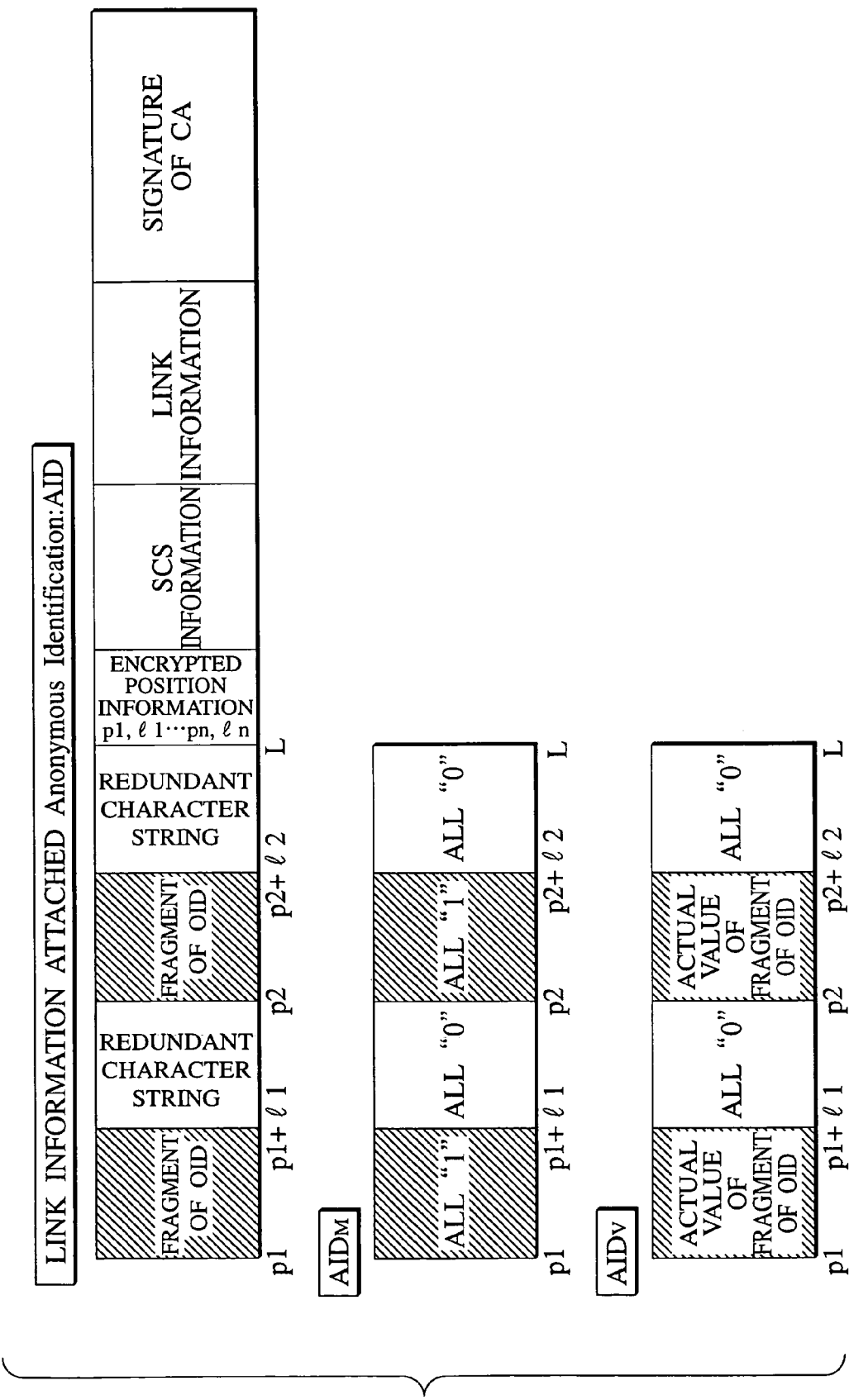
FIG. 39 is a diagram showing exemplary data structures of data used in the anonymous identification identity judgement processing of FIG. 38.

Next, the judgement of identity will be described with reference to FIG. 38 and FIG. 39.

(1) An initial value of a variable $OID_M$ is defined as a bit sequence with a length equal to the total length L of the OID and all values equal to "0". Also, an initial value of a variable $OID_U$ is defined as a bit sequence with a length equal to the total length of the OID and all values equal to "0" (step S7911).

(2) One link information attached AID is selected from a set of processing target link information attached AIDs, and the following bit processing is carried out (step S7913).

(a) Values of variables $AID_M$ and $AID_U$ are determined according to the position information contained in the link information attached AID (step S7915). Here, $AID_M$ is defined as a bit sequence with a length equal to the total length L of the OID and a value of a position at which the OID information is defined is "1" while a value of a position at which the OID information is not defined is "0" (see FIG. 39). Also, $AID_U$ is defined as a bit sequence with a length equal to the total length L of the OID and a value of a position at which the OID information is defined is an actual value of the OID information while a value of a position at which the OID information is not defined is 0 (see FIG. 39).

(b) AND processing of $OID_M$ and $AID_M$ is carried out and its result is substituted into a variable $OVR_M$ (step S7917).

(c) AND processing of $OVR_M$ and $AID_M$ as well as AND processing of $OVR_M$ and $OID_M$ are carried out and their results are compared (step S7919). When they coincide, OR processing of $OID_M$ and $AID_M$ is carried out and its result is substituted into $OID_M$ (step S7921), while OR processing of $OID_U$ and $AID_U$ is also carried out and its result is substituted into $OID_M$ (step S7923). On the other hand, when they do not coincide, the processing proceeds to the step S7925.

(d) A link information attached AID to be processed next is selected from a set of processing target link information attached AIDs. When at least one another link information attached AID is contained in the set, the steps S7913 to S7923 are executed for that another link information attached AID. When no other link information attached AID is contained in the set, the processing proceeds to the step S7927.

(e) Values of $OID_M$ and $OID_U$ are outputted (step S7927).

The value of $OID_M$ that is eventually obtained indicates all positions of the OID information that can be recovered from the set of processing target link information attached AIDs. Also, the value of $OID_U$ that is eventually obtained indicates all the OID information that can be recovered from the set of processing target link information attached AID. In other words, by using the values of $OID_M$ and $OID_U$, it is possible to obtain the OID albeit probabilistically when the value of $OID_U$ is used as a search condition, and it is possible to quantitatively evaluate a precision of the above search by a ratio $OID_M/L$ with respect to the total length L of the OID.

As described above, in this sixth embodiment, the CA 1 which is a Trusted Third Party with high secrecy and credibility generates the link information attached AID in which the personal information is concealed, from the OID that contains the highly secret personal information such as name, telephone number, real email address, etc., according to a user request, and issues the AID to the user. By identifying the user by this AID on the communication network as well as in various services provided on the communication network, it becomes possible to provide both the anonymity guarantee and the identity guarantee for the user. In other words, it becomes possible for the user to communicate with another user without revealing the own real name, telephone number, email address, etc., to that another user, and it also becomes possible to disclose the disclosed information to unspecified many through the ADS 7 as will be described below.

The user registers the disclosed information, that is an information which is supposed to have a low secrecy compared with the personal information at the ADS 7. In the case of searching the disclosed information and the registrant AID, the searcher presents the link information attached AID of the searcher and arbitrary search conditions to the ADS 7. The ADS 7 then extracts the registrant link information attached AID that satisfies these search conditions, and generates the link specifying 1-to-1 PAT from the link information of the AID of the searcher and the link information of the AID of the registrant who satisfied the search conditions, the transfer control flag value, and the validity period value.

In this link specifying 1-to-1 PAT, the transfer control flag value and the validity period value are set as shown a part (c) of FIG. 34, and by setting up this validity period in advance, it is possible to limit connections from the sender.

It is also possible to prohibit connections from a third person who does not have the access right, by using the transfer control flag value. Namely, when the transfer control flag value is set to be 1, the sender's AID is authenticated between the SCS 5 and the sender according to an arbitrary challenge/response process, so that even if the sender gives both the sender's AID and the PAT to another user other than the sender, that another user will not be able to make a connection to the registrant of the ADS 7 through the SCS 5. On the other hand, when the transfer control flag value is set to be 0, no challenge/response process will be carried out between the SCS 5 and the sender, so that if the sender gives both the sender's AID and the PAT to another user other than the sender, that another user will also be able to make a connection to the registrant of the ADS 7 through the SCS 5.

It is also possible to make a connection request to the communication network such that a call for which the recipient is specified by the link specifying 1-to-1 PAT will be received by the recipient's AID or the sender's AID specified by the link information of the link specifying 1-to-1 PAT. In addition, it is also possible to refuse receiving calls with the link specifying 1-to-1 PAT selected by the recipient among calls which are specified by the link specifying 1-to-1 PAT. It is also possible to cancel the receiving refusal of the calls with the link specifying 1-to-1 PAT selected by the recipient. In addition, as a measure against the sender who repeats the personal attack using a plurality of sender's AIDs by taking an advantage of the anonymity, it is possible to judge the identity of the OID from these plurality of sender's AIDs and it is possible to extract that OID at some probability.

Next, with references to FIG. 40 to FIG. 49, the seventh embodiment of the email access control scheme according to the present invention will be described in detail.

In contrast to the sixth embodiment described above which is directed to the case where a sender and a recipient are set in 1-to-1 correspondence, this seventh embodiment is directed to the case where a sender and recipients are set in 1-to-N correspondence and a generation of a new link specifying 1-to-N PAT and a content change of the existing link specifying 1-to-N PAT can be made by the initiative of a user, similarly as in the second embodiment described above. Here, the sender is either a holder of the PAT or a member of the PAT. Similarly, the recipient is either a holder of the PAT or a member of the PAT.

As described in the second embodiment, in general, a membership of a group communication (mailing list, etc.) is changing dynamically so that it is necessary for a host of the group communication to manage information on a point of contact such as telephone number, email-address, etc., of each member. In contrast, in the case where it is possible to newly generate a 1-to-1 PAT as in the sixth embodiment, the management of a point of contact is difficult. For example, it is difficult to manage the group collectively, and even if it is given to the others for the purpose of the transfer control, it does not function as an address of the group communication such as mailing list.

In this seventh embodiment, in order to resolve such a problem, it is made possible to carry out a generation of a new link specifying 1-to-N PAT and a content change or the existing link specifying 1-to-N PAT by the initiative of a user.

Figure 41:
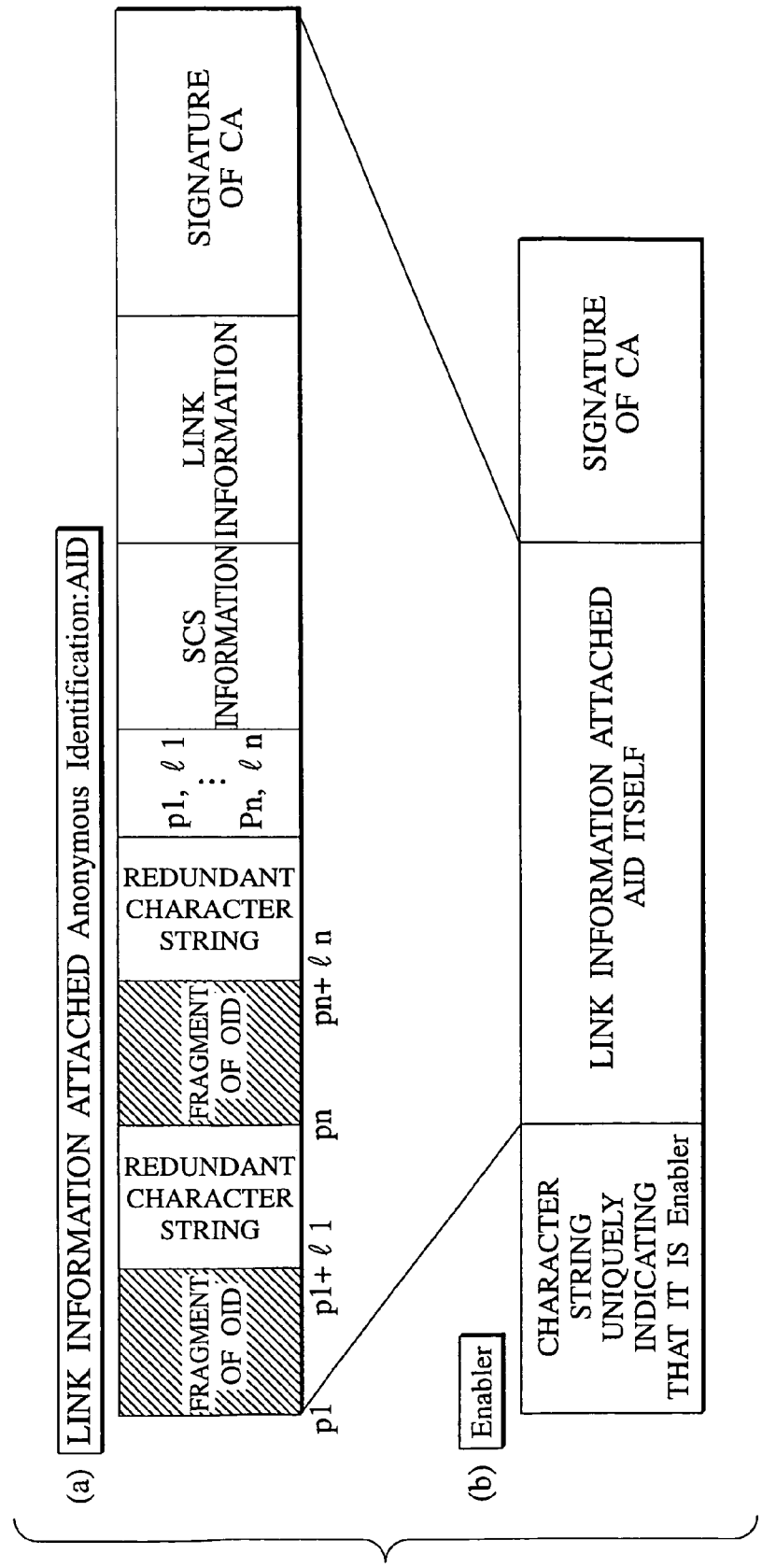
FIG. 41 is a diagram showing exemplary data structures of a link information attached anonymous identification and an enabler according to the seventh embodiment of the present invention.

First, the definition of various identifications used in this seventh embodiment will be described with references to FIG. 40 and FIG. 41.

As shown in a part (a) of FIG. 40, the OID is an information comprising an arbitrary character string (telephone number, email address, etc.) according to a rule by which the CA 1 can uniquely identify the user and a public key, which is signed by the CA 1.

Also, as shown in a part (b) of FIG. 40, the link information attached AID is an information comprising fragments of the OID and their position information, redundant character strings, an SCS information given by an arbitrary character string (host name, real domain name, etc.) by which a host or a domain that is operating the SCS 5 can be uniquely identified on the network, and a link information, which is signed by the CA 1. Note that the AID may be encrypted at the SCS 5 or the CA 1. The link information is the same as in the sixth embodiment.

Also, as shown in a part (c) of FIG. 40, the link specifying 1-to-N PAT is an information comprising two or more link informations of AIDs, a holder index, the validity period, the transfer control flag, and a PAT processing device identifier, which is signed using a secret key of the PAT processing device.

Here, one of the link informations of AIDs is the link information of the holder AID of this PAT, where the change of the information contained in the PAT such as an addition of the link information of AID to the PAT, a deletion of the link information of AID from the PAT, a change of the validity period in the PAT, a change of the transfer control flag value in the PAT, etc., can be made by presenting the link information of the holder AID and a corresponding Enabler to the PAT processing device.

On the other hand, the link informations of AIDs other than the link information of the holder AID that are contained in the PAT are all link information of member AIDs, where a change of the information contained in the PAT cannot be made even when the link information of the member AID and a corresponding Enabler are presented to the PAT processing device.

The holder index is a numerical data for identifying the link information of the holder AID, which is defined to take a value 1 when the link information of the holder AID is a top link information of AID in the link specifying AID list formed from the link information of the holder AID and the link informations of the member AIDs, a value 2 when the link information of the holder AID is a second link information of AID from the top of the link specifying AID list, or a value n when the link information of the holder AID is an n-th link information of AID from the top of the link specifying AID list.

The transfer control flag value is defined to take either 0 or 1 similarly as in the case of the link specifying 1-to-1 PAT.

The link information of the holder AID is defined to be a link information of AID which is written at a position of the holder index value in the link specifying AID list. The link informations of the member AIDs are defined to be all the link informations of AIDs other than the link information of the holder AID.

The validity period is defined by any one or combination of the number of times for which the PAT is available, the absolute time (UTC) by which the PAT becomes unavailable, the absolute time (UTC) by which the PAT becomes available, and the relative time (lifetime) since the PAT becomes available until it becomes unavailable.

The identifier of a PAT processing device (or a PAT processing object on the network) is defined as a serial number of the PAT processing device (or an distinguished name of the PAT processing object on the network). The secret key of the PAT processing device (or the PAT processing object on the network) is defined to be uniquely corresponding to the identifier.

Also, in this second embodiment, an Enabler is introduced as an identifier corresponding to the AID. As shown in FIG. 41, the Enabler is an information comprising a character string uniquely indicating that it is an Enabler and a link information attached AID itself, which is signed by the CA 1.

Next, the operations for a generation of a new PAT and a content change of the existing PAT will be described. Here, the following operations are defined at a secure PAT processing device on the communication terminal or a PAT processing object on the CA or on a network which is properly requested from the CA (which will also be referred to as a PAT processing device hereafter). These operations are similar to those of the second embodiment described above so that they will be described by referring to FIG. 10 to FIG. 13 but it is assumed that each occurrence of AID in FIG. 10 to FIG. 13 should be replaced by the link information of AID in the following.

1. Editing of link specifying AID list:

A link specifying AID list, which is a list of link informations of AIDs contained in the PAT, is edited using link information attached AIDs and Enabler. Else, the link specifying AID list is newly generated.

2. Setting of the validity period and the transfer control flag:

The validity period value and the transfer control flag value contained in the PAT are changed using a link information attached AID and Enabler. Also, a new validity period value and a new transfer control flag value are set in the newly generated link specifying AID list.

A user who presented the holder AID and the Enabler corresponding to this holder AID to the PAT processing device can edit the list of link informations of AIDs contained in the PAT. In this case, the following processing rules are used.

(1) Generating a new PAT (MakePAT) (see FIG. 10):

The link specifying AID list (LALIST<(link)holder AID (link)member $AID_1$, (link)member $AID_2$, ..., (link)member $AID_n$>) where (link)$AID_x$ denotes the link information of $AID_x$ is newly generated, and the validity period value and the transfer control flag value are set with respect to the generated LALIST.

(link)$AID_A$+(link)$AID_B$+Enabler of $AID_B$
+Enabler of $AID_A$
→LALIST<(link)$AID_A$|(link)$AID_B$>
LALIST<(link)$AID_A$|(link)$AID_B$>+Enabler of $AID_A$
+validity period value
+transfer control flag value
→PAT<(link)$AID_A$|(link)$AID_B$>

(2) Merging PATs (MergePAT) (see FIG. 11):

A plurality of LALISTs of the same holder AID are merged and the validity period value and the transfer control flag value are set with respect to the merged LALIST.

LALIST<(link)$AID_A$|(link)$AID_{B1}$, (link)$AID_{B2}$, ... >
+LALIST<(link)$AID_A$|(link)$AID_{C1}$, (link)$AID_{C2}$, ... >
+Enabler of $AID_A$
→LALIST<(link)$AID_A$|(link)$AID_{B1}$, (link)$AID_{B2}$, ..., (link)$AID_{C1}$(link)$AID_{C2}$, ... >
LALIST<(link)$AID_A$|(link)$AID_{B1}$, (link)$AID_{B2}$, ..., (link)$AID_{C1}$, (link)$AID_{C2}$, ... >
+Enabler of $AID_A$+validity period value
+transfer control flag value
→PAT<(link)$AID_A$|(link)$AID_{B1}$, (link)$AID_{B2}$, ..., (link)$AID_{C1}$, (link)$AID_{C2}$, ... >

(3) Splitting a PAT (SplitPAT) (see FIG. 12):

The LALIST is split into a plurality of LALISTs of the same holder AID, and the respective validity period value and transfer control flag value are set with respect to each one of the split LALISTs.

LALIST<(link)$AID_A$|(link)$AID_{B1}$, (link)$AID_{B2}$, ..., (link)$AID_{C1}$, (link)$AID_{C2}$, ... >
+Enabler of $AID_A$
→LALIST<(link)$AID_A$|(link)$AID_{B1}$, (link)$AID_{B2}$, ... >
+LALIST<(link)$AID_A$|(link)$AID_{C1}$, (link)$AID_{C2}$, ... >
LALIST<(link)$AID_A$|(link)$AID_{C1}$, (link)$AID_{C2}$, ... >
+Enabler of $AID_A$+validity period value
+transfer control flag value
PAT<(link)$AID_A$|(link)$AID_{C1}$, (link)$AID_{C2}$, ... >

(4) Changing a holder of a PAT (TransPAT) (see FIG. 13):

The holder AID of the LALIST is changed, and the validity period value and the transfer control flag value are set with respect to the changed LALIST.

LALIST<(link)$AID_A$|(link)$AID_B$>
+LALIST<(link)$AID_A$|(link)$AID_{C1}$, (link)$AID_{C2}$, ... >
+Enabler of $AID_A$+Enabler of $AID_B$
→LALIST<(link)$AID_B$ |(link)$AID_{C1}$, (link)$AID_{C2}$, ... >
LALIST<(link)$AID_B$ |(link)$AID_{C1}$, (link)$AID_{C2}$, ... >
+Enabler of $AID_B$+validity period value
+transfer control flag value
→PAT<(link)$AID_B$|(link)$AID_{C1}$, (link)$AID_{C2}$, ... >

In the operation for setting the validity period value, in order to permit the setting of the validity period value only to a user who holds both the holder AID and the corresponding Enabler, the following operation is defined.

PAT<(link)$AID_A$|(link)$AID_B$>+Enabler of $AID_A$
+validity period value
→PAT<(link)$AID_A$|(link)$AID_B$>

In the operation for setting the transfer control flag value, in order to permit the setting of the transfer control flag value only to a user who holds both the holder AID and the corresponding Enabler, the following operation is defined.

PAT<(link)$AID_A$|(link)$AID_B$>+Enabler of $AID_A$
+transfer control flag value
→PAT<(link)$AID_A$|(link)$AID_B$>

Next, with references to FIG. 42 to FIG. 48, the overall system configuration of this seventh embodiment will be described. In FIG. 42 to FIG. 48, the user-A who has $AID_A$ allocated from the CA stores $AID_A$ and Enabler of $AID_A$ in a computer of the user-A, and the input/output devices such as floppy disk drive, CD-ROM drive, communication board, microphone, speaker, etc., are connected. Else, $AID_A$ and Enabler of $AID_A$ are stored in a communication terminal (telephone, cellular phone, etc.) which has a storage device and a data input/output function.

Similarly, the user-B who has $AID_B$ allocated from the CA stores $AID_B$ and Enabler of $AID_B$ in a computer of the user-B, and the input/output devices such as floppy disk drive, CD-ROM drive, communication board, microphone, speaker, etc., are connected. Else, $AID_B$ and Enabler of $AID_B$ are stored in a communication terminal (telephone, cellular phone, etc.) which has a storage device and a data input/output function.

In the following, a procedure by which the user-A generates PAT<(link)$AID_A$ |(link)$AID_B$> will be described.

(1) The user-A acquires $AID_B$ and Enabler of $AID_B$ using any of the following means.

Figure 42:
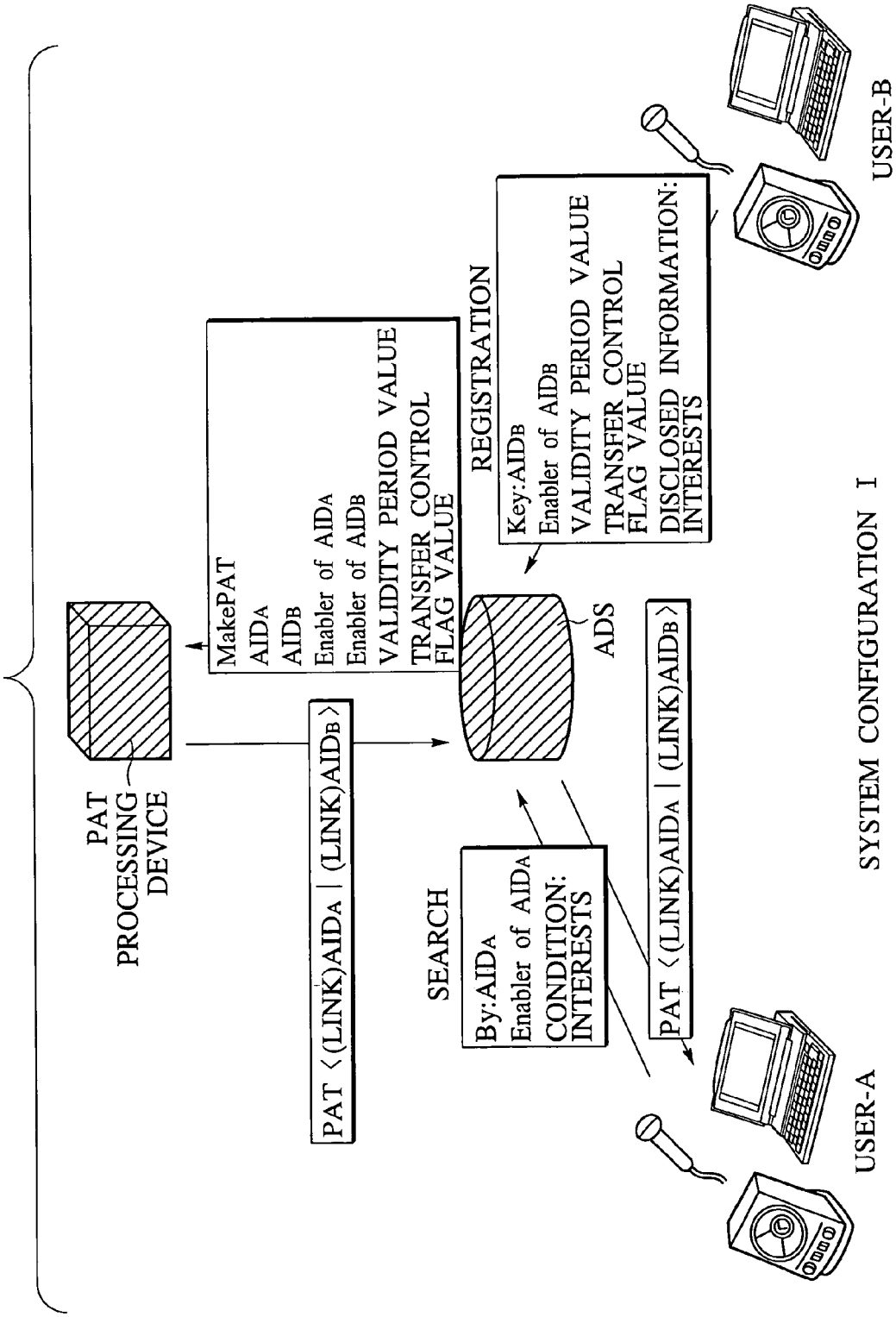
FIG. 42 is a first exemplary system configuration that can be used in the seventh embodiment of the present invention.

$AID_B$ and Enabler of $AID_B$ are registered at the ADS 7, and it is waited until the user-A acquires them as a search result (FIG. 42).

Figure 43:
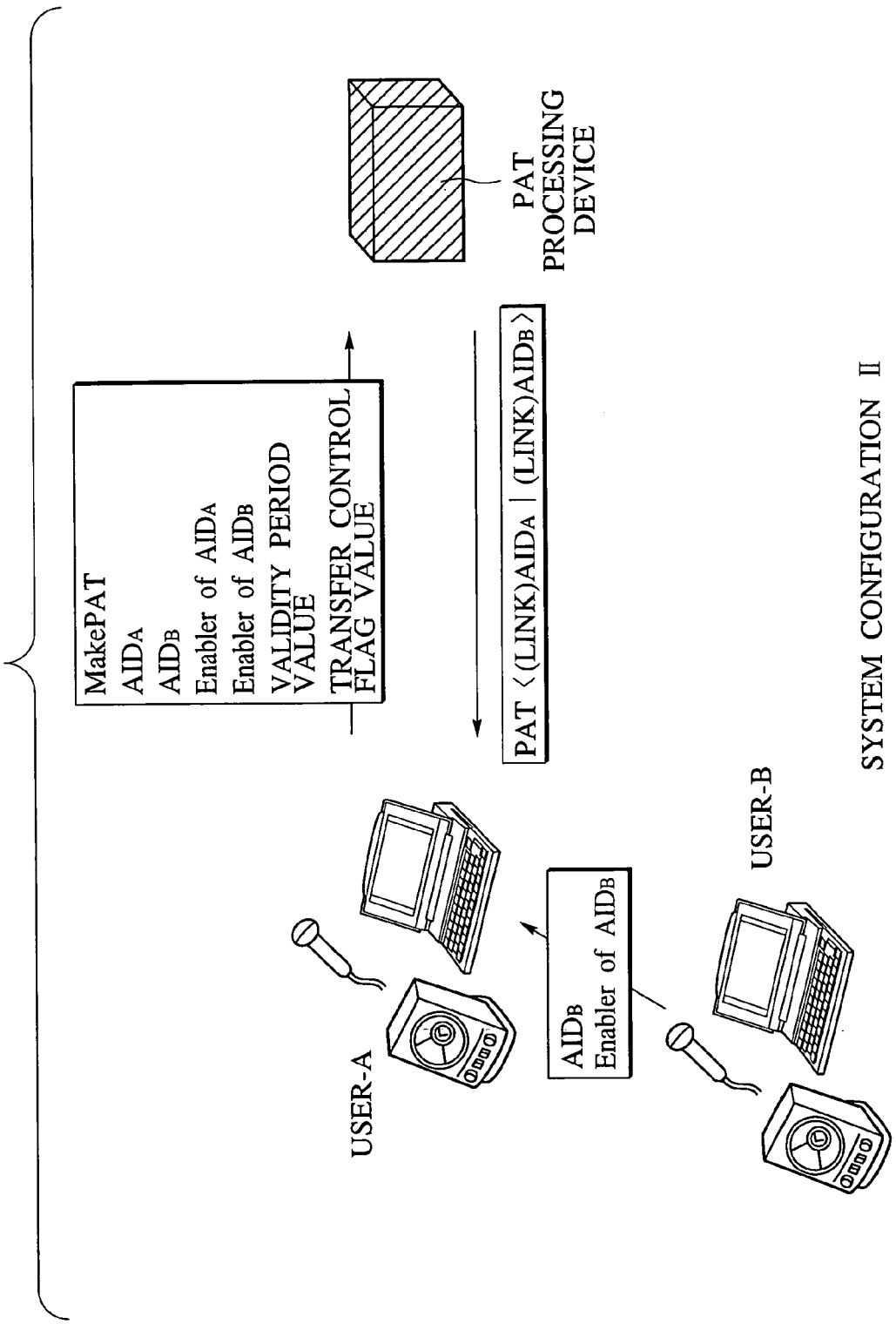
FIG. 43 is a second exemplary system configuration that can be used in the seventh embodiment of the present invention.
Figure 44:
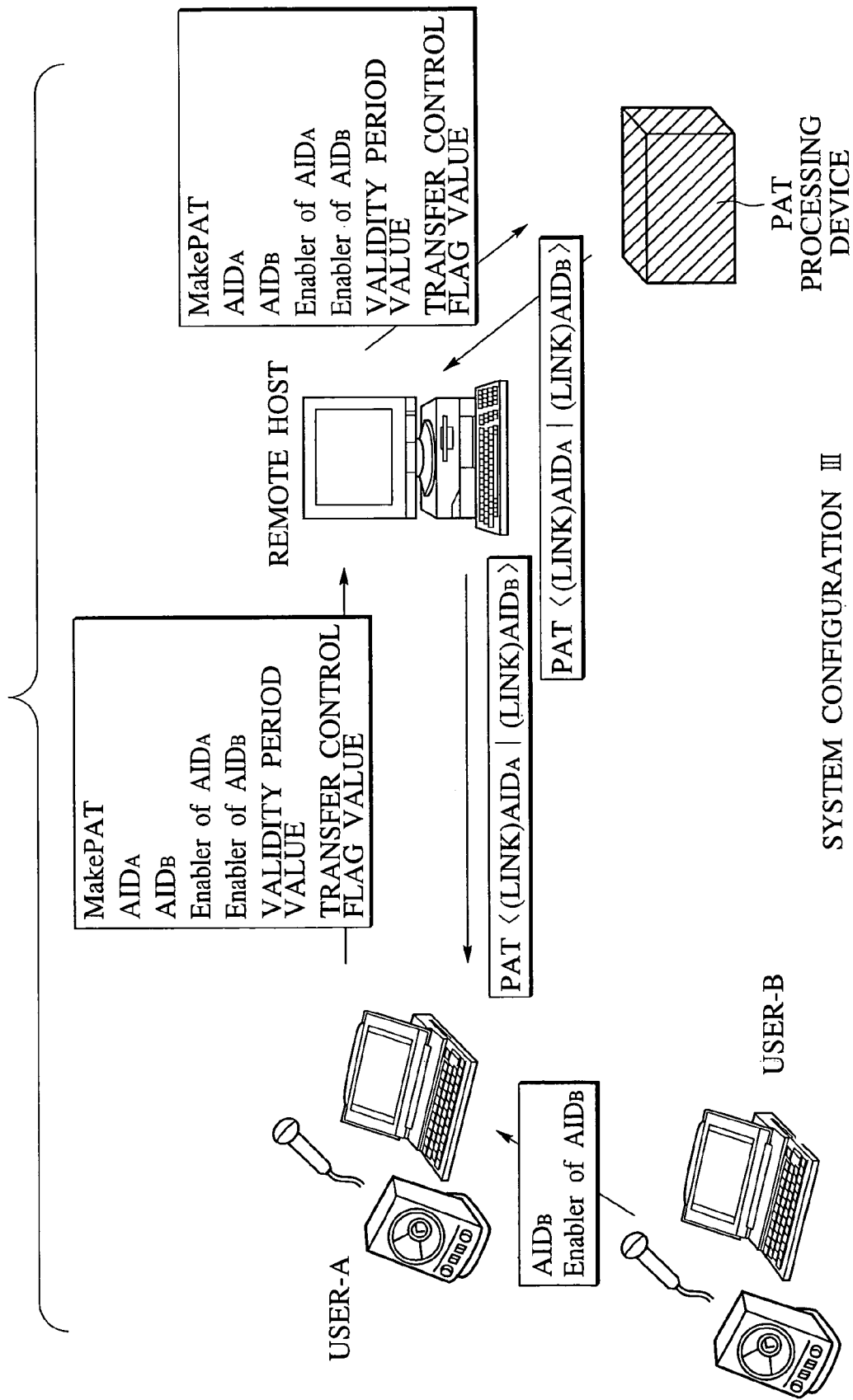
FIG. 44 is a third exemplary system configuration that can be used in the seventh embodiment of the present invention.

$AID_B$ and Enabler of $AID_B$ are directly transmitted to the user-A by the email, signaling, etc. (FIGS. 43, 44).

Figure 45:
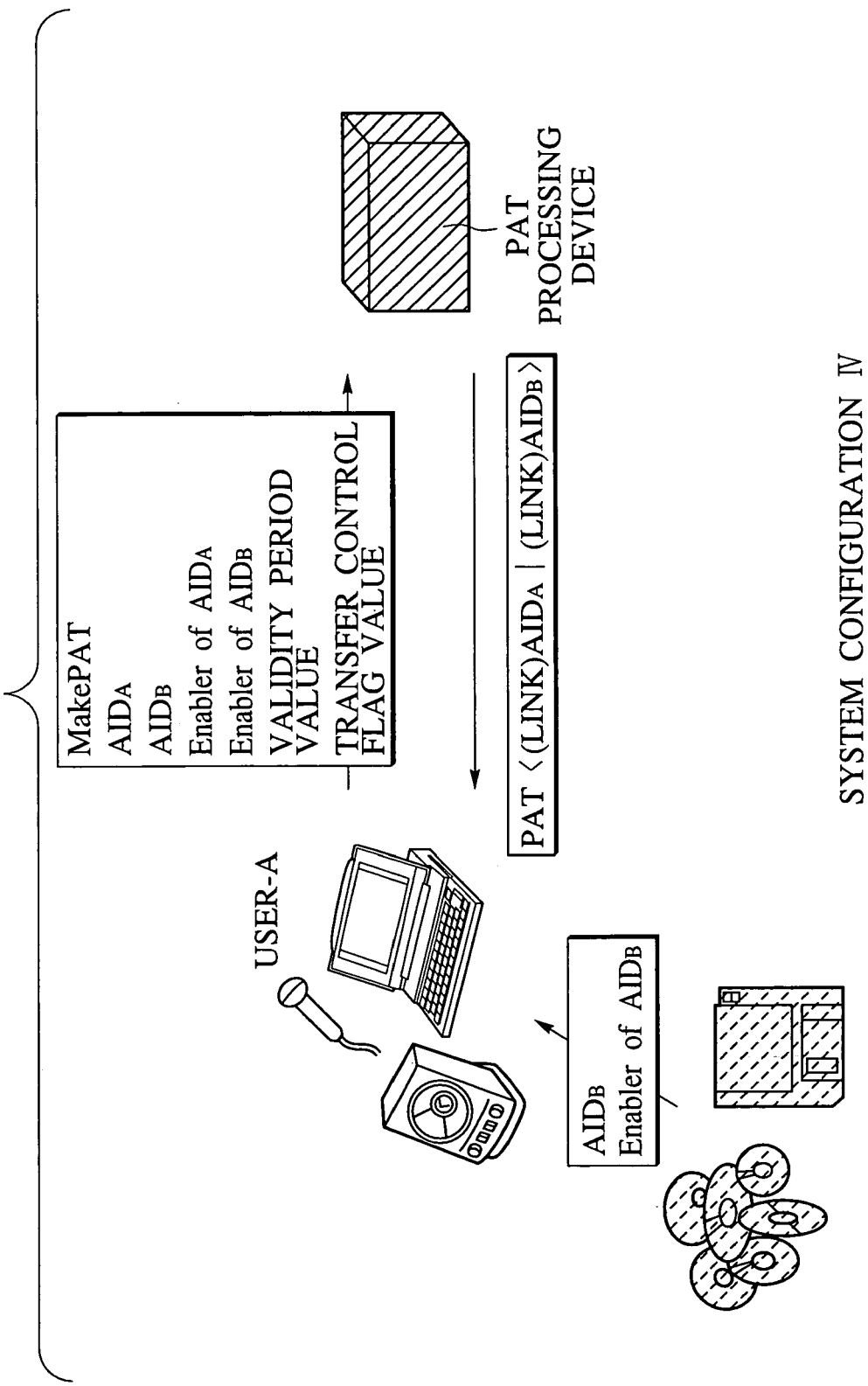
FIG. 45 is a fourth exemplary system configuration that can be used in the seventh embodiment of the present invention.
Figure 46:
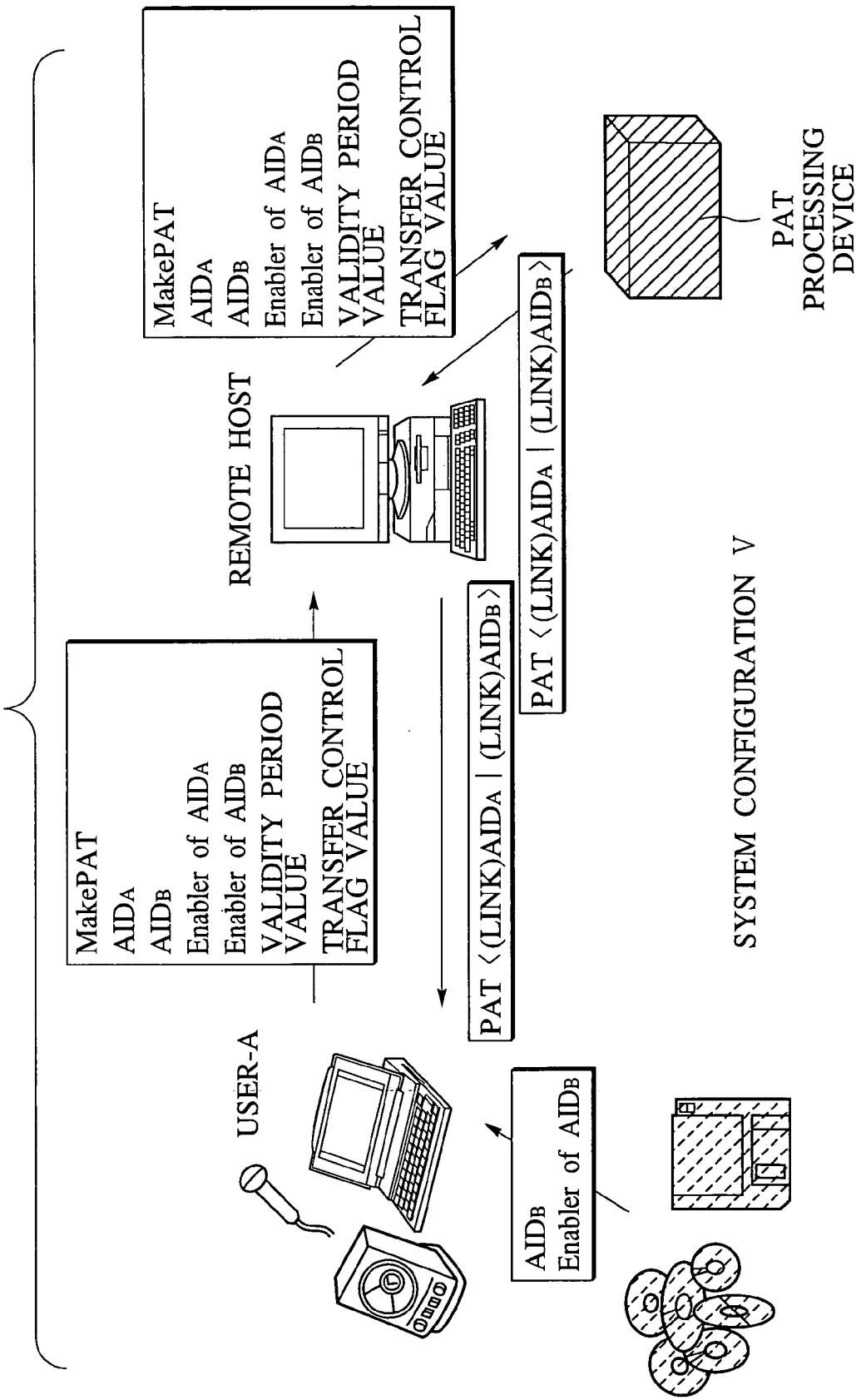
FIG. 46 is a fifth exemplary system configuration that can be used in the seventh embodiment of the present invention.

$AID_B$ and Enabler of $AID_B$ are stored in a magnetic, optic, or electronic medium such as floppy disk, CD-ROM, MO, IC card, etc., and this medium is given to the user-A. Else, it is waited until the user acquires them by reading this medium (FIGS. 45, 46).

Figure 47:
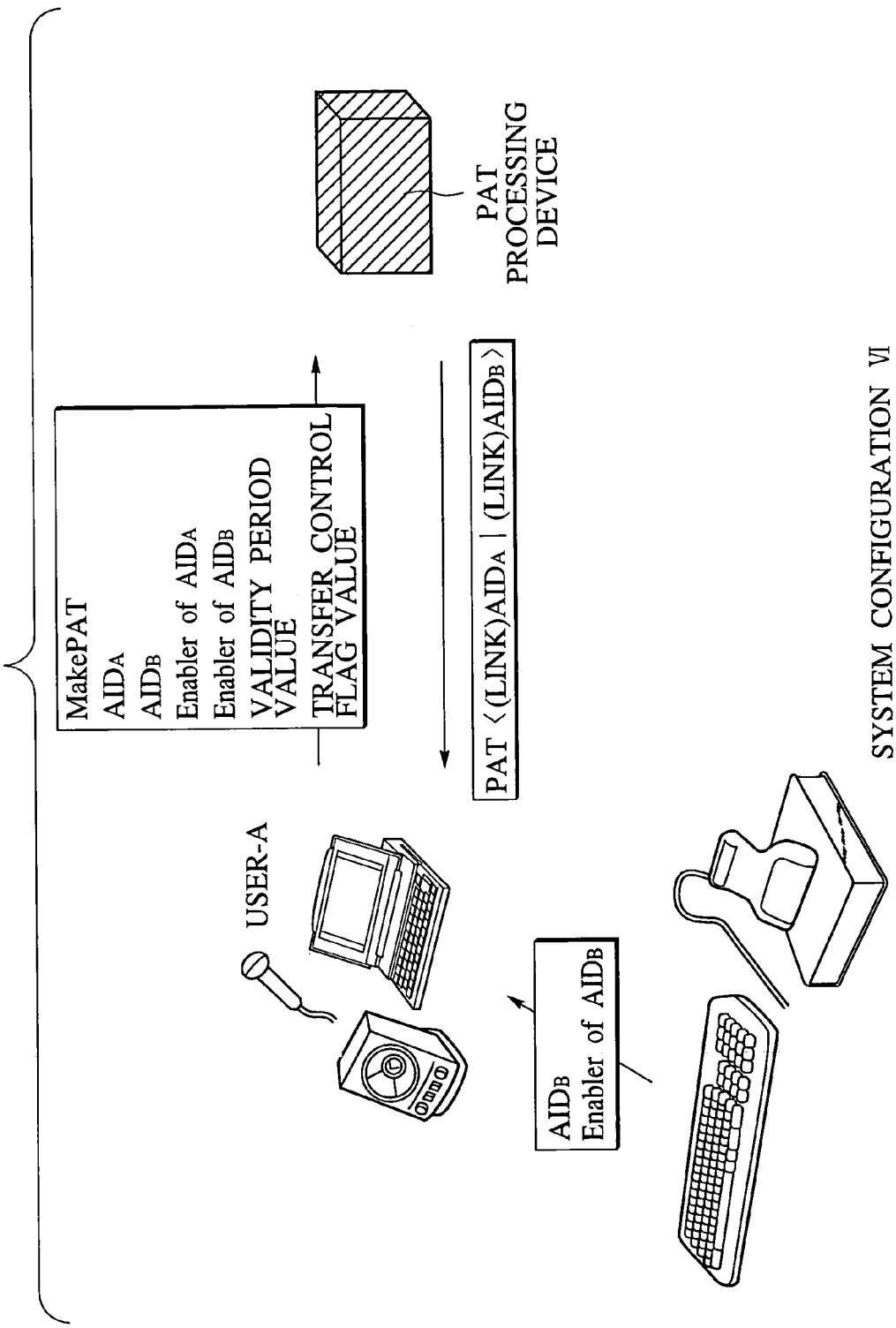
FIG. 47 is a sixth exemplary system configuration that can be used in the seventh embodiment of the present invention.
Figure 48:
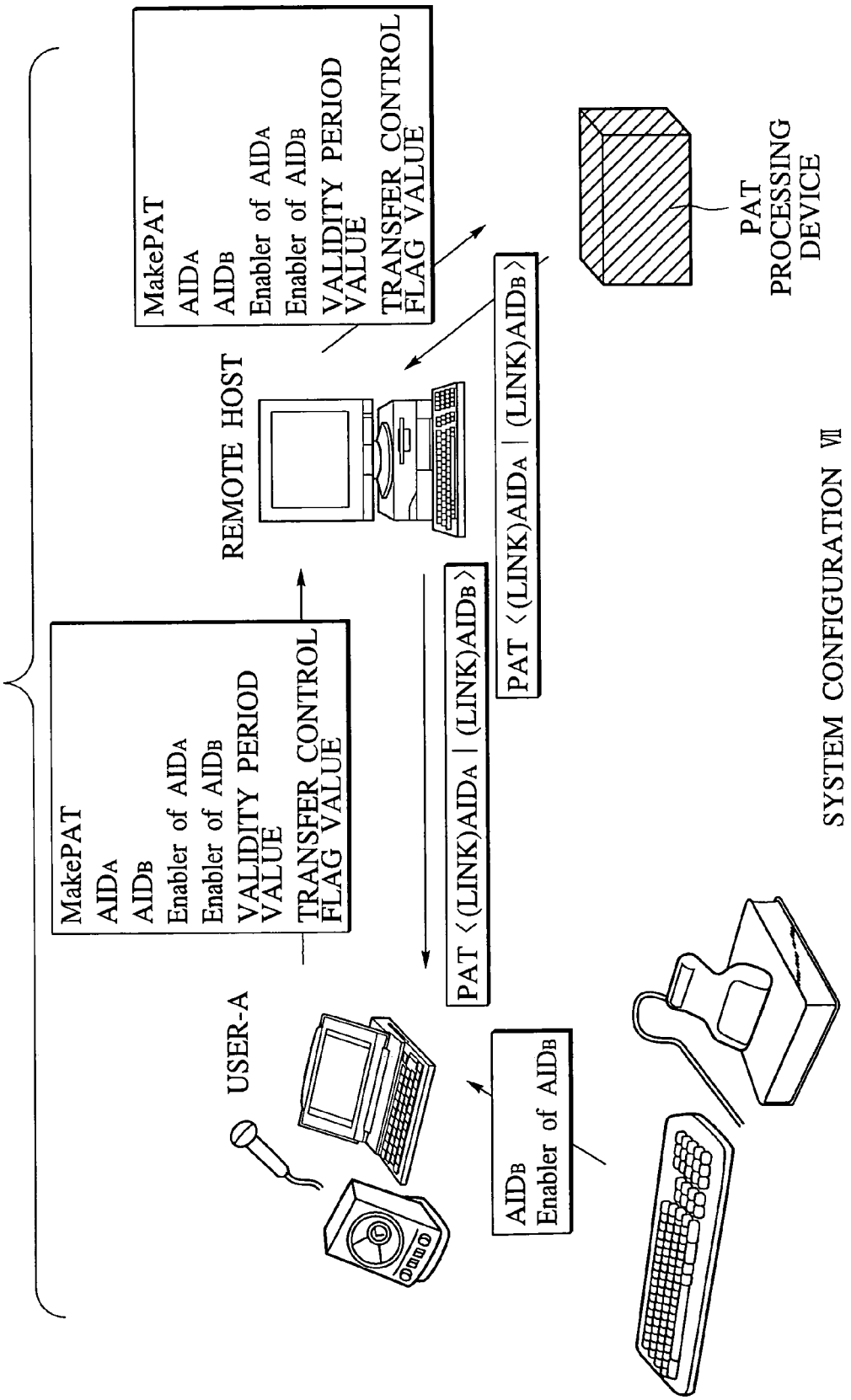
FIG. 48 is a seventh exemplary system configuration that can be used in the seventh embodiment of the present invention.

$AID_B$ and Enabler of $AID_B$ are printed on a paper medium such as book, name card, etc., and this medium is given to the user-A. Else, it is waited until the user-A acquire them by reading this medium (FIGS. 47, 48).

(2) The user-A who has acquired $AID_B$ and Enabler of $AID_B$ by any of the means described in the above (1) issues the MakePAT command to the PAT processing device. This procedure is common to FIG. 42 to FIG. 48, and defined as follows.

(a) The user A requests the issuance of the MakePAT command by setting $AID_A$, Enabler of $AID_A$, $AID_B$, Enabler of $AID_B$, the validity period value, and the transfer control flag value into the communication terminal of the user-A.

(b) The communication terminal of the user-A generates the MakePAT command.

(c). The communication terminal of the user-A transmits the generated MakePAT command to the PAT processing device by means such as the email, signaling, etc. (the issuance of the MakePAT command).

(d) The PAT processing device generates PAT<(link)$AID_A$|(link)$AID_B$> by processing the received MakePAT command according to FIG. 21 and FIG. 49. More specifically, this is done as follows.

(link)$AID_A$+(link)$AID_B$
+Enabler of $AID_B$+Enabler of $AID_A$
→LALIST<(link)$AID_A$|(link)$AID_B$>
LALIST<(link)$AID_A$|(link)$AID_B$>+Enabler of $AID_A$
+validity period value+transfer control flag value
→PAT<(link)$AID_A$|(link)$AID_B$>

(e) The PAT processing device transmits the generated PAT<(link)AID$_A$|(link)AID$_B$> to the communication terminal of the user-A, or to the communication terminal of the user-B according to the need, by means such as the email, signaling, etc.

(f) The communication terminal of the user-A (or the user-B) stores the received PAT<(link)AID$_A$|(link)AID$_B$> in the storage device of the communication terminal of the user-A.

The merging of PATs (MergePAT, FIG. 21, FIG. 49), the splitting of a PAT (SplitPAT, FIG. 22, FIG. 49), and the changing of a holder of a PAT (TransPAT, FIG. 21, FIG. 49) are also carried out by the similar procedure.

The procedure of MakePAT, MergePAT and TransPAT is similar to that described above with reference to FIG. 21, except that the AID should be replaced by the link information of the AID and the AID list should be replaced by the link specifying AID list. Also, the procedure of SplitPAT is similar to that described above with reference to FIG. 22, except that the AID should be replaced by the link information of the AID and the AID list should be replaced by the link specifying AID list.

Here, in the procedures of FIG. 21 and FIG. 22, the link specifying AID list generation is carried out according to FIG. 49 as follows. Namely, a buffer length is determined first (step S9011) and a buffer is generated (step S9012). Then, the link information of the holder AID is copied to a vacant region of the generated buffer (step S9017). Then, the link information of the member AID is copied to a vacant region of the resulting buffer (step S9018), and if the next member AID exists (step S9015 YES), the step S9018 is repeated.

Next, the determination of the link information of the holder AID will be described. Bach of the MakePAT, the MergePAT, the SplitPAT, and the TransPAT commands is defined to have two or more arguments, where AID, PAT, or Enabler can be specified as an argument. In this case, the PAT processing device specifies the link information of the holder AID of the PAT to be outputted after executing each command according to the following rules.

Case of the MakePAT:

For the MakePAT command, it is defined that AIDs are to be specified for the first argument to the N-th argument(N=2, 3, . . . ) and Enablers are to be specified ma for the N+1-th and subsequent arguments. For example, they can be specified as follows.

MakePAT AID$_1$, AID$_2$, . . . , AID$_N$, Enabler of AID$_1$, Enabler of AID$_2$, . . . , Enabler of AID$_N$ The PAT processing device interprets the link information of AID of the first argument of the MakePAT command as the link information the holder AID.

Only when one of the Enablers of the N+1-th and subsequent arguments corresponds to the AID of the first argument, the PAT processing device specifies the link information of this AID (that is the link information of the AID of the first argument) as the link information of the holder AID of the PAT to be outputted after executing the MakePAT command.

Case of the MergePAT:

For the MergePAT command, it is defined that PATs are to be specified for the first argument to the N-th argument (N=2, 3, . . . ) and Enabler is to be specified for the N+1-th argument. Namely, they can be specified as follows.

MergePAT PAT$_1$ PAT$_2$ . . . PAT$_N$ Enabler of AID

The PAT processing device interprets the link information of the holder AID of the PAT of the first argument of the MergePAT command as the link information of the holder AID of the PAT to be outputted after executing the MergePAT command.

Only when the Enabler of the N+1-th argument corresponds to the holder AID of the PAT of the first argument, the PAT processing device specifies the link information of this AID (that is the link information of the holder AID of the PAT of the first argument) as the link information of the holder AID of the PAT to be outputted after executing the MergePAT command.

Case of the SplitPAT:

For the SplitPAT command, it is defined that PAT is to be specified for the first argument, a set of one or more AIDs grouped together by some prescribed symbols (assumed to be parentheses ( ) in this example) are to be specified for the second argument to the N-th argument (N=3, 4, . . . ), and Enabler is to be specified for the N+1-th argument. Namely, they can be specified as follows.

SplitPAT PAT$_1$ (AID$_{11}$) (AID$_{21}$ AID$_{22}$) . . . (AID$_{N1}$ AID$_{N2}$ . . . AID$_{NM}$) Enabler of AID The PAT processing device interprets the link information of the holder AID of the PAT of the first argument of the SplitPAT command as the link information of the holder AID of the PAT to be outputted after executing the SplitPAT command.

Only when the Enabler of the N+1-th argument corresponds to the holder AID of the PAT of the first argument, the PAT processing device specifies the link information of this AID (that is the link information of the holder AID of the PAT of the first argument) as the link information of the holder AID of the PAT to be outputted after executing the SplitPAT command.

Case of the TransPAT:

For the TransPAT command, it is defined that PATs are to be specified for the first argument and the second argument, an AID is to be specified for the third argument, and Enablers are to be specified for the fourth argument and the fifth argument. Namely, they can be specified as follows.

TransPAT PAT$_1$ PAT$_2$ AID Enabler of AID$_1$ Enabler of AID$_2$

The PAT processing device interprets the link information of AID of the third argument as the link information of the holder AID of the PAT to be outputted after executing the TransPAT command provided that the link information of AID of the third argument of the TransPAT command is contained in the PAT of the second argument.

Only when the Enabler of the fourth argument corresponds to both the PAT of the first argument and the PAT of the second argument and the Enabler of the fifth argument corresponds to the AID of the third argument, the PAT processing device specifies the link information of the AID of the third argument as the link information of the holder AID of the PAT to be outputted after executing the TransPAT command.

Next, the determination of the link informations of the member AIDs will be described. The definitions of the MakePAT, the MergePAT, the SplitPAT, and the TransPAT commands are as described above. The PAT processing device specifies the link informations of the member AIDs of the PAT to be outputted after executing each command according to the following rules.

Case of the MakePAT:

Only when the link information of the holder AID of the PAT to be outputted after executing the MakePAT command is formally determined, the PAT processing device interprets all the link informations of the AIDs of the second and subsequent arguments of the MakePAT command as the link informations of the member AIDs of the PAT to be outputted after executing the MakePAT command.

The PAT processing device specifies only the link informations of those AIDs among all the AIDs of the second and subsequent arguments which correspond to the Enablers specified by the N+1-th and subsequent arguments as the link informations of the member AIDs of the PAT to be outputted after executing the MakePAT command.

Case of the MergePAT:

Only when the link information of the holder AID of the PAT to be outputted after executing the MergePAT command is formally determined, the PAT processing device specifies the link informations of the member AIDs of all the PATs specified by the first to N-th arguments of the MergePAT as the link informations of the member AIDs of the PAT to be outputted after executing the MergePAT command.

Case of the SplitPAT:

Only when the link information of the holder AID of the PAT to be outputted after executing the SplitPAT command is formally determined, the PAT processing device specifies the link information of the member AID of the PAT specified by the first argument of the SplitPAT command as the link information of the member AID of the PAT to be outputted after executing the SplitPAT command. At this point, the link informations of the member AIDs are distributed into different PATs in units of parentheses ( ). For example, in the case of:

SplitPAT PAT ($AID_{11}$) ($AID_{21}$ $AID_{22}$) . . . ($AID_{N1}$ $AID_{N2}$ . . . $AID_{NM}$) Enabler of AID the link informations of ($AID_{11}$), ($AID_{21}$ $AID_{22}$) and ($AID_{N1}$ $AID_{N2}$ . . . $AID_{NM}$) will be the link informations of the member AIDs of different PATs having a common link information of holder AID.

Case of TransPAT:

Only when the link information of the holder AID of the PAT to be outputted after executing the TransPAT command is formally determined, the PAT processing device specifies all the link informations of the member AIDs remaining after excluding the link information of the member AID that is scheduled to be a new holder AID from all the link informations of the member AIDs of the PAT specified by the first argument of the TransPAT command and the link informations of the member AIDs of the PAT specified by the second argument as the link informations of the member AIDs of the PAT to be outputted after executing the TransPAT command.

The verification of the properness of the Enabler in this seventh embodiment is the same as described above with reference to FIG. 24. Also, this verification of the properness of the Enabler is common to the MakePAT, the MergePAT, the SplitPAT and the TransPAT.

Next, the eighth embodiment of the email access control scheme according to the present invention will be described in detail.

In this eighth embodiment, the OID is given by a real email address.

The PAT is an information comprising two or more real email addresses, the holder index, the validity period, the transfer control flag and the PAT processing device identifier (or the identifier of the PAT processing object on the network), which is signed using a secret key of the PAT processing device (or the PAT processing object on the network).

Here, one of the real email addresses is a holder email address of this PAT, where the change of the information contained in the PAT such as an addition of email address to the PAT, a deletion of email address from the PAT, a change of the validity period in the PAT, a change of the transfer control flag value in the PAT, etc., can be made by presenting the holder email address and an Enabler containing the holder email address to the PAT processing device (or the PAT processing object on the network).

On the other hand, the email addresses other than the holder email address that are contained in the PAT are all member email-addresses, where a change of the information contained in the PAT cannot be made even when the member email address and an Enabler containing the member email address are presented to the PAT processing device (or the PAT processing object on the network).

The holder index is a numerical data for identifying the holder email address, which is defined to take a value 1 when the holder email address is a top email address in the email address list formed from the holder email address and the member email addresses, a value 2 when the holder email address is a second email address from the top of the email address list, or a value n when the holder email address is an n-th email address from the top of the email address list.

The transfer control flag value is defined to take either 0 or 1.

The holder email address is defined to be a real email address which is written at a position specified by the holder index in the email address list. The member email addresses are defined to be all the email addresses other than the holder email address.

The validity period is defined by any one or combination of the number of times for which the PAT is available, the absolute time (UTC) by which the PAT becomes unavailable, the absolute time (UTC) by which the PAT becomes available, and the relative time (lifetime) since the PAT becomes available until it becomes unavailable.

The identifier of the PAT processing device (or the PAT processing object on the network) is defined as a serial number of the PAT processing device (or an distinguished name of the PAT processing object on the network). The secret key of the PAT processing device (or the PAT processing object on the network) is defined to be uniquely corresponding to the identifier.

Also, in this eighth embodiment, an Enabler is defined as an identifier corresponding to the real email address. The Enabler is an information comprising a character string uniquely indicating that it is an Enabler and a real email address itself, which is signed using the secret key of the PAT processing device or the PAT processing object on the network.

The generation of the PAT in this eighth embodiment is carried out as follows.

Here, a directory will be described as an example of the PAT processing object on the network. The directory manages the real email address and the disclosed information of the user in correspondence, and outputs the PAT upon receiving the search conditions presented from an arbitrary user.

The user transmits the real email address and the search conditions to the directory. Then, the directory acquires all the real email addresses which uniquely correspond to the disclosed information that satisfies these search conditions. Then, the directory generates a real email address list from the real email address of the user who presented the search conditions and all the real email addresses acquired as a search result. Then, the directory appends the holder index value, the validity period value, the transfer control flag value, and the distinguished name of the directory to the real email address list. Finally, the directory signs the resulting data using a secret key of the directory, and transmits it as the PAT to the user who presented the search conditions.

Next, the email access control in this eighth embodiment is carried out as follows.

The sender specifies the real email address of the sender in From: line, and "[PAT]@[real domain of sender]" in To: line of a mail.

The SCS acquires an email received by an MTA (Message Transfer Agent) such as SMTP (Simple Mail Transfer Protocol), and carries out the authentication by the following procedure.

(1) The signature of the PAT is verified using the public key of the PAT.

When the PAT is found to have been altered, the email is discarded and the processing is terminated.

When the PAT is found to have been not altered, the following processing (2) is executed.

(2) The search is carried out by presenting the sender's real email address to the PAT.

When a real email address that completely matches with the sender's real email address is not contained in the PAT, the email is discarded and the processing is terminated.

When a real email address that completely matches with the sender's real email address is contained in the PAT, the following processing (3) is executed.

(3) The Validity period value of the PAT is evaluated.

When the PAT is outside the validity period, the email is discarded and the processing is terminated.

When the PAT is within the validity period, the following processing (4) is executed.

(4) Whether or not to authenticate the sender is determined by referring to the transfer control flag value of the PAT.

When the value is 1, the challenge/response authentication between the SCS and the sender is carried out, and the signature of the sender is verified. When the signature is valid, the recipient is specified and the PAT is attached. When the signature is invalid, the email is discarded and the processing is terminated.

When the value is 0, the recipient is specified and the PAT is attached without executing the challenge/response authentication.

An exemplary challenge/response authentication between the SCS and the sender in this eight embodiment can be carried out as follows.

First, the SCS generates an arbitrary information such as a timestamp, for example, and transmits the generated information to the sender.

Then, the sender generates the secret key and the public key, signs the received information using the secret key, and transmits it along with the public key.

The SCS then verifies the signature of the received information using the public key presented from the sender. When the signature is valid, the recipient is specified and the PAT is attached. When the signature is invalid, the email is discarded and the processing is terminated.

The specifying of the recipient and the attaching of the PAT at the SCS in this eighth embodiment can be carried out as follows.

First, the SCS carries out the search by presenting the sender's real email address to the PAT, so as to acquire all the real email addresses which do not completely match the sender's real email address. Then, all these acquired real email addresses are specified as recipient's real email addresses.

Next, the SCS attaches the PAT to an arbitrary position in the email in order to transmit the PAT to all the recipient's email addresses so as to be able to realize the bidirectional communications. Finally, the SCS gives the email to the MTA.

The receiving refusal with respect to the PAT at the SCS in this eighth embodiment can be carried out as follows.

Receiving refusal setting: The bidirectional authentication is carried out by an arbitrary means between the user and the SCS 5. Then, the user transmits a registration command, his/her own real email address, and arbitrary PATs to the SCS 5. Then, the SCS 5 next verifies the signature of each received PAT using a public key of the ADS. Those PATs with the invalid signature are discarded by the SCS 5. When the signature is valid, the SCS 5 carries out the search by presenting the received real email address to each PAT. For each of those PATs which contain the real email address that completely matches with the received real email address, the SCS 5 presents the registration command and the PAT to the storage device such that the PAT is registered into the storage device. Those PATs which do not contain the real email address that completely matches with the received real email address are discarded by the SCS 5 without storing them into the storage device.

Receiving refusal execution: The SCS 5 carries out the search by presenting the PAT to the storage device. When a PAT that completely matches the presented PAT is registered in the storage device, the mail is discarded. When a PAT that completely matches the present PAT is not registered in the storage device, the mail is not discarded.

Receiving refusal cancellation: The bidirectional authentication is carried out by an arbitrary means between the user and the SCS 5. Then, the user presents his/her own real email address to the SCS 5. Then, the SCS 5 next presents the presented real email address as a search condition to the storage device and acquire all the PATs that contain the presented real email address, and then presents all the acquired PATs to the user. Then, the user selects all the PATs for which the receiving refusal is to be cancelled by referring to all the PATs presented from the SCS 5, and transmits all the selected PATs along with a deletion command to the SCS 5. Upon receiving the deletion command and all the PATs for which the receiving refusal is to be cancelled, the SCS 5 presents the deletion command and all the PATs received from the user to the storage device, such that all the received PATs are deleted from the storage device.

The editing of the PAT in this eighth embodiment can be carried out as follows.

The MakePAT, the MergePAT, the SplitPAT, and the TransPAT processings for the PAT using real email addresses as its elements can be obtained from the the MakePAT, the MergePAT, the SplitPAT, and the TransPAT processings for the PAT using AIDs as its elements described above, by replacing the AID by the real email address and the Enabler of AID by the Enabler of real email address.

A Null operator is an information comprising a data which is uniquely indicating that it is Null and which has a format of the real email address, which is signed by the secret key of the PAT processing device or the PAT processing object on the network.

Similarly, the God operator is an information comprising a data which is uniquely indicating that it is God and which has a format of the real email address, which is signed by the secret key of the PAT processing device or the PAT processing object on the network.

The Enabler of Null operator is an information comprising a data which is uniquely indicating that it is Enabler and the Null operator itself, which is signed by the secret key of the PAT processing device or the PAT processing object on the network.

The processings involving the Null operator and the God operator can be obtained from the processings for the PAT using AIDs as its elements described above, by replacing the AID by the real email address, the Enabler of AID by the Enabler of real email address, the Null-AID by the Null operator, the God-AID by the God operator, and the Enabler of Null-AID by the Enabler of Null operator.

As described, according to the present invention, a PAT is used for verifying the access right of a sender and the email access control among users is carried out when the verification result is valid, so that it becomes possible to disclose the information indicative of characteristics of a user while concealing the true identification of a user and carrying out communications appropriately according to this disclosed information while preventing conventionally possible attacks from a third person. In addition, even when a recipient receives an attack from a sender who maliciously utilizes the anonymity, damages of a recipient due to that attack can be minimized.

Also, according to the present invention, the generation and the content change of the personalized access ticket can be made by the initiative of a user by using an AID assigned to each user and an Enabler defined in correspondence to the AID, so that it becomes possible to appropriately manage information such as that of a point of contact of each member of the group communication (mailing list, etc.) which changes dynamically.

Also, according to the present invention, a Null-AID and an Enabler of Null-AID can be introduced in order to carry out the generation of a new PAT (MakePAT) and the merging of PATs (MergePAT) without giving the member AID and the Enabler of the member AID to the holder of the PAT, so that it becomes possible to prevent the pretending using the member AID.

Also, according to the present invention, the Null-AID can be used only as the holder AID of the PAT (the Null-AID cannot be used as the member AID), that is $PAT<AID_{Null}|AID_{member1}, AID_{member2}, \ldots, AID_{memberN}>$ is allowed, but $PAT<AID_{holder}|AID_{Null}, AID_{member1}, AID_{member2}, \ldots, AID_{memberN}>$ is not allowed, so that the holder of $PAT<AID_{holder}|AID_{member}>$ cannot produce $PAT<AID_{Null}|AID_{member}>$ from this $PAT<AID_{holder}|AID_{member}>$ as long as the holder does not know Enabler of $AID_{member}$.

Also, according to the present invention, a God-AID can be introduced in order to set up a read only attribute to the PAT, so that it becomes possible to fix the participants in the group communication.

Also, according to the present invention, the link information for uniquely specifying the AID can be introduced and the PAT can be given in terms of the link information such that the PAT does not contain the AID itself, so that it becomes possible to realize the receiving refusal function without using the AID itself.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method of email access control, comprising the steps of:

receiving a personalized access ticket containing a sender's identification and a recipient's identification in correspondence and a sender's identification presented by a sender from the sender who wishes to send an email to a recipient so as to specify the recipient as an intended destination of the email, the personalized access ticket further containing a validity period indicating a period for which the personalized access ticket is valid, at a secure communication service for connecting communications between the sender and the recipient;

controlling accesses between the sender and the recipient by verifying an access right of the sender with respect to the recipient according to the personalized access ticket at the secure communication service;

checking whether the sender's identification presented by the sender is contained as the sender's identification in the personalized access ticket presented by the sender, and refusing delivery of the email when the sender's identification presented by the sender is not contained in the personalized access ticket presented by the sender; and checking the validity period contained in the personalized access ticket presented by the sender, and refusing delivery of the email when the validity period has expired.

2. The method of claim 1, wherein the validity period of the personalized access ticket is set by a trusted third party.

3. The method of claim 1, further comprising the step of:

issuing the personalized access ticket to the sender at a directory service for managing an identification of each registrant and a disclosed information of each registrant which has a lower secrecy than a personal information, in a state which is accessible for search by unspecified many, in response to search conditions specified by the sender, by using an identification of a registrant whose disclosed information matches the search conditions as the recipient's identification and the sender's identification specified by the sender along with the search conditions.

4. The method of claim 1, further comprising the step of:

registering in advance a personalized access ticket containing an identification of a specific user from which delivery of emails to a specific registrant is to be refused as a sender's identification and an identification of the specific registrant as a recipient's identification for the personalized access ticket registered in advance, at the secure communication service;

wherein at the controlling step the secure communication service refuses delivery of the email from the sender when the personalized access ticket presented by the sender is registered therein in advance at the registering step.

5. The method of claim 4, further comprising the step of:

deleting the personalized access ticket registered at the secure communication service upon request from the specific registrant who registered the personalized access ticket at the registering step.

6. The method of claim 1, wherein the personalized access ticket also contains a transfer control flag indicating whether or not the sender should be authenticated by the secure communication service, and at the controlling step, when the transfer control flag contained in the personalized access ticket indicates that the sender should be authenticated, the secure communication service authenticates the sender's identification presented by the sender and refuses a delivery of the email when an authentication of the sender's identification presented by the sender fails.

7. The method of claim 6, wherein the authentication of the sender's identification presented by the sender is realized by a challenge/response procedure between the sender and the secure communication service.

8. The method of claim 6, wherein the transfer control flag of the personalized access ticket is set by a trusted third party.

9. The method of claim 1, wherein the sender's identification and the recipient's identification in the personalized access ticket are given by real email addresses of the sender and the recipient.

10. The method of claim 1, wherein the sender's identification and the recipient's identification in the personalized access ticket are given by anonymous identifications of the sender and the recipient, where an anonymous identification of each user contains at least one fragment of an official identification of each user by which each user is uniquely identifiable by a certification authority.

11. The method of claim 10, wherein the anonymous identification of each user is an information containing the at least one fragment of the official identification of each user which is signed by the certification authority using a secret key of the certification authority.

12. The method of claim 10, wherein the official identification of each user is a character string uniquely assigned to each user by the certification authority and a public key of each user which are signed by a secret key of the certification authority.

13. The method of claim 10, further comprising the step of:
probabilistically identifying an identity of the sender by reconstructing the official identification of the sender by judging identity of a plurality of anonymous identifications of the sender contained in a plurality of personalized access tickets used by the sender.

14. The method of claim 1, wherein an anonymous identification of each user that contains at least one fragment of an official identification of each user by which each user is uniquely identifiable by a certification authority and a link information of each anonymous identification by which each anonymous identification can be uniquely identified are defined, and the sender's identification and the recipient's identification in the personalized access ticket are given by a link information of the anonymous identification of the sender and a link information of the anonymous identification of the recipient.

15. The method of claim 14, wherein the link information of each anonymous identification is an identifier uniquely assigned to each anonymous identification by the certification authority.

16. The method of claim 14, further comprising the step of:
probabilistically identifying an identity of the sender by reconstructing the official identification of the sender by judging identity of a plurality of anonymous identifications of the sender corresponding to the link information contained in a plurality of personalized access tickets used by the sender.

17. The method of claim 1, wherein the personalized access ticket contains a single sender's identification and a single recipient's identification in 1-to-1 correspondence.

18. The method of claim 1, wherein the personalized access ticket contains a single sender's identification) and a plurality of recipient's identifications in 1-to-N correspondence, where N is an integer greater than 1.

19. The method of claim 18, wherein one identification among the single sender's identification and the plurality of recipient's identifications is a holder identification for identifying a holder of the personalized access ticket while other identifications among the single sender's identification and the plurality of recipient's identifications are member identifications for identifying members of a group to which the holder belongs.

20. The method of claim 19, further comprising the step of:
issuing an identification of each user and an enabler of the identification of each user indicating a right to change the personalized access ticket containing the identification of each user as the holder identification, to each user at a certification authority, such that prescribed processing on the personalized access ticket can be carried out at a secure processing device only by a user who presented both the holder identification contained in the personalized access ticket and the enabler corresponding to the holder identification to the secure processing device.

21. The method of claim 20, wherein the certification authority issues the enabler of the identification of each user as an information indicating that it is the enabler and the identification of each user itself which are signed by a secret key of the certification authority.

22. The method of claim 20, wherein the prescribed processing includes a generation of a new personalized access ticket, a merging of a plurality of personalized access tickets, a splitting of one personalized access ticket into a plurality of personalized access tickets, a changing of the holder of the personalized access ticket, changing of a validity period of the personalized access ticket, and a changing of a transfer control flag of the personalized access ticket.

23. The method of claim 22, wherein a special identification and a special enabler corresponding to the special identification which are known to all users are defined such that the generation of a new personalized access ticket and the changing of the holder of the personalized access ticket can be carried out by the holder of the personalized access ticket by using the special identification and the special enabler without using an enabler of a member identification.

24. The method of claim 23, wherein the special identification is defined to be capable of being used only as the holder identification of the personalized access ticket.

25. The method of claim 22, wherein a special identification which is known to all users is defined such that a read only attribute can be set to the personalized access ticket by using the special identification.

26. The method of claim 1, wherein at the controlling step, when the access right of the sender with respect to the recipient is verified according to the personalized access ticket, the secure communication service takes out the recipient's identification from the personalized access ticket by using the sender's identification presented by the sender, converts the email by using the taken out recipients identification into a format that can be interpreted by an email transfer function for actually carrying out email delivery processing, and gives the email after conversion to the email transfer function by attaching the personalized access ticket.

27. A method of email access control, comprising the steps of:
defining an official identification of each user by which each user is uniquely identifiable by a certification authority, and an anonymous identification of each user containing at least one fragment of the official identification;

identifying each user by the anonymous identification of each user in communications for emails on a communication network, wherein the anonymous identification of each user is an information containing the at least one fragment of the official identification of each user which is signed by the certification authority using a secret key of the certification authority;

receiving a personalized access ticket containing a sender's anonymous identification and a recipient's anonymous identification in correspondence, which is presented by a sender who wishes to send an email to a recipient so as to specify the recipient as an intended destination of the email, at a secure communication service for connecting communications between the sender and the receiver; and controlling accesses between the sender and the recipient by verifying an access right of the sender with respect to the recipient according to the personalized access ticket at the secure communication service.

28. The method of claim 27, wherein the official identification of each user is a character string uniquely assigned to each user by the certification authority and a public key of each user which are signed by a secret key of the certification authority.

29. The method of claim 27, further comprising the step of:

probabilistically identifying an identity of the sender at the secure communication service by reconstructing the official identification of the sender while judging identity of a plurality of anonymous identifications of the sender contained in a plurality of personalized access tickets used by the sender.

30. The method of claim 27, wherein the defining step also defines a link information of each anonymous identification by which each anonymous identification can be uniquely identified, and each anonymous identification also contains the link information of each anonymous identification.

31. The method of claim 30, wherein the link information of each anonymous identification is an identifier uniquely assigned to each anonymous identification by the certification authority.

32. The method of claim 30, wherein the personalized access ticket contains a link information of the sender's anonymous identification and a link information of the recipient's anonymous identification.

33. The method of claim 32, further comprising the step of:

probabilistically identifying an identity of the sender by reconstructing the official identification of the sender while judging identity of a plurality of anonymous identifications of the sender corresponding to the link information contained in a plurality of personalized access tickets used by the sender.

34. A communication system realizing email access control, comprising:

a communication network to which a plurality of user terminals are connected;

a secure communication service device for connecting communications between a sender and a receiver on the communication network, by receiving a personalized access ticket containing a sender's identification and a recipient's identification in correspondence, which is presented by a sender who wishes to send an email to a recipient so as to specify the recipient as an intended destination of the email, the personalized access ticket further containing a validity period indicating a period for which the personalized access ticket is valid, authenticating and controlling accesses between the sender and the recipient by verifying an access right of the sender with respect to the recipient according to the personalized access ticket and by checking the validity period contained in the personalized access ticket presented by the sender, and refusing delivery of the email when the validity period has expired; and a secure processing device for issuing the personalized access ticket which is signed by a secret key of the secure processing device;

wherein the secure communication service device authenticates the personalized access ticket by verifying a signature of the secure processing device in the personalized access ticket using a public key of the secure processing device.

35. The system of claim 34, wherein the secure communication service device also receives a sender's identification presented by the sender along with the personalized access ticket, checks whether the sender's identification presented by the sender is contained in the personalized access ticket presented by the sender, and refuses a delivery of the email when the sender's identification presented by the sender is not contained in the personalized access ticket presented by the sender.

36. The system of claim 34, further comprising:

a trusted third party for setting the validity period of the personalized access ticket.

37. The system of claim 34, further comprising;

a directory service device for managing an identification of each registrant and a disclosed information of each registrant which has a lower secrecy than a personal information, in a state which is accessible for search by unspecified many, and issuing the personalized access ticket to the sender in response to search conditions specified by the sender, by using an identification of a registrant whose disclosed information matches the search conditions as the recipient's identification and the sender's identification specified by the sender along with the search conditions.

38. The system of claim 34, wherein the secure communication service device registers in advance a personalized access ticket containing an identification of a specific user from which a delivery of emails to a specific registrant is to be refused as a senders identification and an identification of the specific registrant as a recipient's identification of the personalized access ticket registered in advance, and refuses a delivery of the email from the sender when the personalized access ticket presented by the sender is registered therein in advance.

39. The system of claim 38, wherein the secure communication service device deletes the personalized access ticket registered therein upon request from the specific registrant who registered the personalized access ticket.

40. The system of claim 34, wherein the personalized access ticket also contains a transfer control flag indicating whether or not the sender should be authenticated by the secure communication service, and when the transfer control flag contained in the personalized access ticket indicates that the sender should be authenticated, the secure communication service device authenticates the sender's identification presented by the sender and refuses a delivery of the email when an authentication of the sender's identification presented by the sender fails.

41. The system of claim 40, wherein the authentication of the sender's identification presented by the sender is realized by a challenge/response procedure between the sender and the secure communication service device.

42. The system of claim 40, further comprising a trusted third party for setting the transfer control flag of the personalized access ticket.

43. The system of claim 34, wherein the sender's identification and the recipient's identification in the personalized access ticket are given by real email addresses of the sender and the recipient.

44. The system of claim 34, further comprising:
a certification authority device for issuing an anonymous identification of each user which contains at least one fragment of an official identification of each user by which each user is uniquely identifiable by the certification authority device;
wherein the sender's identification and the recipient's identification in the personalized access ticket are given by anonymous identifications of the sender and the recipient.

45. The system of claim 44, wherein the anonymous identification of each user is an information containing the at least one fragment of the official identification of each user which is signed by the certification authority device using a secret key of the certification authority device.

46. The system of claim 44, wherein the official identification of each user is a character string uniquely assigned to each user by the certification authority device and a public key of each user which are signed by a secret key of the certification authority device.

47. The system of claim 44, wherein the secure communication service device probabilistically identifies an identity of the sender by reconstructing the official identification of the sender while judging identity of a plurality of anonymous identifications of the sender contained in a plurality of personalized access tickets used by the sender.

48. The system of claim 34, further comprising:
a certification authority device for issuing an anonymous identification of each user which contains at least one fragment of an official identification of each user by which each user is uniquely identifiable by the certification authority device and a link information of each anonymous identification by which each anonymous identification can be uniquely identified;
wherein the sender's identification and the recipients identification in the personalized access ticket are given by a link information of the anonymous identification of the sender and a link information of the anonymous identification of the recipient.

49. The system of claim 48, wherein the link information of each anonymous identification is an identifier uniquely assigned to each anonymous identification by the certification authority device.

50. The system of claim 48, wherein the secure communication service device probabilistically identifies an identity of the sender by reconstructing the official identification of the sender while judging identity of a plurality of anonymous identifications of the sender corresponding to the link information contained in a plurality of personalized access tickets used by the sender.

51. The system of claim 34, wherein the personalized access ticket contains a single sender's identification and a single recipient's identification in 1-to-1 correspondence.

52. The system of claim 34, wherein the personalized access ticket contains a single sender's identification and a plurality of recipient's identifications in 1-to-N correspondence, where N is an integer greater than 1.

53. The system of claim 52, wherein one identification among the single sender's identification and the plurality of recipient's identifications is a holder identification for identifying a holder of the personalized access ticket while other identifications among the single sender's identification and the plurality of recipient's identifications are member identifications for identifying members of a group to which the holder belongs.

54. The system of claim 53, further comprising:
a certification authority device for issuing to each user an identification of each user and an enabler of the identification of each user indicating a right to change the personalized access ticket containing the identification of each user as the holder identification; and
a secure processing device at which prescribed processing on the personalized access ticket can be carried out only by a user who presented both the holder identification contained in the personalized access ticket and the enabler corresponding to the holder identification to the secure processing device.

55. The system of claim 54, wherein the certification authority device issues the enabler of the identification of each user as an information indicating that it is the enabler and the identification of each user itself which are signed by a secret key of the certification authority device.

56. The system of claim 54, wherein the prescribed processing includes a generation of a new personalized access ticket, a merging of a plurality of personalized access tickets, a splitting of one personalized access ticket into a plurality of personalized access tickets, a changing of the holder of the personalized access ticket, changing of a validity period of the personalized access ticket, and a changing of a transfer control flag of the personalized access ticket.

57. The system of claim 56, wherein a special identification and a special enabler corresponding to the special identification which are known to all users are defined such that the generation of a new personalized access ticket and the changing of the holder of the personalized access ticket can be carried out by the holder of the personalized access ticket by using the special identification and the special enabler without using an enabler of a member identification.

58. The system of claim 57, wherein the special identification is defined to be capable of being used only as the holder identification of the personalized access ticket.

59. The system of claim 56, wherein a special identification which is known to all users is defined such that a read only attribute can be set to the personalized access ticket by using the special identification.

60. The system of claim 34, wherein when the access right of the sender with respect to the recipient is verified according to the personalized access ticket, the secure communication service device takes out the recipient's identification from the personalized access ticket by using the sender's identification presented by the sender, converts the email by using the taken out recipient's identification into a format that can be interpreted by an email transfer function for actually carrying out email delivery processing, and gives the email after conversion to the email transfer function by attaching the personalized access ticket.

61. A secure communication service device for use in a communication system realizing email access control, comprising:

computer hardware; and computer software for causing the computer hardware to connect communications between a sender and a receiver by receiving a personalized access ticket containing a sender's identification and a recipient's identification in correspondence, which is presented by the sender who wishes to send an email to the recipient so as to specify the recipient as an intended destination of the email, the personalized access ticket further containing a validity period indicating a period for which the personalized access ticket is valid, and controlling accesses between the sender and the recipient by verifying an access right of the sender with respect to the recipient according to the personalized access ticket;

wherein the computer software causes the computer hardware to also receive the sender's identification presented by the sender along with the personalized access ticket, check whether the sender's identification presented by the sender is contained in the personalized access ticket presented by the sender and whether the validity period contained in the personalized access ticket presented by the sender has expired, and refuse a delivery of the email when the sender's identification presented by the sender is not contained in the personalized access ticket presented by the sender or when the validity period has expired.

62. The secure communication service device of claim 61, wherein the computer software causes the computer hardware to register in advance a personalized access ticket containing an identification of a specific user from which a delivery of emails to a specific registrant is to be refused as a sender's identification and an identification of the specific registrant as a recipient's identification for the personalized access ticket registered in advance, at the secure communication service device, and refuse delivery of the email from the sender when the personalized access ticket presented by the sender is registered at the secure communication service device in advance.

63. The secure communication service device of claim 62, wherein the computer software causes the computer hardware to delete the personalized access ticket registered at the secure communication service device upon request from the specific registrant who registered the personalized access ticket.

64. The secure communication service device of claim 61, wherein the personalized access ticket also contains a transfer control flag indicating whether or not the sender should be authenticated by the secure communication service device, and when the transfer control flag contained in the personalized access ticket indicates that the sender should be authenticated, the computer software causes the computer hardware to authenticate the sender's identification presented by the sender and refuse a delivery of the email when an authentication of the sender's identification presented by the sender fails.

65. The secure communication service device of claim 64, wherein the computer software causes the computer hardware to realize the authentication of the sender's identification presented by the sender by a challenge/response procedure between the sender and the secure communication service device.

66. The secure communication service device of claim 61, wherein the sender's identification and the recipient's identification in the personalized access ticket are given by anonymous identifications of the sender and the recipient, where an anonymous identification of each user contains at least one fragment of an official identification of each user by which each user is uniquely identifiable by a certification authority, and the computer software also causes the computer hardware to probabilistically identify an identity of the sender by reconstructing the official identification of the sender by judging identity of a plurality of anonymous identifications of the sender contained in a plurality of personalized access tickets used by the sender.

67. The secure communication service device of claim 61, wherein an anonymous identification of each user that contains at least one fragment of an official identification of each user by which each user is uniquely identifiable by a certification authority and a link information of each anonymous identification by which each anonymous identification can be uniquely identified are defined, the sender's identification and the recipient's identification in the personalized access ticket are given by a link information of the anonymous identification of the sender and a link information of the anonymous identification of the recipient, and the computer software also causes the computer hardware to probabilistically identify an identity of the sender by reconstructing the official identification of the sender by judging identity of a plurality of anonymous identifications of the sender corresponding to the link information contained in a plurality of personalized access tickets used by the sender.

68. The secure communication service device of claim 61, wherein when the access right of the sender with respect to the recipient is verified according to the personalized access ticket, the computer software causes the computer hardware to take out the recipient's identification from the personalized access ticket by using the sender's identification presented by the sender, convert the email by using the taken out recipients identification into a format that can be interpreted by an email transfer function for actually carrying out email delivery processing, and give the email after conversion to the email transfer function by attaching the personalized access ticket.

69. A communication system realizing email access control, comprising:

a certification authority device for defining an official identification of each user by which each user is uniquely identifiable by the certification authority device, and an anonymous identification of each user which contains at least one fragment of the official identification wherein the anonymous identification of each user contains the at least one fragment of the official identification of each user which is signed by the certification authority device using a secret key of the certification authority device;

an access control device for controlling email accesses to a communication network on which each user is identified by the anonymous identification of each user in communications for emails on the communication network; and a secure communication service device for connecting communications between users on the communication network by receiving a personalized access ticket containing a sender's anonymous identification and a recipient's anonymous identification in correspondence, which is presented by a sender who wishes to send an email to a recipient so as to specify the recipient as an intended destination of the email, and controlling accesses between the sender and the recipient by verifying an access right of the sender with respect to the recipient according to the personalized access ticket.

70. The system of claim 69, wherein the official identification of each user is a character string uniquely assigned to each user by the certification authority device and a public key of each user which are signed by a secret key of the certification authority device.

71. The system of claim 69, wherein the secure communication service device probabilistically identifies an identity of the sender by reconstructing the official identification of the sender while judging identity of a plurality of anonymous identifications of the sender contained in a plurality of personalized access tickets used by the sender.

72. The system of claim 69, wherein the certification authority device also defines a link information of each anonymous identification by which each anonymous identification can be uniquely identified, and each anonymous identification also contains the link information of each anonymous identification.

73. The system of claim 72, wherein the link information of each anonymous identification is an identifier uniquely assigned to each anonymous identification by the certification authority device.

74. The system of claim 72,
wherein the personalized access ticket contains a link information of the sender's anonymous identification and a link information of the recipient's anonymous identification in correspondence.

75. The system of claim 74, wherein the secure communication service device probabilistically identifies an identity of the sender by reconstructing the official identification of the sender while judging identity of a plurality of link informations of anonymous identifications of the sender contained in a plurality of personalized access tickets used by the sender.

76. A computer usable medium having computer readable program code means embodied therein for causing a computer to function as a secure communication service device for use in a communication system realizing email access control, the computer readable program code means includes:
first computer readable program code means for causing said computer to receive a personalized access ticket containing a sender's identification and a recipient's identification in correspondence, which is presented by a sender who wishes to send an email to a recipient so as to specify the recipient as an intended destination of the email, the personalized access ticket further containing a validity period indicating a period for which the personalized access ticket is valid; and
second computer readable program code means for causing said computer to control accesses between the sender and the recipient by verifying an access right of the sender with respect to the recipient according to the personalized access ticket, so as to connect communications between the sender and the receiver on the communication network; wherein the second computer readable program code means causes said computer to authenticate the personalized access ticket presented by the sender, check whether the validity period contained in the personalized access ticket presented by the sender has expired, and refuse delivery of the email when the personalized access ticket presented by the sender has been altered or when the validity period has expired.

77. The computer usable medium of claim 76, wherein the personalized access ticket is signed by a secret key of a secure processing device which issued the personalized access ticket, and the second computer readable program code means causes said computer to authenticate the personalized access ticket by verifying a signature of the secure processing device in the personalized access ticket using a public key of the secure processing device.

78. The computer usable medium of claim 76, wherein the first computer readable program code means causes said computer to also receive the sender's identification presented by the sender along with the personalized access ticket, and the second computer readable program code means causes said computer to check whether the sender's identification presented by the sender is contained in the personalized access ticket presented by the sender and refuse a delivery of the email when the sender's identification presented by the sender is not contained in the personalized access ticket presented by the sender.

79. The computer usable medium of claim 76, wherein the second computer readable program code means causes said computer to register in advance a personalized access ticket containing an identification of a specific user from which a delivery of emails to a specific registrant is to be refused as the sender's identification and an identification of the specific registrant as the recipient's identification for the personalized access ticket registered in advance, at the secure communication service device, and refuse a delivery of the email from the sender when the personalized access ticket presented by the sender is registered at the secure communication service device in advance.

80. The computer usable medium of claim 79, wherein the second computer readable program code means causes said computer to delete the personalized access ticket registered at the secure communication service device upon request from the specific registrant who registered the personalized access ticket.

81. The computer usable medium of claim 76, wherein the personalized access ticket also contains a transfer control flag indicating whether or not the sender should be authenticated by the secure communication service device, and when the transfer control flag contained in the personalized access ticket indicates that the sender should be authenticated, the second computer readable program code means causes said computer to authenticate the sender's identification presented by the sender and refuse a delivery of the email when an authentication of the sender's identification presented by the sender fails.

82. The computer usable medium of claim 81, wherein the second computer readable program code means causes said computer to realize the authentication of the sender's identification presented by the sender by a challenge/response procedure between the sender and the secure communication service device.

83. The computer usable medium of claim 76, wherein the sender's identification and the recipient's identification in the personalized access ticket are given by anonymous identifications of the sender and the recipient, where an anonymous identification of each user contains at least one fragment of an official identification of each user by which each user is uniquely identifiable by a certification authority, and the second computer readable program code means also causes said computer to probabilistically identify an identity of the sender by reconstructing the official identification of the sender by judging identity of a plurality of anonymous identifications of the sender contained in a plurality of personalized access tickets used by the sender.

84. The computer usable medium of claim 76, wherein an anonymous identification of each user that contains at least one fragment of an official identification of each user by which each user is uniquely identifiable by a certification authority and a link information of each anonymous identification by which each anonymous identification can be uniquely identified are defined, the sender's identification and the recipient's identification in the personalized access ticket are given by a link information of the anonymous identification of the sender and a link information of the anonymous identification of the recipient, and the second computer readable program code means also causes said computer to probabilistically identify an identity of the sender by reconstructing the official identification of the sender by judging identity of a plurality of anonymous identifications of the sender corresponding to the link information contained in a plurality of personalized access tickets used by the sender.

85. The computer usable medium of claim 76, wherein when the access right of the sender with respect to the recipient is verified according to the personalized access ticket, the second computer readable program code means causes said computer to take out the recipient's identification from the personalized access ticket by using the sender's identification presented by the sender, convert the email by using the taken out recipient's identification into a format that can be interpreted by an email transfer function for actually carrying out email delivery processing, and give the email after conversion to the email transfer function by attaching the personalized access ticket.

* * * * *